(12) United States Patent
Davis

(10) Patent No.: US 10,377,288 B2
(45) Date of Patent: Aug. 13, 2019

(54) REINFORCED UNIVERSAL AIRCRAFT MULE

(71) Applicant: International Automated Systems, Inc., Blaine, MN (US)

(72) Inventor: Lawrence B. Davis, Andover, MN (US)

(73) Assignee: International Automated Systems, Inc., Blaine, MN (US)

(*) Notice: Subject to any disclaimer, the term of this patent is extended or adjusted under 35 U.S.C. 154(b) by 96 days.

(21) Appl. No.: 15/097,009

(22) Filed: Apr. 12, 2016

(65) Prior Publication Data

US 2016/0221693 A1 Aug. 4, 2016

Related U.S. Application Data

(63) Continuation-in-part of application No. 13/851,477, filed on Mar. 27, 2013, now Pat. No. 9,315,137.

(51) Int. Cl.

| | |
|---|---|
| *B60P 1/02* | (2006.01) |
| *B62B 3/06* | (2006.01) |
| *B62B 3/10* | (2006.01) |
| *B66F 7/06* | (2006.01) |
| *B64F 5/50* | (2017.01) |
| *B62B 3/00* | (2006.01) |
| *B62B 3/14* | (2006.01) |
| *B64D 37/12* | (2006.01) |

(52) U.S. Cl.
CPC .............. *B60P 1/025* (2013.01); *B62B 3/008* (2013.01); *B62B 3/0631* (2013.01); *B62B 3/0643* (2013.01); *B62B 3/104* (2013.01); *B64F 5/50* (2017.01); *B66F 7/0625* (2013.01); *B66F 7/0641* (2013.01); *B62B 3/14* (2013.01); *B62B 2202/41* (2013.01); *B64D 37/12* (2013.01)

(58) Field of Classification Search
CPC ..... B62B 3/008; B62B 3/0631; B62B 3/0643; B62B 3/104; B62B 2202/41; B60P 1/025; B64F 5/50; B66C 7/0625; B66C 7/0641
USPC ......................... 254/10 C; 414/589; 280/79.6
See application file for complete search history.

(56) References Cited

U.S. PATENT DOCUMENTS

| | | | | |
|---|---|---|---|---|
| 1,374,224 | A * | 4/1921 | Patterson | ................ B60P 3/122 |
| | | | | 212/255 |
| 2,661,108 | A * | 12/1953 | Horn | ...................... B60P 3/064 |
| | | | | 280/402 |
| 2,712,874 | A | 7/1955 | Murray | |
| 2,785,807 | A | 3/1957 | Prowinsky | |
| 2,851,235 | A * | 9/1958 | Henig | ...................... F41A 9/87 |
| | | | | 280/79.6 |

(Continued)

FOREIGN PATENT DOCUMENTS

| | | | | |
|---|---|---|---|---|
| DE | 4019315 | C1 * | 1/1992 | ............ B66F 7/0625 |
| GB | 1431755 | A * | 4/1976 | ............. B60P 1/025 |
| GB | 2241690 | A | 9/1991 | |

*Primary Examiner* — James Keenan

(74) *Attorney, Agent, or Firm* — Suiter Swantz pc llo

(57) ABSTRACT

A universal aircraft mule having a rollable and steerable frame and an interchangeable, load-carrying cradle configured for removably supporting and carrying an auxiliary. The frame tiltably and liftably supports the cradle with a lift assembly. The lift assembly raises and lowers the cradle in relation to the frame and tilts the cradle in relation to the frame. The cradle also allows an auxiliary to be skewed within the cradle to facilitate loading and unloading of the auxiliary.

20 Claims, 50 Drawing Sheets

(56) References Cited

U.S. PATENT DOCUMENTS

| | | | |
|---|---|---|---|
| 2,896,909 A | 7/1959 | Taylor | |
| 2,920,773 A | 1/1960 | Knabe | |
| 2,922,533 A | 1/1960 | Barge, Jr. | |
| 2,931,519 A | 4/1960 | Beach | |
| 2,974,972 A | 3/1961 | Hassell | |
| 2,994,443 A | 8/1961 | Gordon | |
| 3,125,350 A * | 3/1964 | Thierman | B62B 3/02 |
| | | | 280/142 |
| 3,220,585 A | 11/1965 | McCartney et al. | |
| 3,259,255 A * | 7/1966 | Cresci | B60P 1/02 |
| | | | 254/3 R |
| 3,319,932 A | 5/1967 | Szczepanik | |
| 3,751,073 A * | 8/1973 | Alexander | B60P 3/1083 |
| | | | 280/414.1 |
| 3,853,234 A | 12/1974 | Stobb | |
| 3,902,616 A * | 9/1975 | Santic | B60P 1/34 |
| | | | 298/11 |
| 4,288,193 A * | 9/1981 | Klausbruckner | B64F 1/32 |
| | | | 198/418 |
| 4,412,774 A | 11/1983 | Legrand et al. | |
| 4,461,455 A | 7/1984 | Mills et al. | |
| 4,522,548 A | 6/1985 | Oswald et al. | |
| 4,526,344 A | 7/1985 | Oswald et al. | |
| 4,907,935 A | 3/1990 | Mankey | |
| 5,016,897 A * | 5/1991 | Kauffman | B60P 3/073 |
| | | | 280/402 |
| 5,187,423 A | 2/1993 | Marton | |
| 5,375,959 A | 12/1994 | Trento | |
| 5,508,597 A | 4/1996 | Parmley, Sr. | |
| 5,542,805 A | 8/1996 | Lisec | |
| 5,612,606 A | 3/1997 | Guimarin et al. | |
| 5,791,860 A | 8/1998 | Stockmann | |
| 5,998,963 A | 12/1999 | Aarseth | |
| 6,206,385 B1 * | 3/2001 | Kern | B62B 3/02 |
| | | | 280/47.35 |
| 6,269,676 B1 * | 8/2001 | Soyk | B66F 7/0641 |
| | | | 72/457 |
| 6,668,950 B2 | 12/2003 | Park | |
| 6,692,217 B1 | 2/2004 | Pierrou | |
| 7,103,952 B2 | 9/2006 | Appleton et al. | |
| 7,188,843 B2 * | 3/2007 | Magness | B25H 5/00 |
| | | | 280/30 |
| 7,249,771 B1 * | 7/2007 | Brennan | A47J 37/0704 |
| | | | 280/35 |
| 7,416,196 B2 * | 8/2008 | Brown | B62B 3/008 |
| | | | 108/142 |
| 8,162,575 B2 * | 4/2012 | Knurr | B66F 7/0625 |
| | | | 410/47 |
| 8,418,960 B2 * | 4/2013 | Moore | B64F 5/50 |
| | | | 244/123.1 |
| 8,424,883 B1 * | 4/2013 | Ramos | B62B 3/02 |
| | | | 108/145 |
| 8,833,776 B2 * | 9/2014 | Boulanger | B64F 5/0036 |
| | | | 280/35 |
| 9,162,528 B2 * | 10/2015 | Kroening | B60B 33/0002 |
| 9,751,550 B2 * | 9/2017 | Crowley | B62B 3/0612 |
| 2004/0062630 A1 | 4/2004 | Marrero | |
| 2005/0023787 A1 * | 2/2005 | Haynes | B62B 3/002 |
| | | | 280/79.11 |
| 2009/0014219 A1 * | 1/2009 | Springston | B62B 3/008 |
| | | | 180/19.1 |
| 2009/0327165 A1 | 12/2009 | Kaufman | |
| 2013/0266415 A1 * | 10/2013 | Czartoryski | B60P 3/125 |
| | | | 414/800 |
| 2017/0203778 A1 * | 7/2017 | Jackson | B62B 5/0036 |

* cited by examiner

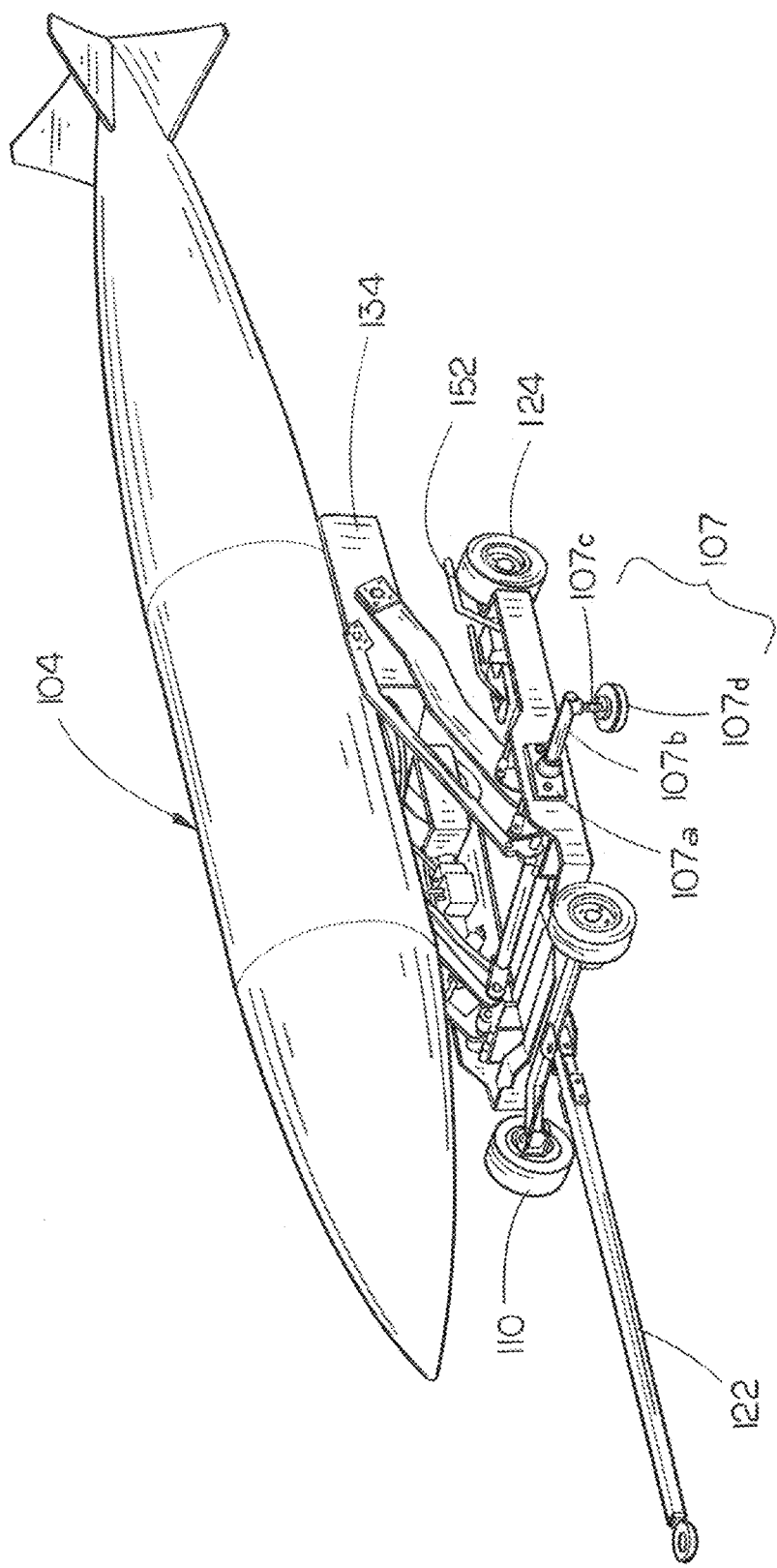

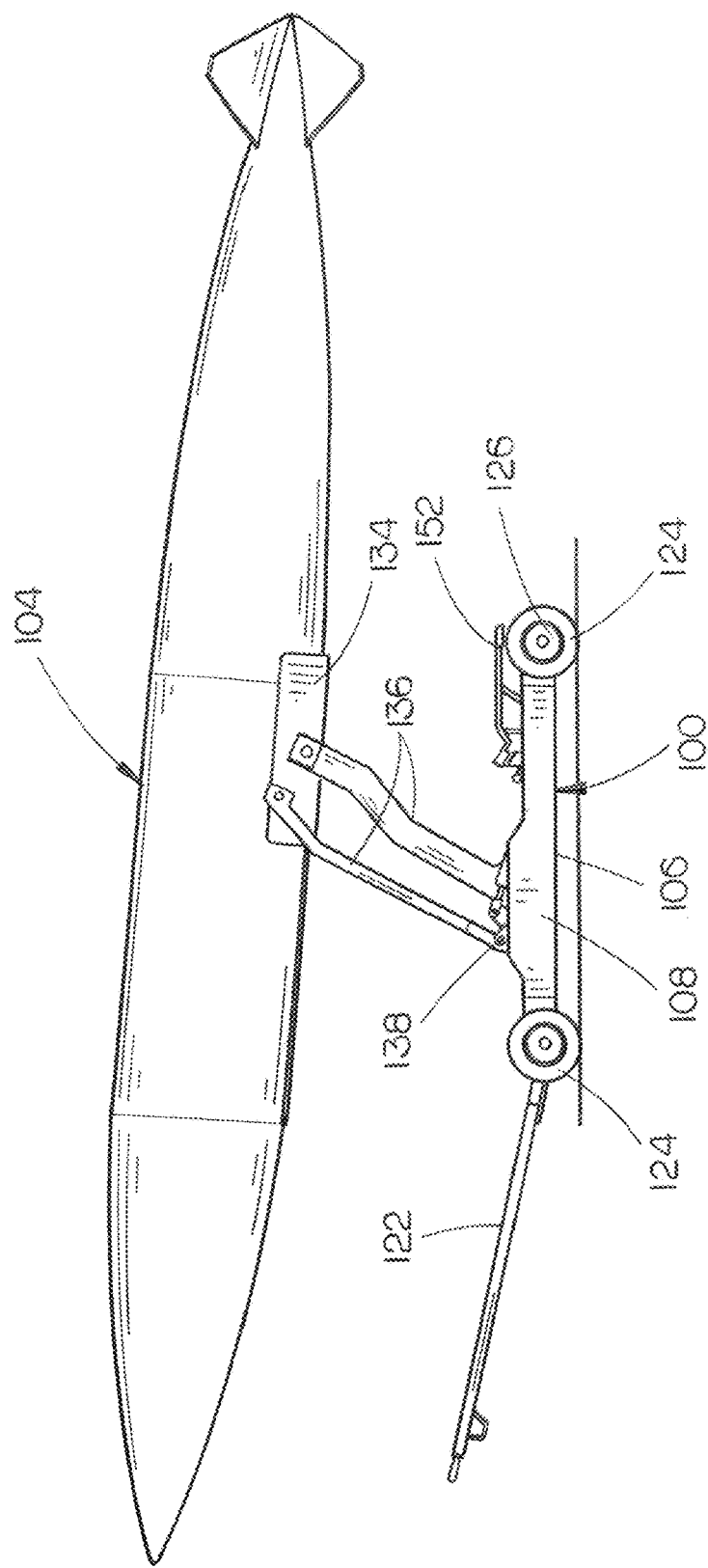

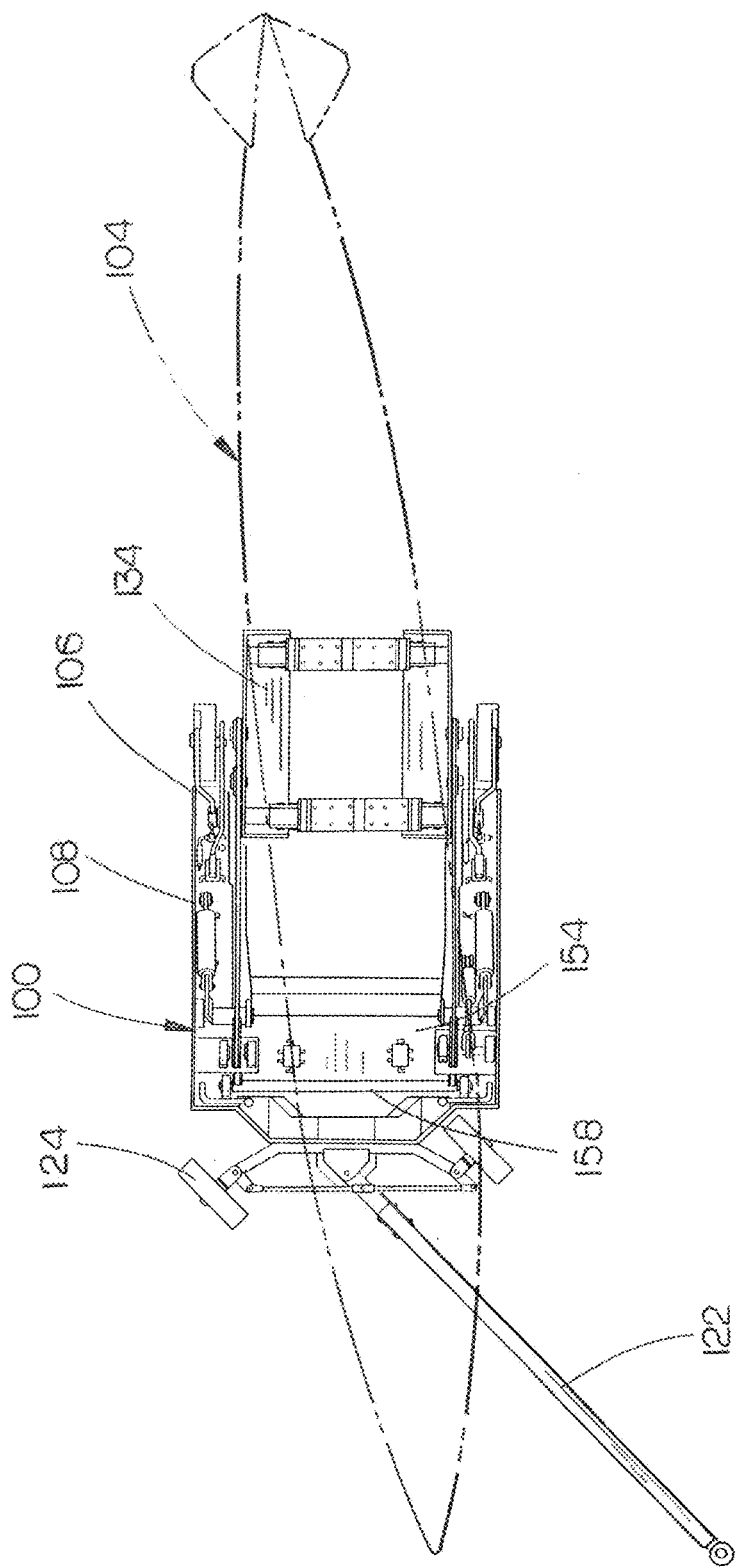

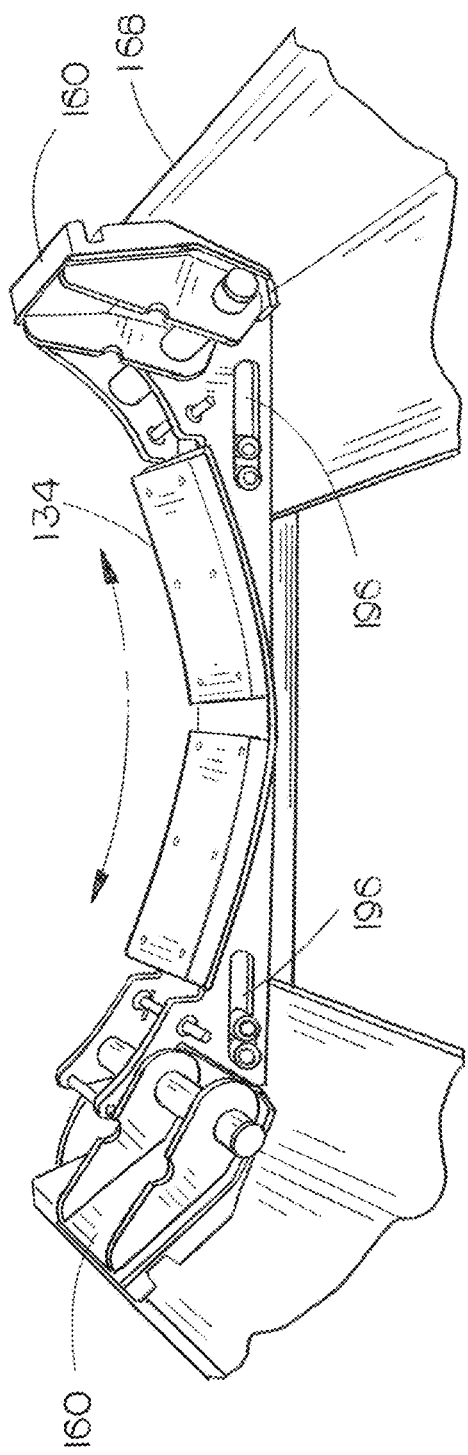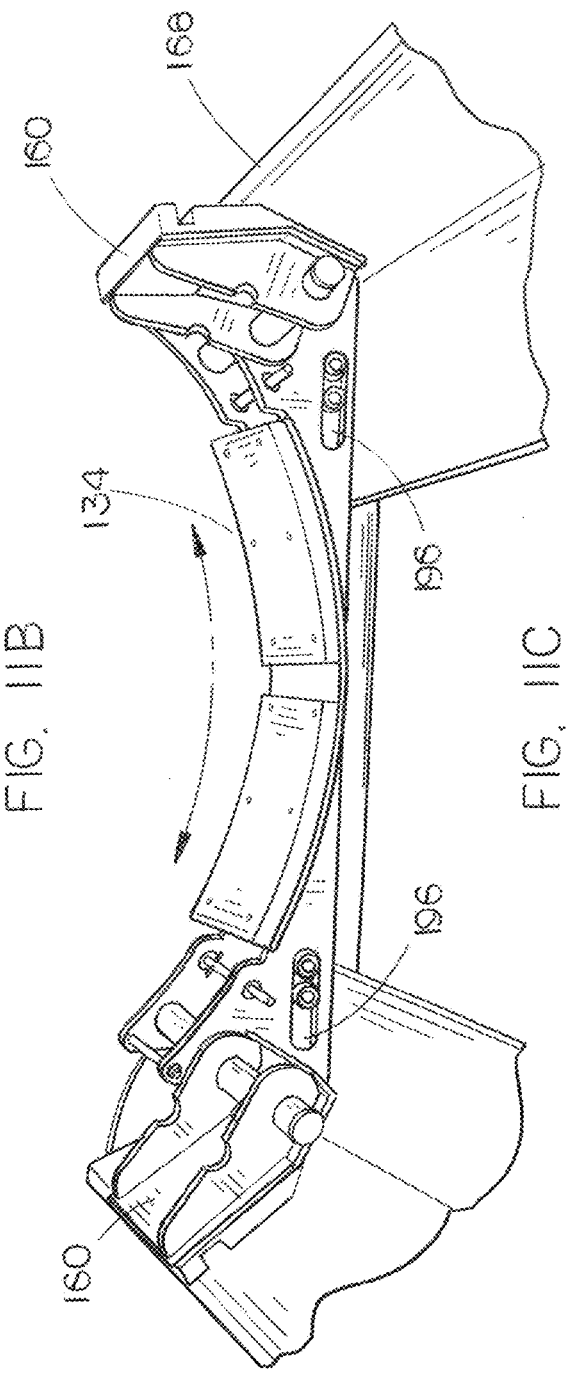
FIG. 11B
FIG. 11C

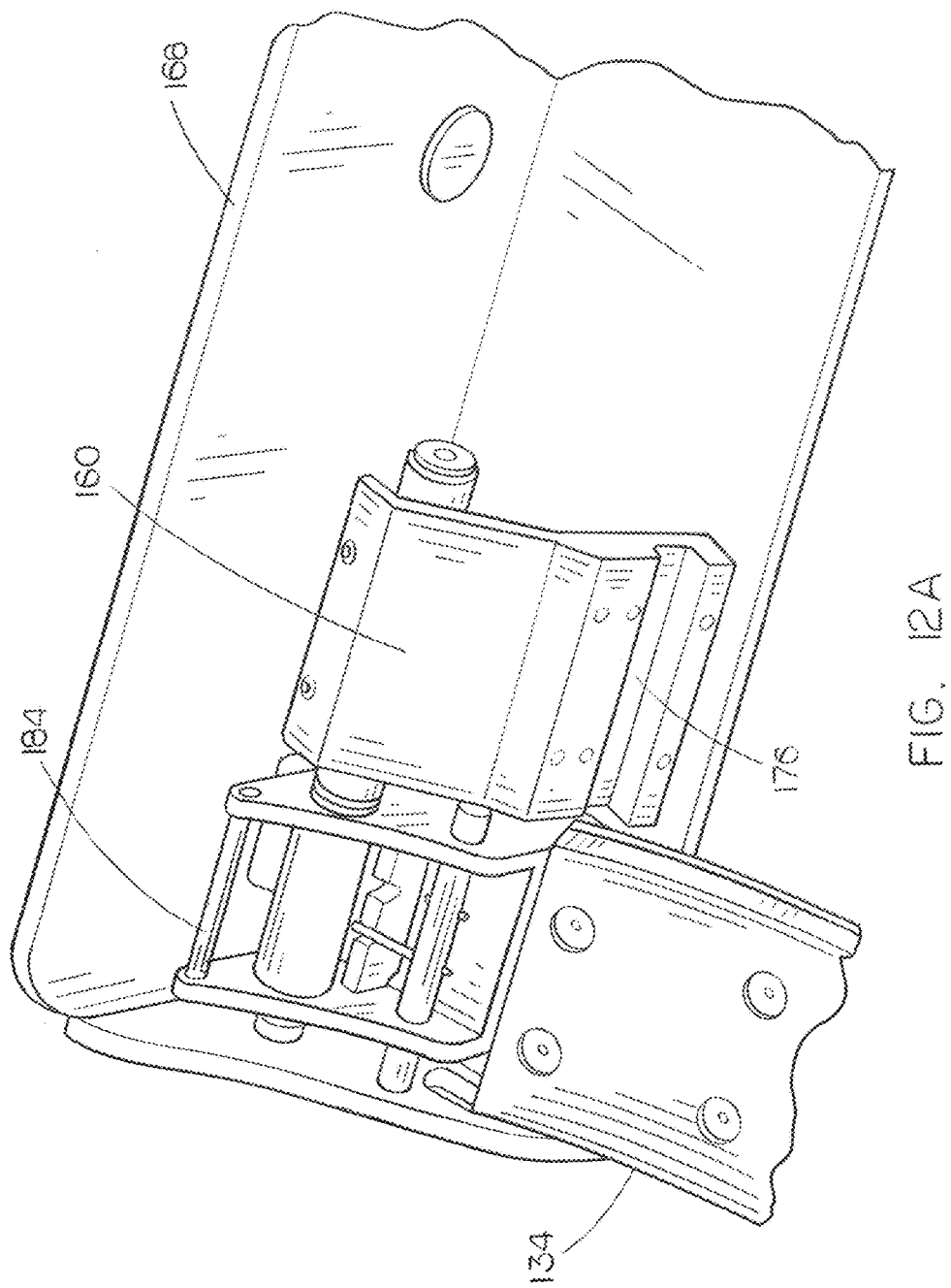

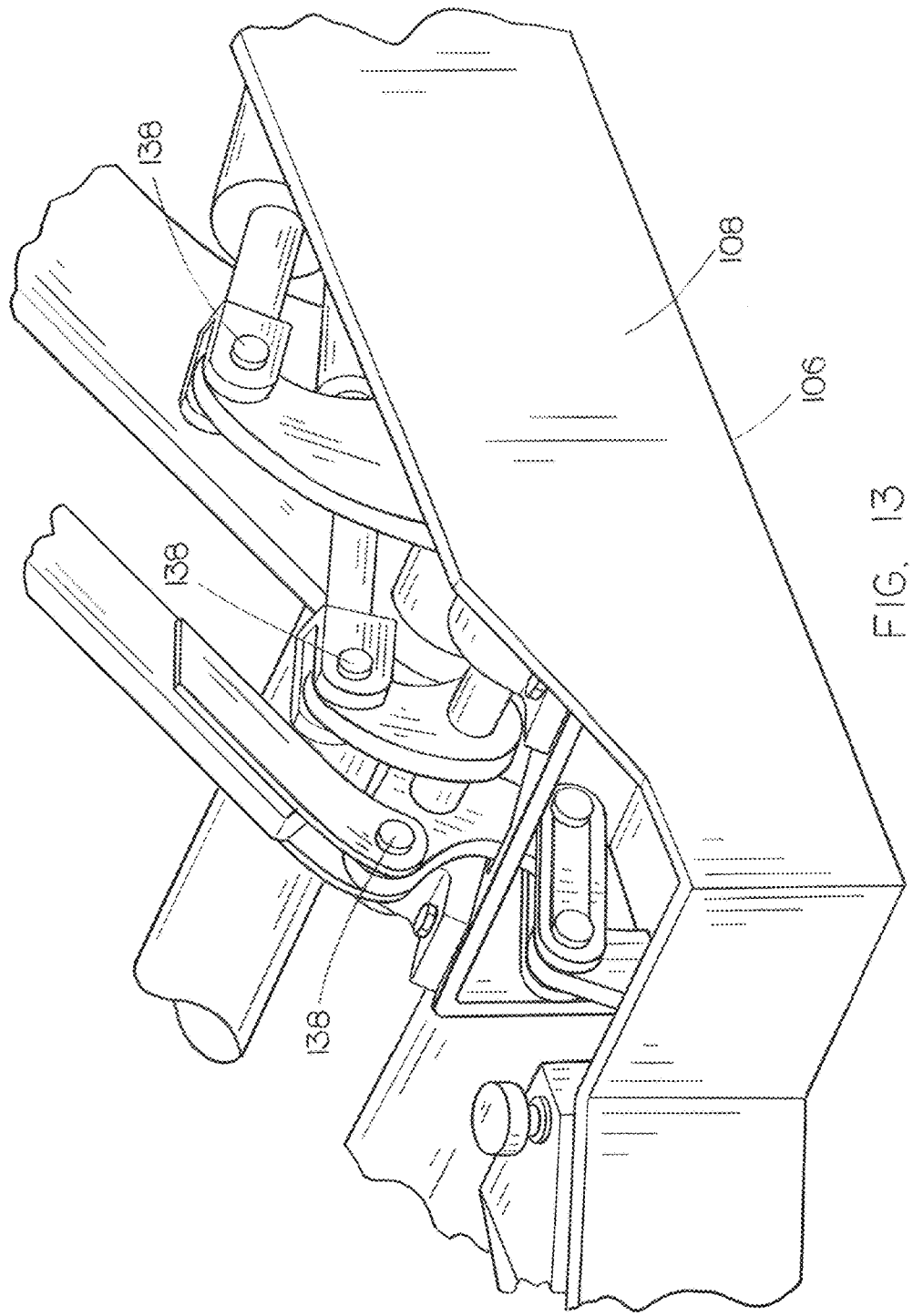

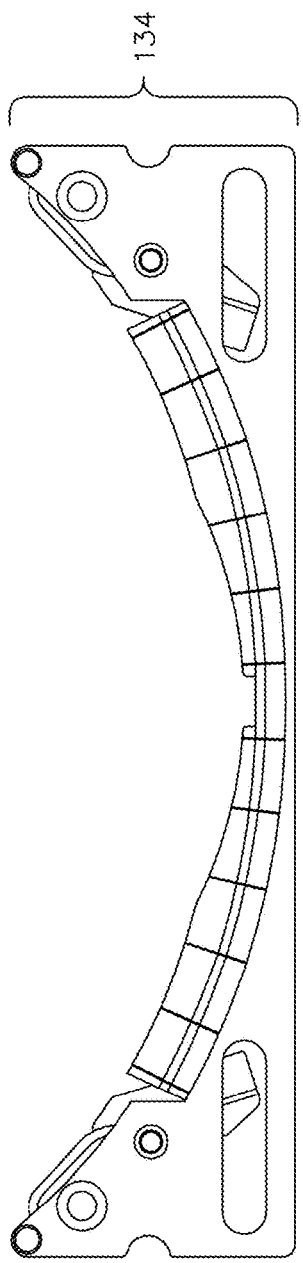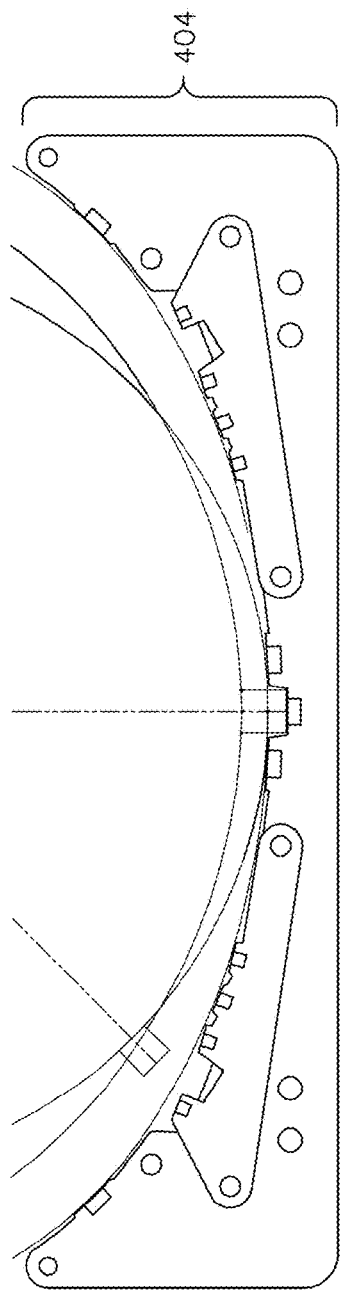
FIG. 31A
FIG. 31B

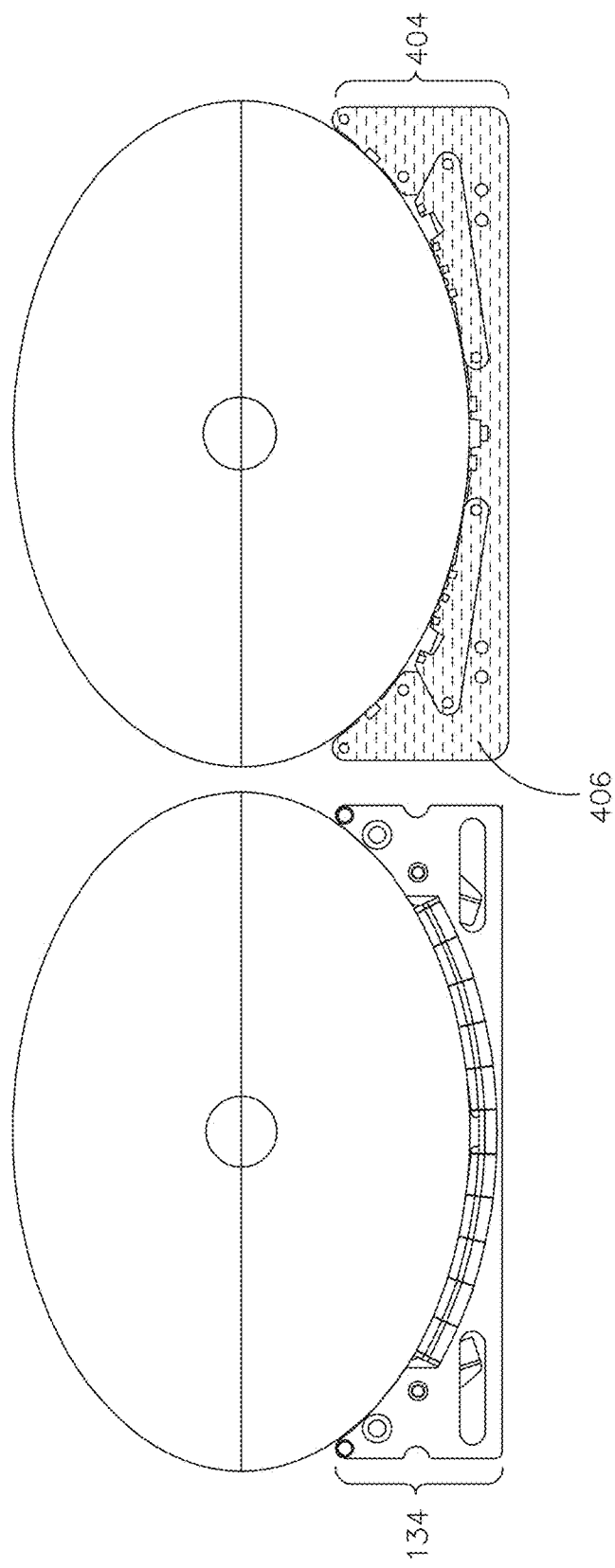

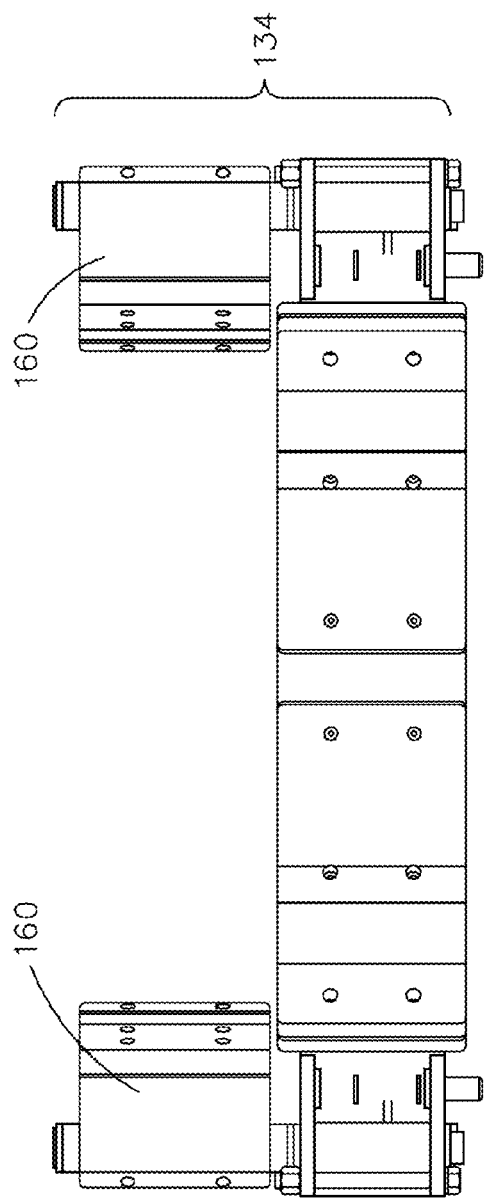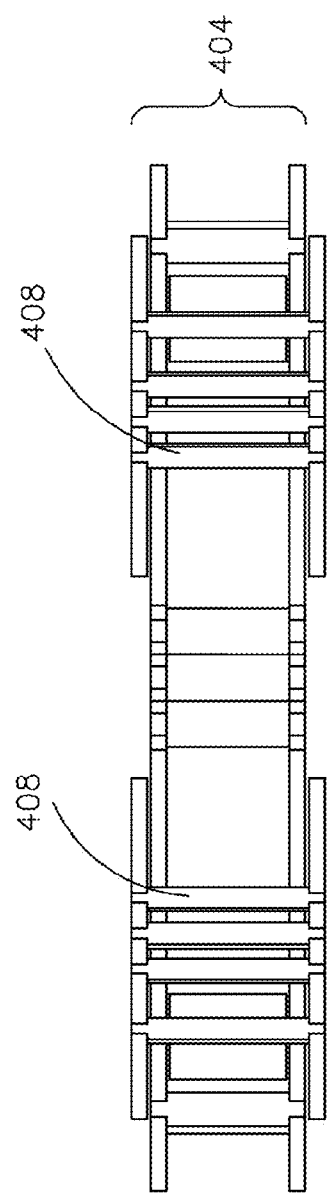
FIG. 34A
FIG. 34B

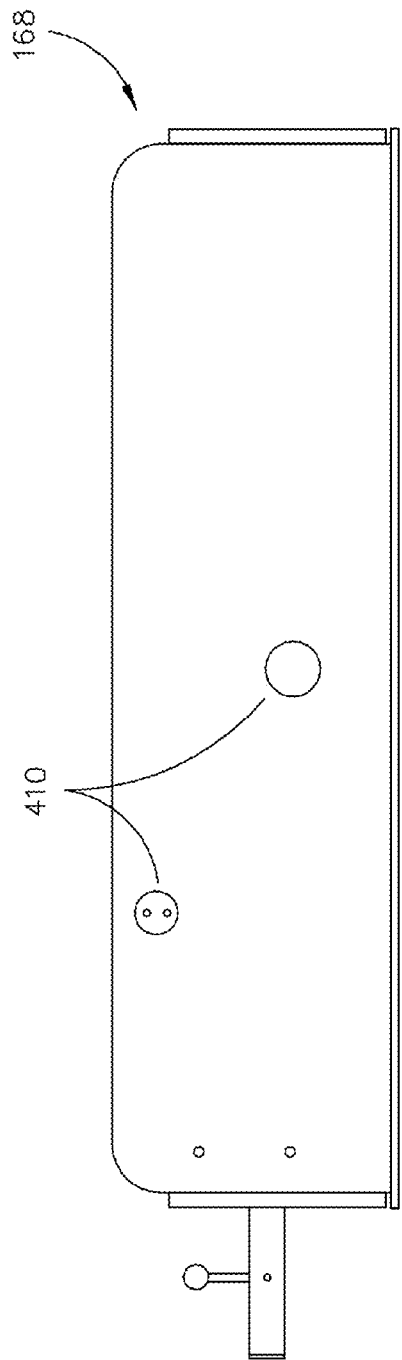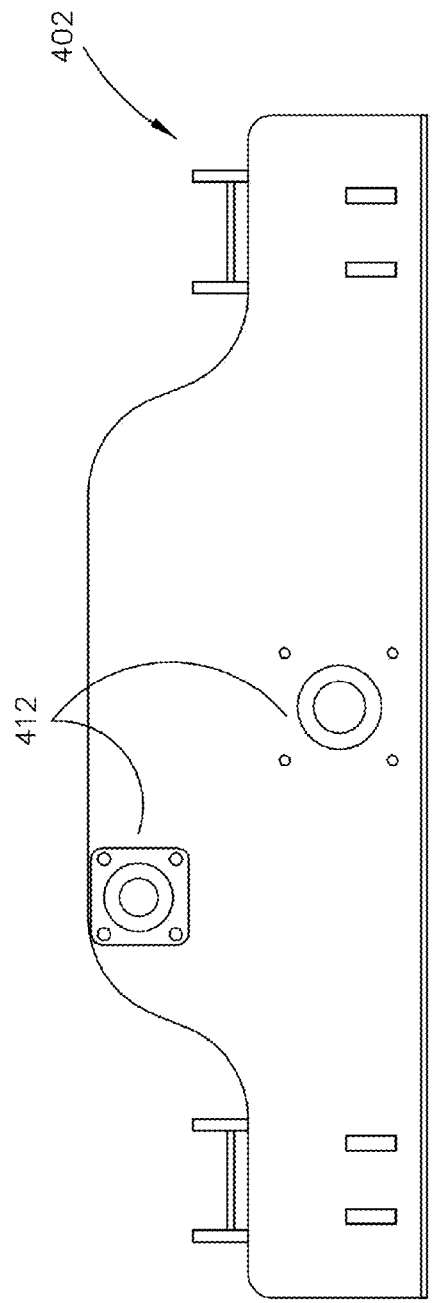

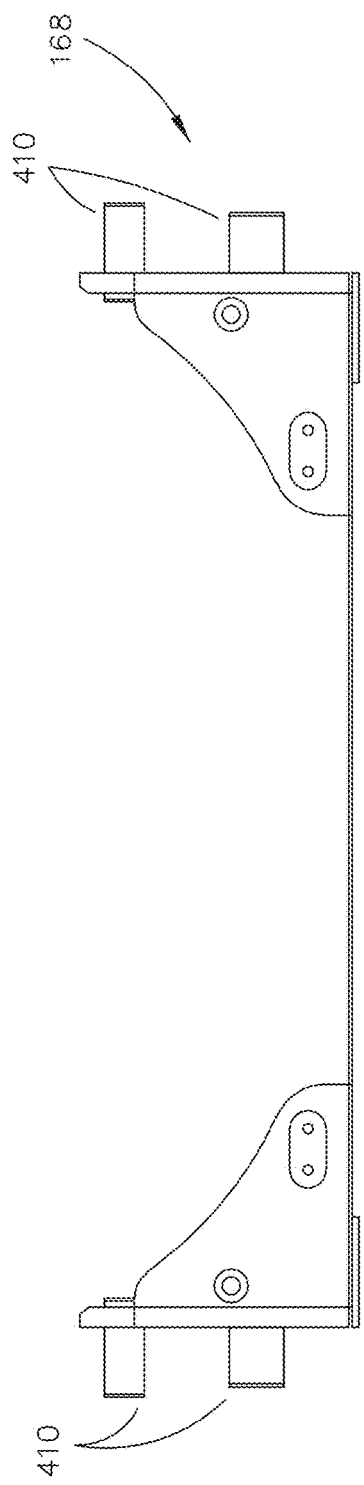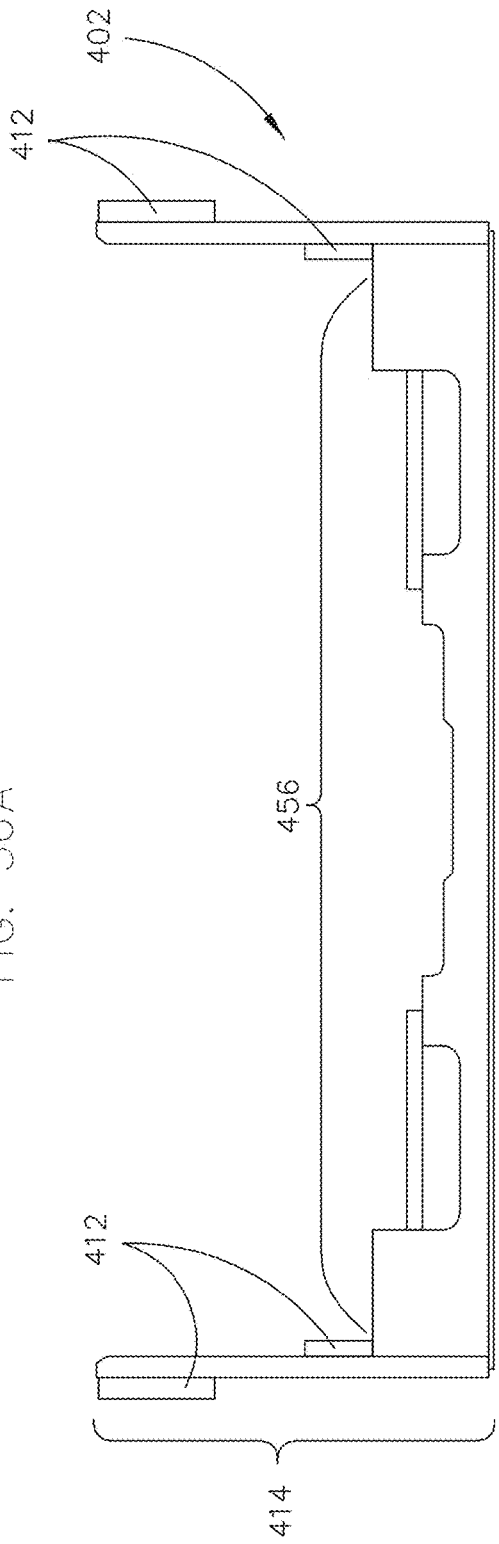

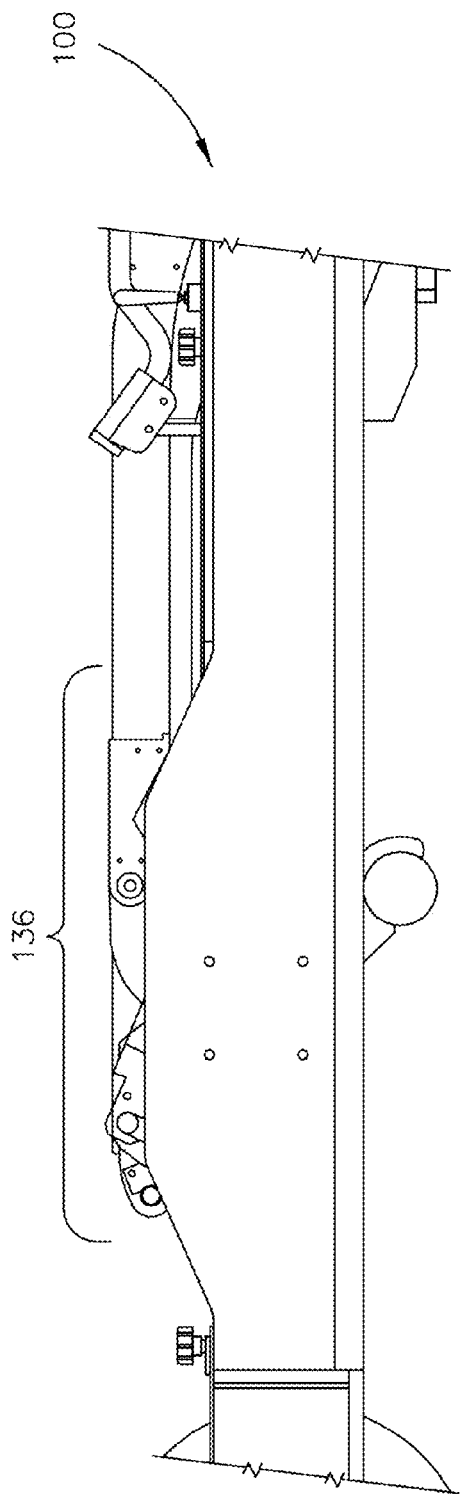
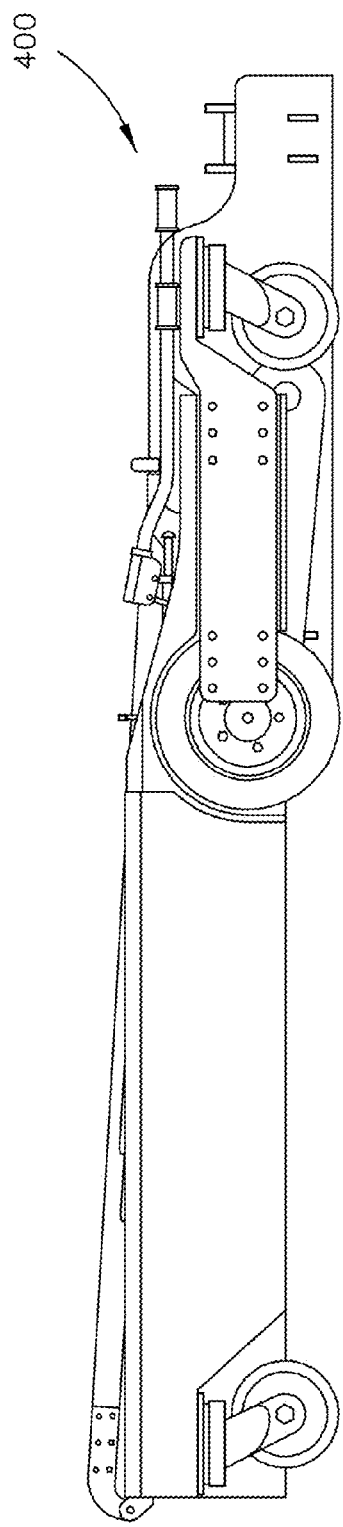
FIG. 37A
FIG. 37B

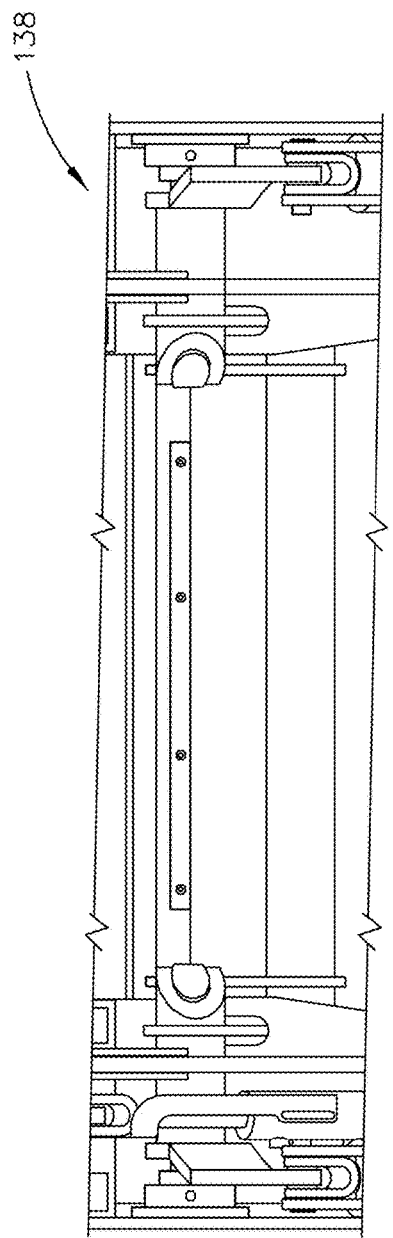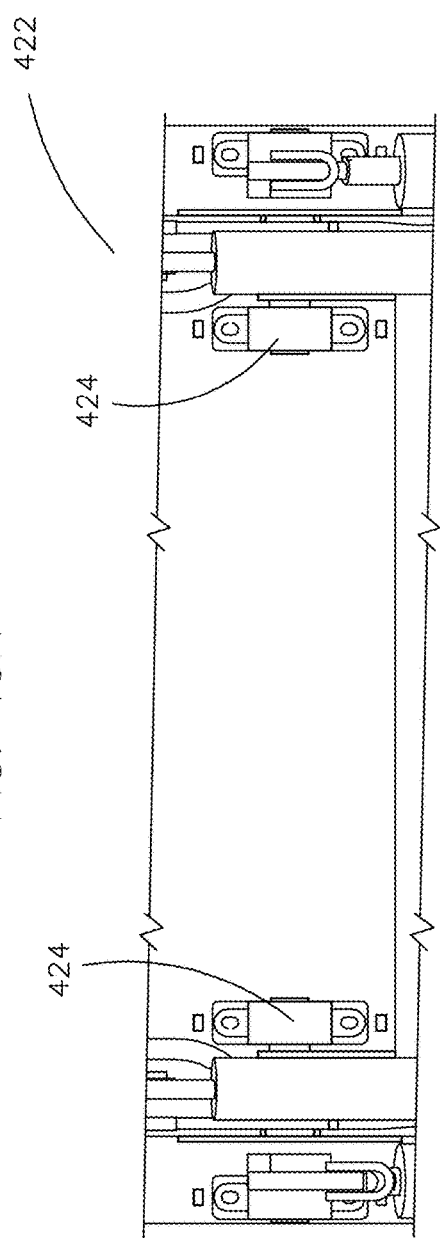
FIG. 40A
FIG. 40B

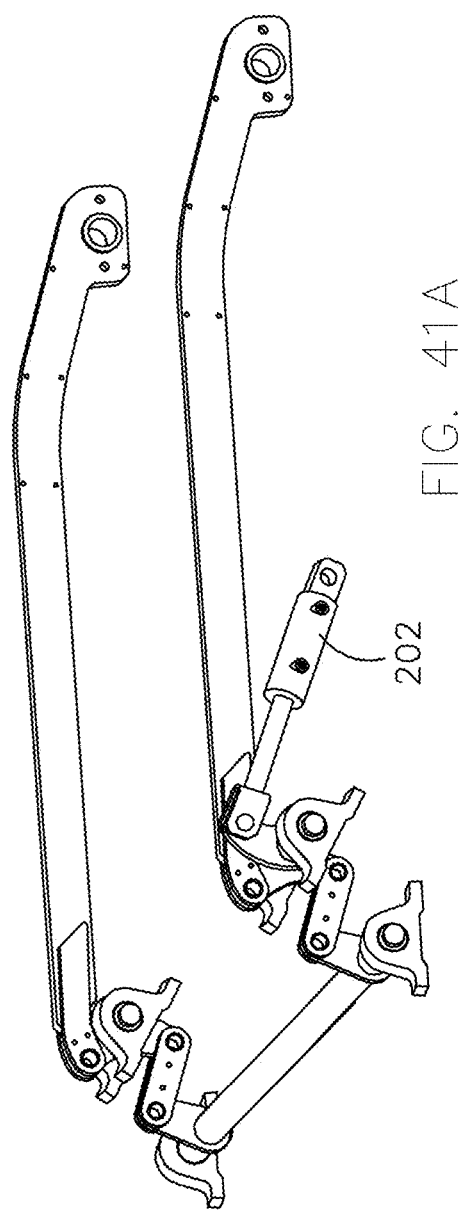
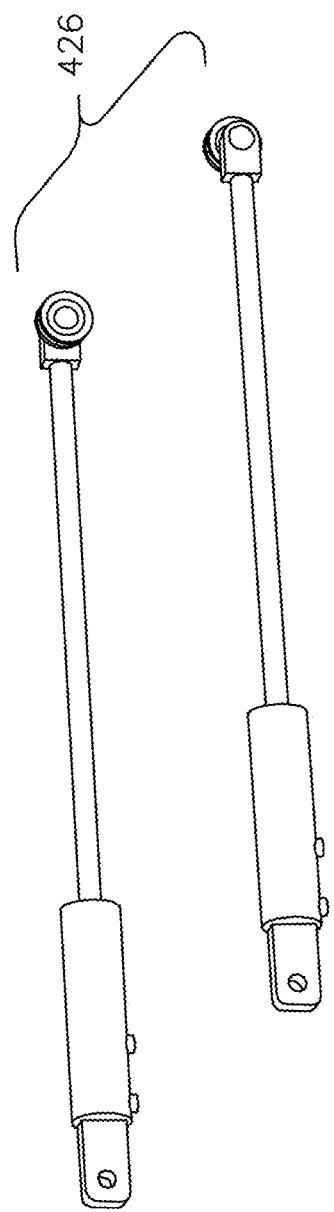
FIG. 41A
FIG. 41B

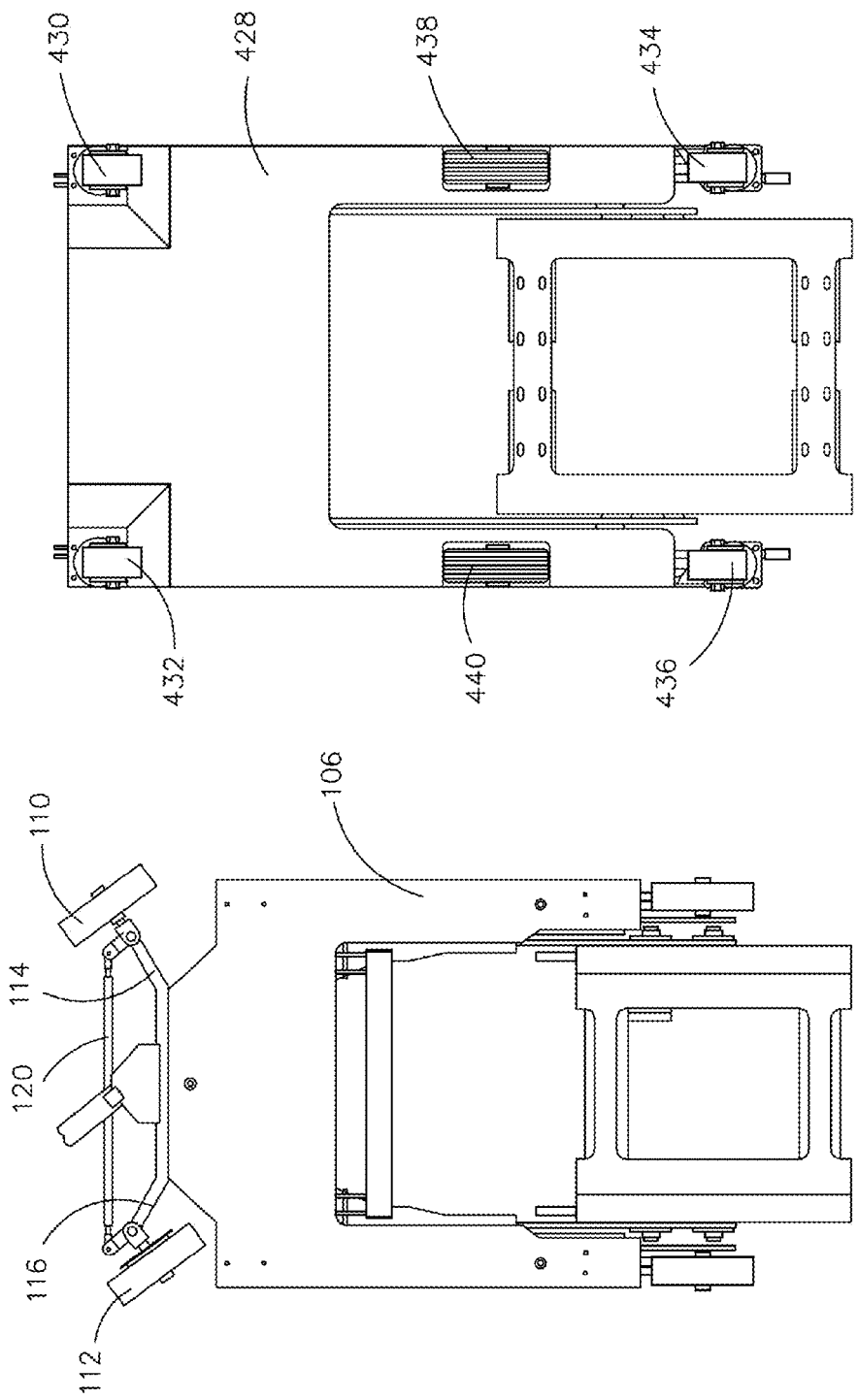

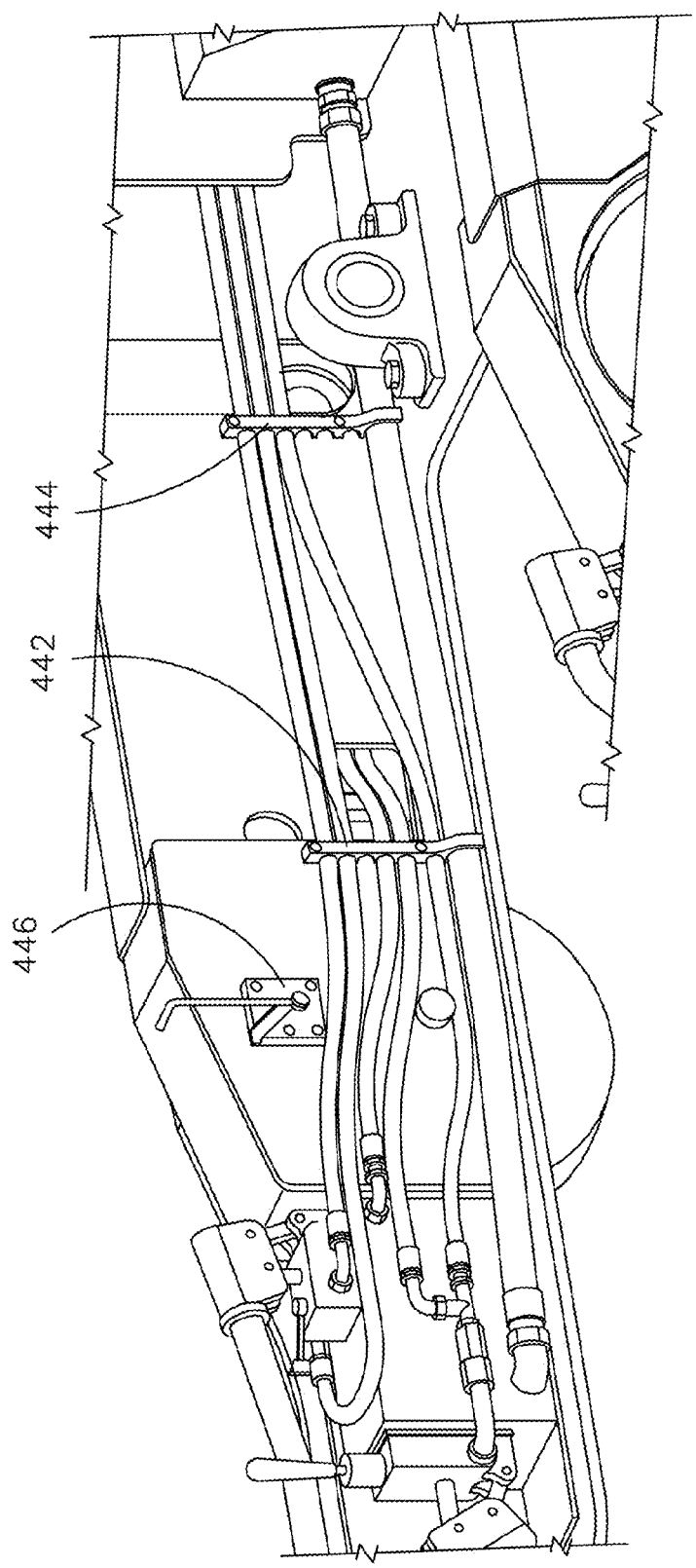

REINFORCED UNIVERSAL AIRCRAFT MULE

This application is a related application of U.S. Pat. No. 8,602,713, issued on Dec. 10, 2013, titled "UNIVERSAL AIRCRAFT MULE", listing Lawrence B. Davis and Karl Steven Schmoeckel as inventors, which is hereby incorporated by reference in its entirety, and is a continuation-in-part application of U.S. Pat. No. 9,315,137, issued on Apr. 19, 2016, titled "UNIVERSAL AIRCRAFT MULE", listing Lawrence B. Davis and Karl Steven Schmoeckel as inventors, which is hereby incorporated by reference in its entirety.

BACKGROUND

Aircraft, especially military aircraft, are often equipped with auxiliaries. Such auxiliaries include fuel tanks (drop tanks), ordinance, drone, sensor pods, storage, and the like. Generally, such auxiliaries are configured to be carried on the fuselage belly or the underside of the wings. It will be appreciated that different aircraft have different dimensions and auxiliary needs. Thus, it is known in the art to provide a specialized cart for use in transporting and facilitating the installation/removal of a particular auxiliary on a particular aircraft.

As aircraft are configured for different missions auxiliaries designed for a particular aircraft and a particular mission are typically removed from storage and transported to an aircraft via a specially configured mule. Such a specially configured mule is designed to carry a single mission specific auxiliary for fitment at a particular location on a particular model of aircraft.

In an operating theater it is not uncommon for a diverse group of aircraft including different models of aircraft designed and configured for different missions to be operated from a single location. This requires the storage of various aircraft, various auxiliaries, and various mules. Additionally, personnel trained in aircraft configuration techniques for each aircraft, auxiliary, and mule must be available. This requires additional storage and operating space, theater equipment transport effort and logistics, personnel and training, and planning.

Existing designs and implementations of fuel tank transports (e.g., aircraft mules) may be limited with respect to a run-away angle and an amount of force that may be applied at either end of a load/fuel tank during receiving, loading, and/or unloading of the load/fuel tank. For example, assuming an elliptically shaped fuel tank, with two opposing ends along the major axis and a fuel tank that is less than full (e.g., half full), unless the tank is completely level during receiving, loading, and/or unloading, the fuel will shift from one end of the fuel tank to another end of the fuel tank during loading, unloading, and/or transport. The shift creates extra force applied to one end of the tank due to the combined weight of the fuel and gravitational forces. Additional forces (e.g., momentum) may also add to the extra force applied at one end of the tank if the transport is moving and/or stopping or if the fluid is in motion. If the run-away angle is not compensated for, the force applied at one end may be too great, resulting in potential tipping, significant wear-and-tear to transport components (e.g., hydraulic lift and/or tilt system), and possibly failure of components.

SUMMARY

Embodiments of the present disclosure provide a universal aircraft mule for readily and rapidly universally transporting, removing and installing auxiliaries of different sizes and configurations at various locations on different aircraft. Embodiments of the universal aircraft mule may lift and transport auxiliary loads with different masses, centers of gravity, lengths, and widths. Embodiments of the universal aircraft mule are capable of operating in small and confined spaces without damaging aircraft components and without unduly endangering personnel.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 1A and 1B are perspective views of a universal aircraft mule carrying a 600 gallon auxiliary fuel tank (A-10 Thunderbolt, Sargent-Fletcher belly tank) in a mid-height lifted position, according to inventive concepts of the present disclosure;

FIG. 2 is a side elevation of a universal aircraft mule carrying a 600 gallon auxiliary fuel tank in a partially tilted and substantially fully lifted position, according to inventive concepts of the present disclosure;

FIG. 10 is a top plan view of a universal aircraft mule showing a 600 gallon drop tank in broken lines where the tank is a fully lowered skewed position, according to inventive concepts of the present disclosure;

FIGS. 11A, 11B, and 11C are perspective detailed views of the cradle and skew assembly of a universal aircraft mule, according to inventive concepts of the present disclosure;

FIGS. 12A and 12B are perspective detailed views of the non-rotation stabilizer of the cradle of a universal aircraft mule, according to inventive concepts of the present disclosure;

FIG. 13 is a detailed perspective view of the hydraulic lift and tilt assembly of a universal aircraft mule, according to inventive concepts of the present disclosure;

FIGS. 31A and 31B are side perspective views of lateral floating carriages and skew assemblies, according to inventive concepts of the present disclosure;

FIGS. 32A and 32B are side perspective views of lateral floating carriages and skew assemblies, according to inventive concepts of the present disclosure;

FIGS. 34A and 34B are top perspective views of portions of lateral floating carriages and skew assemblies, according to inventive concepts of the present disclosure;

FIGS. 35A and 35B are side perspective views of cradles, according to inventive concepts of the present disclosure;

FIGS. 36A and 36B are front perspective views of skew assemblies and bearing/bushing assemblies, according to inventive concepts of the present disclosure;

FIGS. 37A and 37B are side perspective views of rollable frames of embodiments of universal aircraft mules, according to inventive concepts of the present disclosure;

FIGS. 40A and 40B are top perspective views of one or more pivotable connection points, according to inventive concepts of the present disclosure;

FIGS. 41A and 41B are side perspective views of hydraulic tilt systems, according to inventive concepts of the present disclosure;

FIGS. 42A and 42B are bottom perspective views of rollable frames of embodiments of universal aircraft mules, according to inventive concepts of the present disclosure;

FIG. 43 is an inside-side perspective view of a rollable frame, brackets, and brake system, according to inventive concepts of the present disclosure;

Figure 1A:
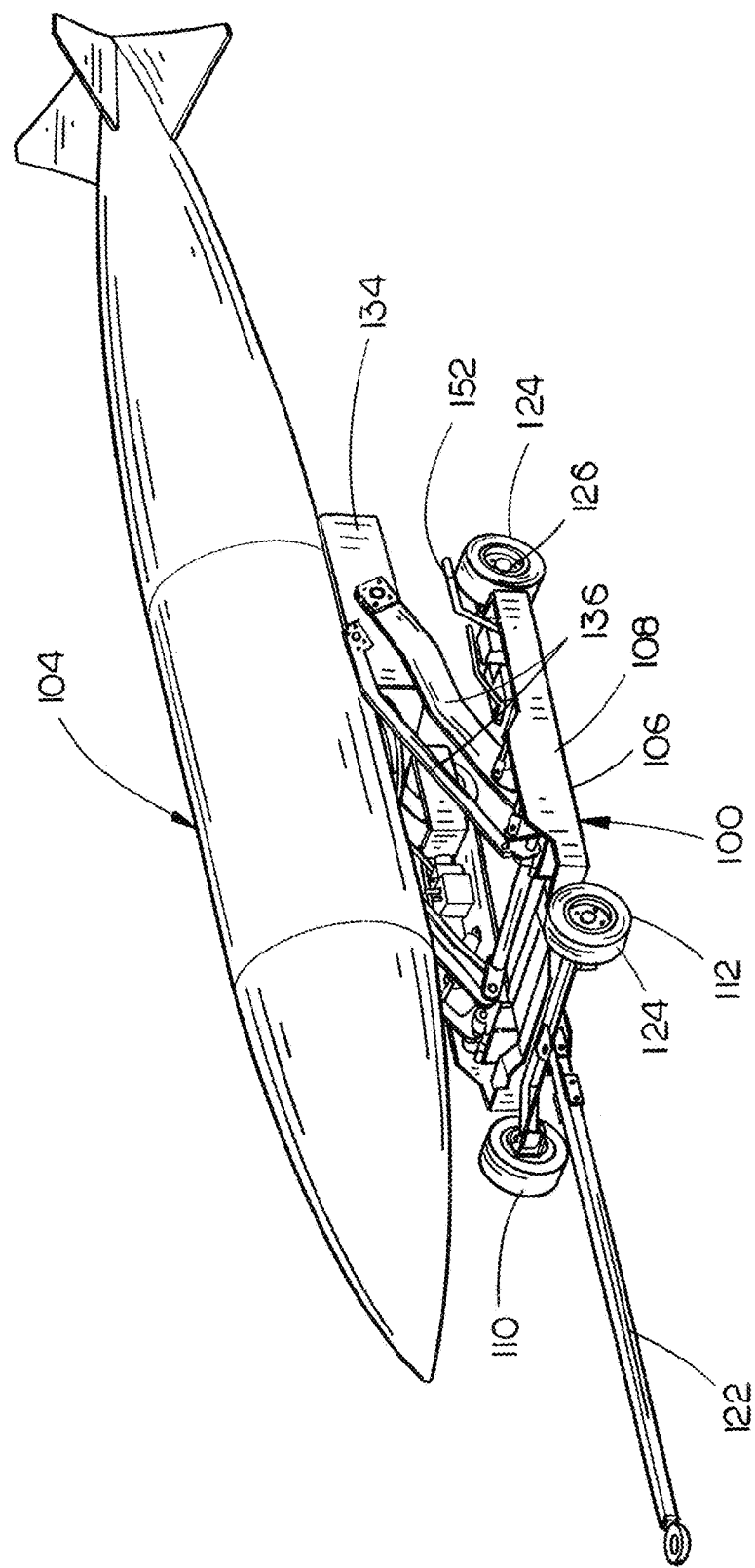
Figure 3:
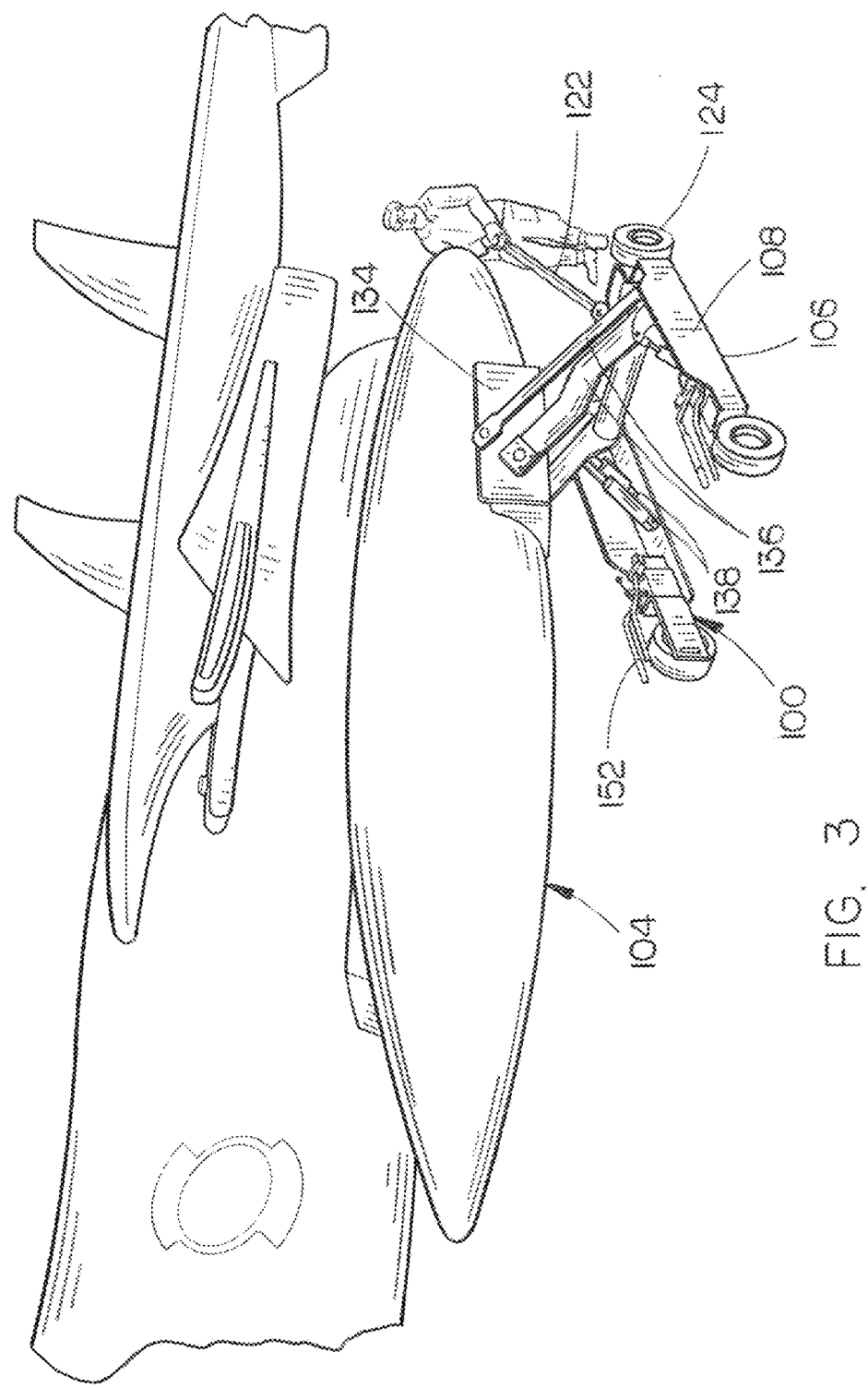
FIG. 3 is a perspective view of a universal aircraft mule carrying an auxiliary wing fuel tank (F-15 Eagle) in an aligned partially lifted position, according to inventive concepts of the present disclosure.
Figure 4:
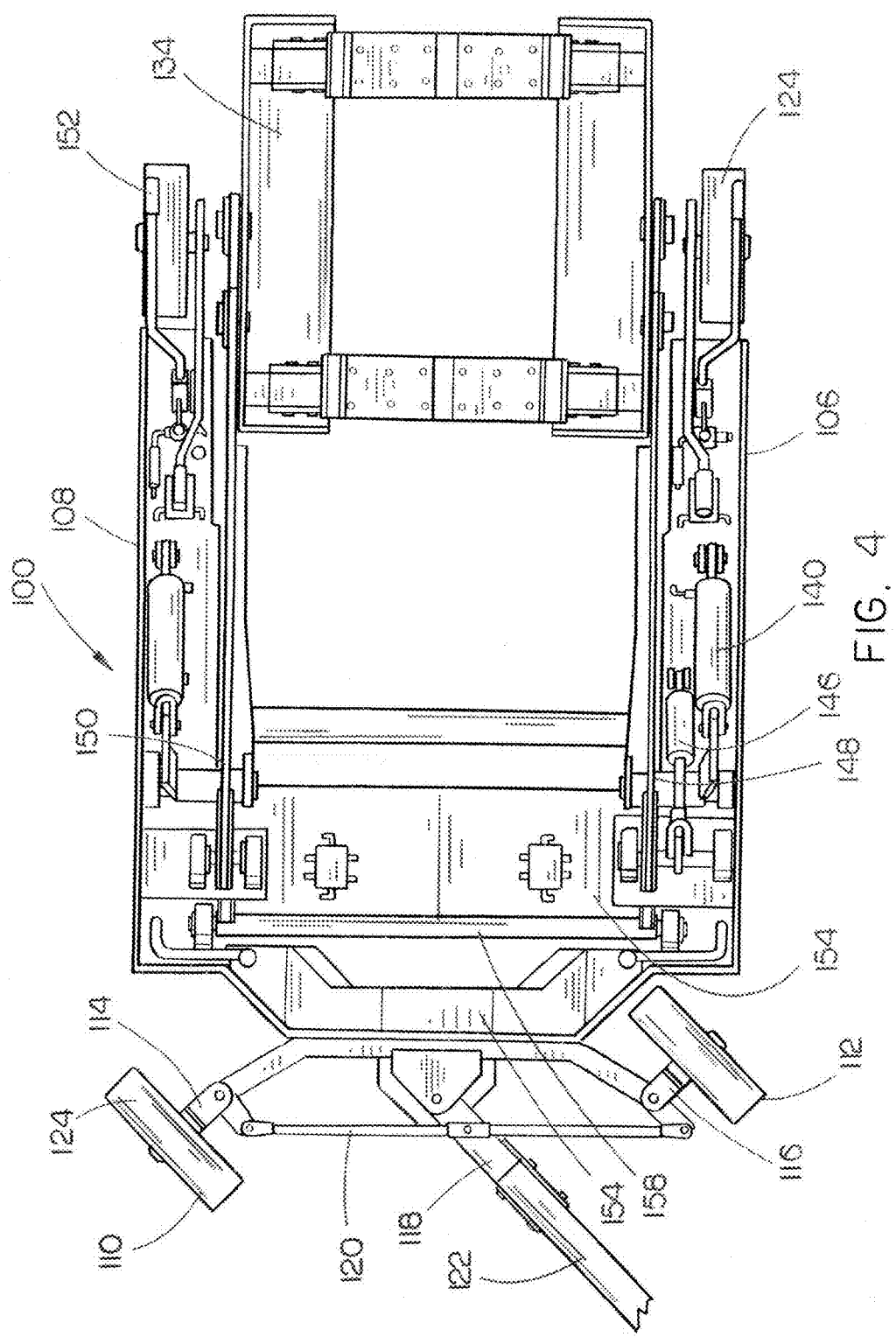
FIG. 4 is a top plan view of a universal aircraft mule illustrating the steering assembly, lifting and tilting mechanisms, the cradle and skewing assembly, and the hydraulic system, according to inventive concepts of the present disclosure.
Figure 5:
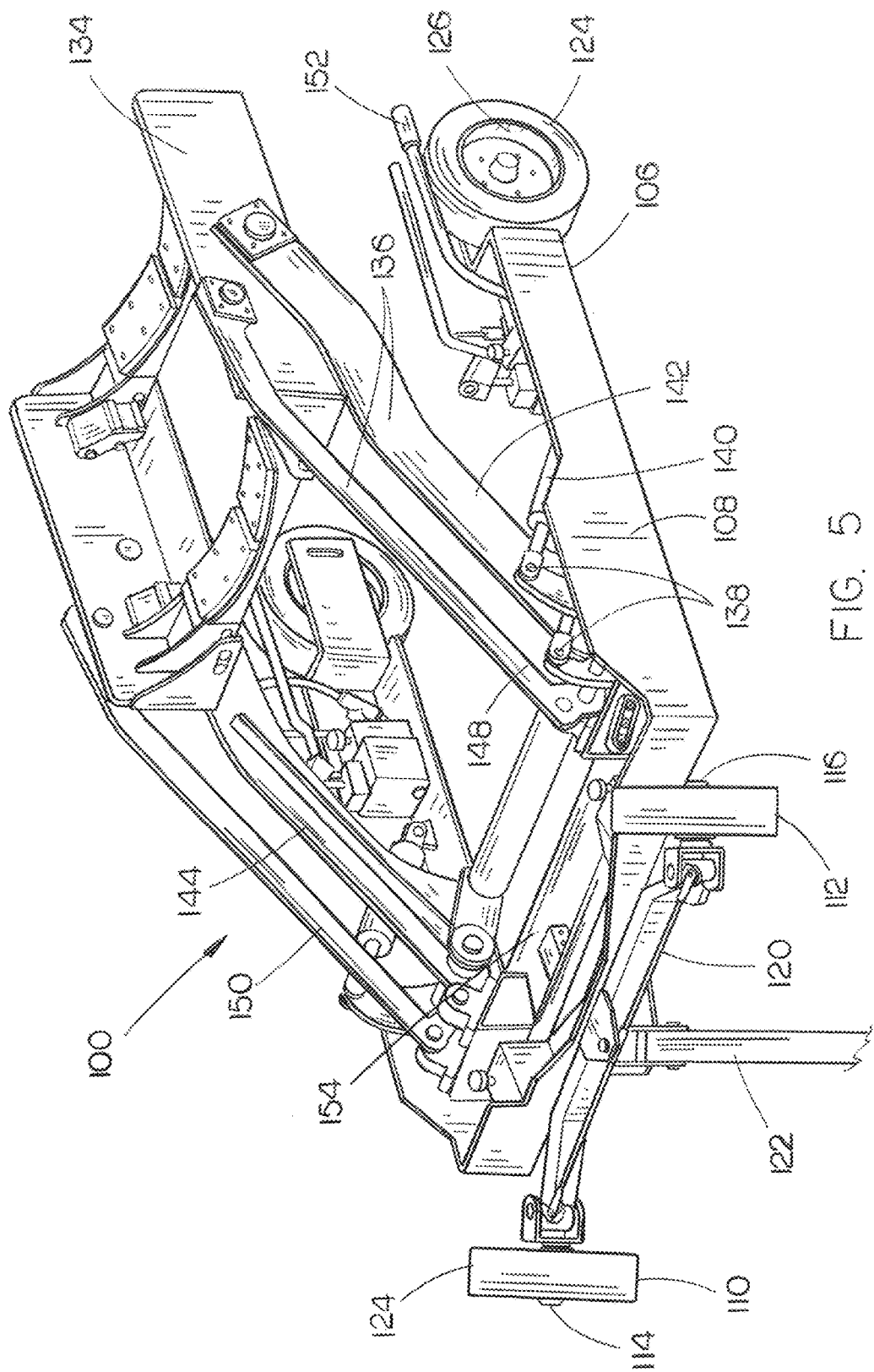
FIG. 5 is a perspective top view of a universal aircraft mule in a partially lifted position, according to inventive concepts of the present disclosure.
Figure 6:
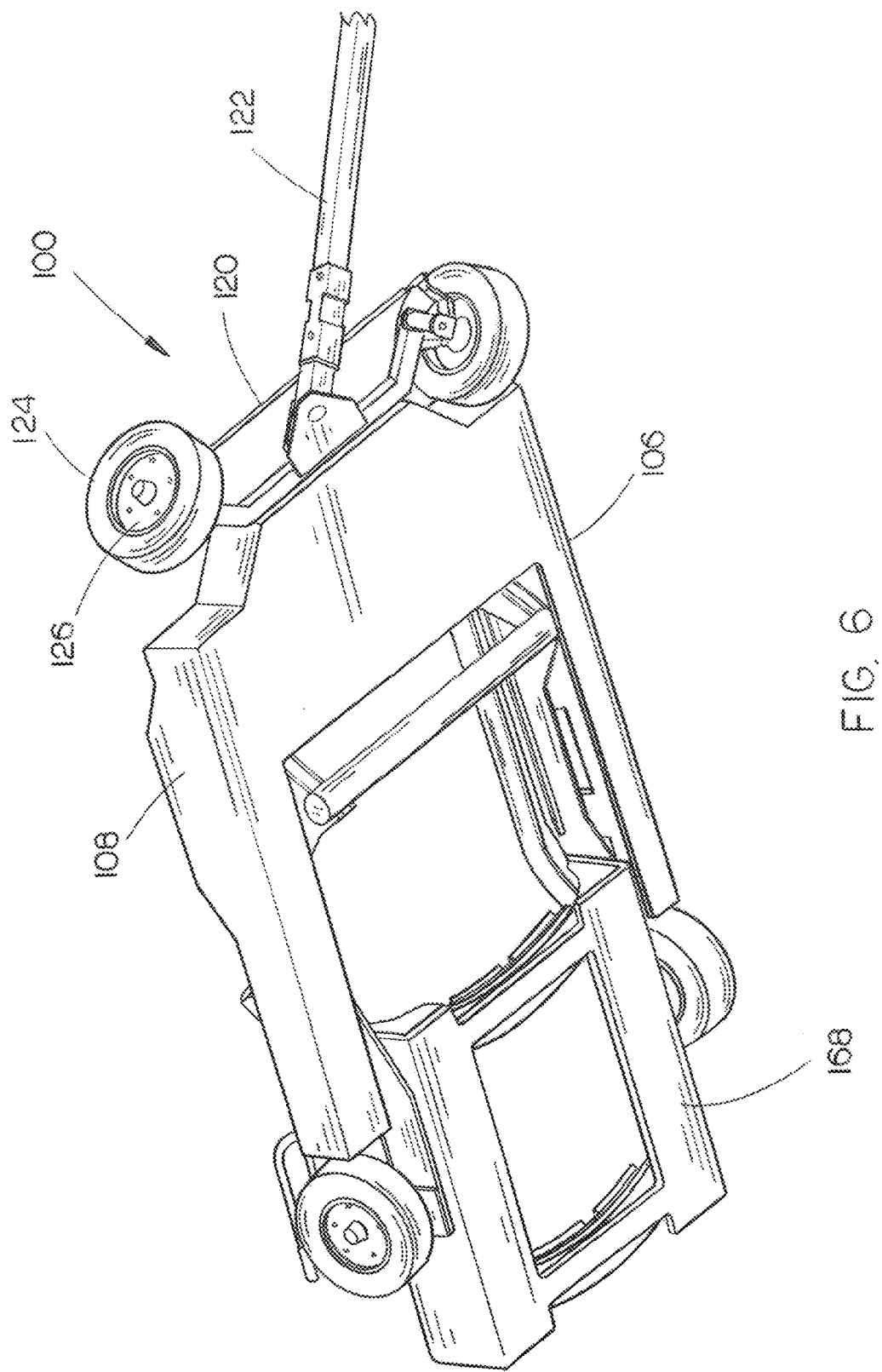
FIG. 6 is a perspective bottom view of a universal aircraft mule illustrating the non-sparking skid, steering assembly, and the mule's flat low profile and lifting assembly for providing a near ground height to over approximately 1.5 meter lift envelope, according to inventive concepts of the present disclosure.

REFERENCE NUMERAL KEY universal aircraft mule 100
mechanized storage assembly 102
aircraft tank 104
rollable frame 106
side stabilizers 107
non-sparking skid plate 108
pair of wheels 110 and 112
pair of axles 114 and 116 steering arm 118
tie rod 120
steerable tow bar 122
tire 124
split rim 126
parking brake assembly 128
brake plate 130
spring-loaded pin 132
lateral floating carriage 134
lift linkage 136
pivotable connections 138
first hydraulic cylinder 140
aft port lifting bar 142
aft starboard lifting bar 144
second hydraulic cylinder 146
fore port tilting bar 148
fore starboard tilting bar 150
pump bar 152
central hydraulic reservoir 154
fluid level indicator 156
torsional load stabilizer 158
anti-rotation stabilizers 160
tank metering valve 162
pallet 164
transport height locking device 166
cradle 168
mule guide 170
tilt indicator 172
cradle spacer 174
stabilizer slots 176
tilt hydraulic reservoir 180
counter balance 182
cradle spacer lock 186
load recess 188
tilt direction control 190
descent rate controller 192
pivot bearings 194
pivot slots 196
pressure relief valve 198
second hydraulic system (tilting) 200
tilt cylinder 202
first and second counter balance 204, 206
first and second gauge isolator 208, 210
first hand pump 252
second hand pump 254
first hydraulic system (lifting) 300
lifting cylinder 302
velocity fuse 304
first and second compensators 306, 308
first lift hand pump 310
second lift hand pump 312
first and second lift gauge isolators 314, 316
universal aircraft mule 400
cradle 402
lateral floating carriage 404
rubber coating 406
anti-rotation stabilizers 408
lift/tilt points 410
lift/tilt points 412
pivotable connections 414
aft port lifting bar 416
aft starboard lifting bar 418
removable/interchanging plates 420
pivotable connections 422
additional bearings 424
first and second hydraulic cylinders 426
rollable frame 428
first front pair of casters 430 and 432
second rear pair of casters 434 and 436
pair of fixed wheels 438 and 440
brackets 442 and 444
braking system 446
goose-necked steerable tow bar 448
coupling ring 450
lifting cylinder 452
side guard 454
support structures 456

DETAILED DESCRIPTION OF EXEMPLARY
EMBODIMENTS

Reference will now be made in detail to the subject matter disclosed, which is illustrated in the accompanying drawings. The scope of this disclosure is limited only by the claims; numerous alternatives, modifications and equivalents are encompassed. The use of "or" is meant to be inclusive, unless otherwise indicated. Additionally, when used herein to join items in a list, "or" denotes "at least one of the items," but does not exclude a plurality of items in the list. For the purpose of clarity, technical material that is known in the technical fields related to the embodiments has not been described in detail to avoid unnecessarily obscuring the description.

Accordingly, while the present invention is described in detail in relation to one or more embodiments, it is to be understood that this disclosure is illustrative and exemplary of the present invention, and is made merely for the purposes of providing a full and enabling disclosure of the present invention. The detailed disclosure of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

"Run-away angle" as used herein means an angle at which safe transport, loading, and/or unloading of a fuel tank is not guaranteed due to increased strain on one or more components of the aircraft mule. For example, assuming a level (e.g., with respect to a ground surface) elliptical fuel tank and a first axis parallel to the major axis of the level elliptical fuel tank and a second axis perpendicular to the first axis, and assuming a transport (e.g., aircraft mule) meant to carry, load, and/or unload a substantially level (e.g., substantially transverse-oriented) fuel tank, the run-away angle would be the angle at which the fuel tank is rotated (e.g., azimuthally) with respect to the second axis such that safe transport, loading, and/or unloading could not be guaranteed. A run-away angle is affected in part by a dimension of a universal aircraft mule (e.g., length of the aircraft mule's cradle) as compared to a dimension of the load the aircraft mule is meant to carry (e.g., length along a major axis of an elliptical fuel tank).

"Transport surface" as used herein means a surface upon which an aircraft mule operates, including receiving/loading, transporting, and/or unloading of a load (e.g., auxiliary fuel tank).

Embodiments of the present disclosure provide a universal aircraft mule and system for loading/unloading and storing auxiliaries, which may be utilized for multiple aircraft and multiple auxiliaries. Embodiments of the universal aircraft mule disclosed herein compensate a run-away angle (e.g., compensate by applying opposing forces and/or increase an angle at which a less-than-full fuel tank may be tipped and still maintain safe loading, unloading, and/or transport).

Embodiments of the universal aircraft mule, as compared to existing designs and implementations, have an increased turning radius (e.g., turn radius resembling that of a single axle trailer), an increased structural integrity for prolonging a working life of the universal aircraft mule, reinforced components to increase lifting/tilting capacity and/or compensate run-away angle, increased accessibility for maintenance repairs, increased surface areas that create frictional forces between the auxiliary and the aircraft mule, a simplified design, and an improved visual/aesthetic appeal. Embodiments of the universal aircraft mule disclosed herein increase an amount of torque which must be applied in order to rotate a load (e.g., fuel tank) being received, transported, and/or unloaded.

Generally, embodiments of the universal aircraft mule disclosed herein, increase the overall safety of receiving, transporting, and/or unloading loads (e.g., fuel tanks) as compared to existing designs and implementations.

Referring now to FIGS. 1A through 47, embodiments of a universal aircraft mule 100 and 400 are described. Embodiments of the universal aircraft mule (e.g., 100 or 400) may be utilized for both lifting and tilting an auxiliary wing and/or an auxiliary fuselage tank, and for moving and positioning the auxiliary wing/auxiliary fuselage tank for storage and/or for mounting on the body of an aircraft. For example, embodiments of the universal aircraft mule may be utilized in an aircraft component storage facility. The storage facility may include a device, such as a mechanized storage assembly 102, or the like, for sequentially presenting an auxiliary wing and/or an auxiliary fuselage tank to the universal aircraft mule (e.g., 100 or 400).

Referring now to FIGS. 1A-6, an exemplary embodiment of the universal aircraft mule 100 may include a cradle 168 for lifting and pointing an aircraft tank 104 supported by the cradle 168. The aircraft tank 104 may be pointed in a direction (e.g., horizontal) for receiving by an aircraft having a structure configured for removably receiving the aircraft tank 104.

An exemplary embodiment of the universal aircraft mule 100 includes a rollable frame 106. In some embodiments, the rollable frame 106 includes a non-sparking skid plate 108. For example, the non-sparking skid plate 108 may include one or more composite friction pads for non-sparking engagement with a paved surface supporting the rollable frame 106. A paved surface may include an asphalt surface, a concrete surface, or the like. The rollable frame 106 is movably steerable in both a first direction (e.g., forwards) and a second direction opposing the first direction (e.g., backwards).

Referring now to FIG. 1B, an exemplary embodiment of the universal aircraft mule is configured with one or more side stabilizers 107. In some embodiments a side stabilizer 107 is attached to a single surface of the universal aircraft mule. In other embodiments, multiple side stabilizers 107 are attached to multiple surfaces of the universal aircraft mule. It is noted that while FIG. 1B depicts side stabilizer 107 attached to an exterior portion of the port side of the rollable frame 106, this depiction is not limiting. For example, the side stabilizer 107 may be attached to an interior portion of the rollable frame 106, while rollable frame 106 is configured with a cut-out portion for the side stabilizer to be rotated out from and into a stabilizing position. By way of another example, the side stabilizer 107 may be attached to a fore side surface or an aft side surface of the rollable frame 106. In some embodiments, the rollable frame 106 may have a depression for housing the side stabilizer when it is against the frame 106 (i.e., when it is not in a stabilizing position) to ensure that the side stabilizer 107 does not protrude beyond the width of the frame when it is not being used. In an exemplary embodiment, the side stabilizer includes an attachment plate 107a, an extension arm 107b, a threaded portion 107c, and a foot 107d. The foot 107d may be extended or retracted, adjusting a height of the side stabilizer 107, via a rotation of the threaded portion 107c. It is noted that implementing side stabilizer 107 may contribute to compensating a run-away angle in the universal aircraft mule 100.

An exemplary embodiment of the universal aircraft mule 100 includes a steering mechanism attached to the rollable frame 106 for movably steering the frame. In embodiments, the steering mechanism may include a pair of wheels 110 and 112 and a pair of axles 114 and 116. Each wheel of the steering mechanism is rotationally connected to the rollable frame 106 via one of the axles. Further, each wheel is connected to a steering arm 118 via a tie rod 120. The steering arm may be coupled with a tow bar (e.g., steerable tow bar 122) for turning, pushing, and/or pulling the universal aircraft mule 100. In embodiments, the steerable tow bar 122 may be fabricated from a strong, light-weight material, such as aluminum, a composite material, or another material, such as an alloy with a high strength-to-weight ratio. Each wheel may include a solid rubber tire 124 and a split rim 126.

An exemplary embodiment of the universal aircraft mule 100 may also include a parking brake assembly 128. The parking brake assembly 128 may be associated with one or more of the wheels (e.g., wheel 112). In embodiments, the parking brake assembly 128 may include a brake plate 130 associated with wheel 112 and a spring loaded pin 132 lockingly engageable with the brake plate 130. Thus, the spring loaded pin 132 may be engaged with the brake plate 130 for locking the wheel 112 in place and preventing unwanted movement of the universal aircraft mule 100.

An exemplary embodiment of the universal aircraft mule 100 includes a lift assembly attached to the rollable frame 106. The lift assembly includes a cradle 168 having a first side, a second side, a front, and a back. The cradle 168 is operably attached to the lift assembly and configured for supporting an auxiliary fuel tank, such as aircraft tank 104. For example, the cradle 168 may include a lateral floating carriage 134 connected to the rollable frame 106 and supported by a lift linkage 136. In embodiments, the lift linkage 136 may be generally parallelogram-shaped. The lift linkage 136 of the lifting mechanism may be pivotally attached to the rollable frame 106 and positioned aft (i.e., behind) of the first wheel 110 and the second wheel 112. In embodiments, pivotable connections 138 may include bronze bearings and/or ball bearings.

For instance, the lift linkage 136 may include a first hydraulic cylinder 140 pivotally driving an aft port lifting bar 142 and an opposing aft starboard lifting bar 144. The aft port lifting bar 142 and the aft starboard lifting bar 144 are pivotably connected at aft positions to the first and second sides of the lateral floating carriage 134. The first hydraulic cylinder 140 is included with a first user operable hydraulic system for raising and lowering the cradle 168 between a first generally horizontal plane occupied by the rollable frame 106 and a second generally horizontal plane parallel to and separate from the first generally horizontal plane.

Further, the lift linkage 136 may include a second hydraulic cylinder 146 for pivotally driving (in generally parallel arrangement to the aft port lifting bar 142 and the aft starboard lifting bar 144) a fore port tilting bar 148 and a fore starboard tilting bar 150. The fore port tilting bar 148 and the fore starboard tilting bar 150 are pivotally connected to fore positions of the lateral floating carriage 134. The second hydraulic cylinder 146 is included with a second user operable hydraulic system for tilting the cradle 168 and adjusting an angle of the cradle 168 relative to the horizontal (e.g., an angle in relation to the first and second planes generally parallel to the generally horizontal plane occupied by the rollable frame 106).

An exemplary embodiment of the universal aircraft mule 100 includes hydraulic controls for each of the first and second user operable hydraulic systems. In embodiments, the hydraulic controls (e.g., pump bar 152) may be operated from either the port or starboard sides of the universal aircraft mule 100. The hydraulic controls may be fed with hydraulic fluid from a central hydraulic reservoir 154 positioned behind the first wheel 110 and the second wheel 112. The central hydraulic reservoir 154 may include a fluid level indicator 156.

Further, an exemplary embodiment of the universal aircraft mule 100 may include a hydraulic tilt lock for lockably controlling the amount of tilt for the cradle 168 in a given position. The hydraulic tilt lock may be operable under load at any tilt and height that may be accomplished by the lift linkage 136. The universal aircraft mule 100 may also include a torsional load stabilizer 158. In embodiments, the universal aircraft mule 100 is counter-balanced by the arrangement of the cradle 168 in relation to the rollable frame 106 along with physical counter-balance 182 providing a weighted balance toward the fore end of the universal aircraft mule 100. Additionally, the arrangement of the lateral floating carriage 134 allows the cradle 168 to be skewed (e.g., rotated from a direction parallel to a longitudinal axis of the frame) in a generally horizontal plane.

An exemplary embodiment of the lateral floating carriage 134 includes one or more anti-rotation stabilizers 160 for preventing substantial rotation of a load carried by the universal aircraft mule 100 (e.g., the aircraft tank 104). The first hydraulic system may include a height descent rate control (e.g., a tank metering valve 162) for adjustably controlling the rate at which the height of the cradle 168 is allowed to move in a vertical descent.

An exemplary embodiment of the universal aircraft mule 100 is utilized to transport any auxiliary. Herein and by example, the mule 100 is shown configured to transport a center tank, a wing tank, and/or an A-10 aircraft tank. Further, the universal aircraft mule 100 may include one or more optical (e.g., markings/indicia), mechanical (e.g., latches, tabs, and/or flanges), or electrical (e.g., switches/contacts) positional guidance mechanisms 270 for facilitating (e.g., guiding) loading and unloading of payloads on the universal aircraft mule 100 (e.g., from an aircraft, a storage facility, or the like).

An exemplary embodiment of the universal aircraft mule 100 is designed to stack with other universal aircraft mule 100 units along a vertical axis such that the longitudinal axes of the units are generally parallel, and the units are stackable on a shipping pallet 164. Additionally, the universal aircraft mule 100 may include a transport height locking device 166, for preventing the units from expanding during shipping and/or transport of the units.

Figure 7:
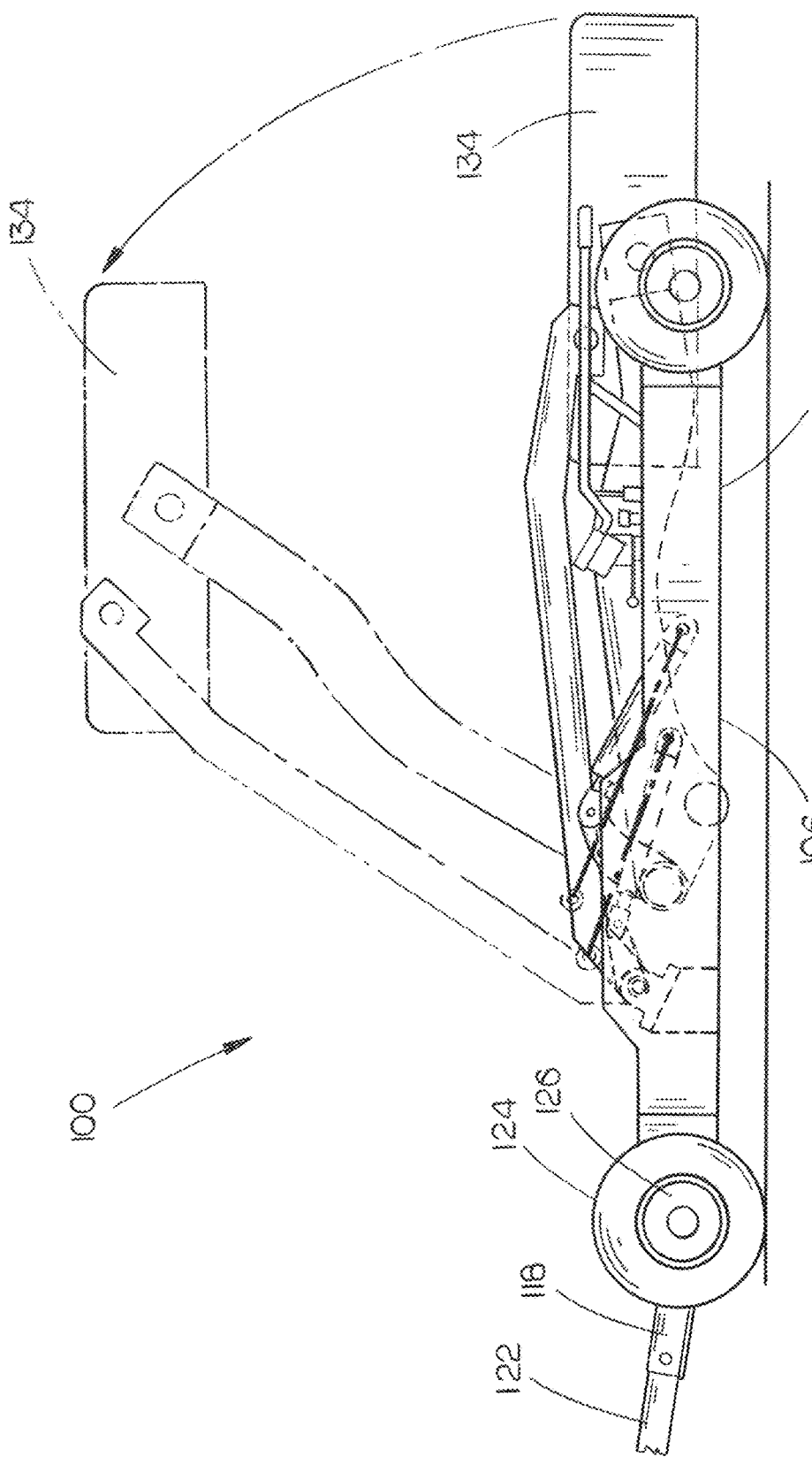
FIG. 7 is a side elevational view a universal aircraft mule showing the cradle and lift assembly operating range, according to inventive concepts of the present disclosure.
Figure 8:
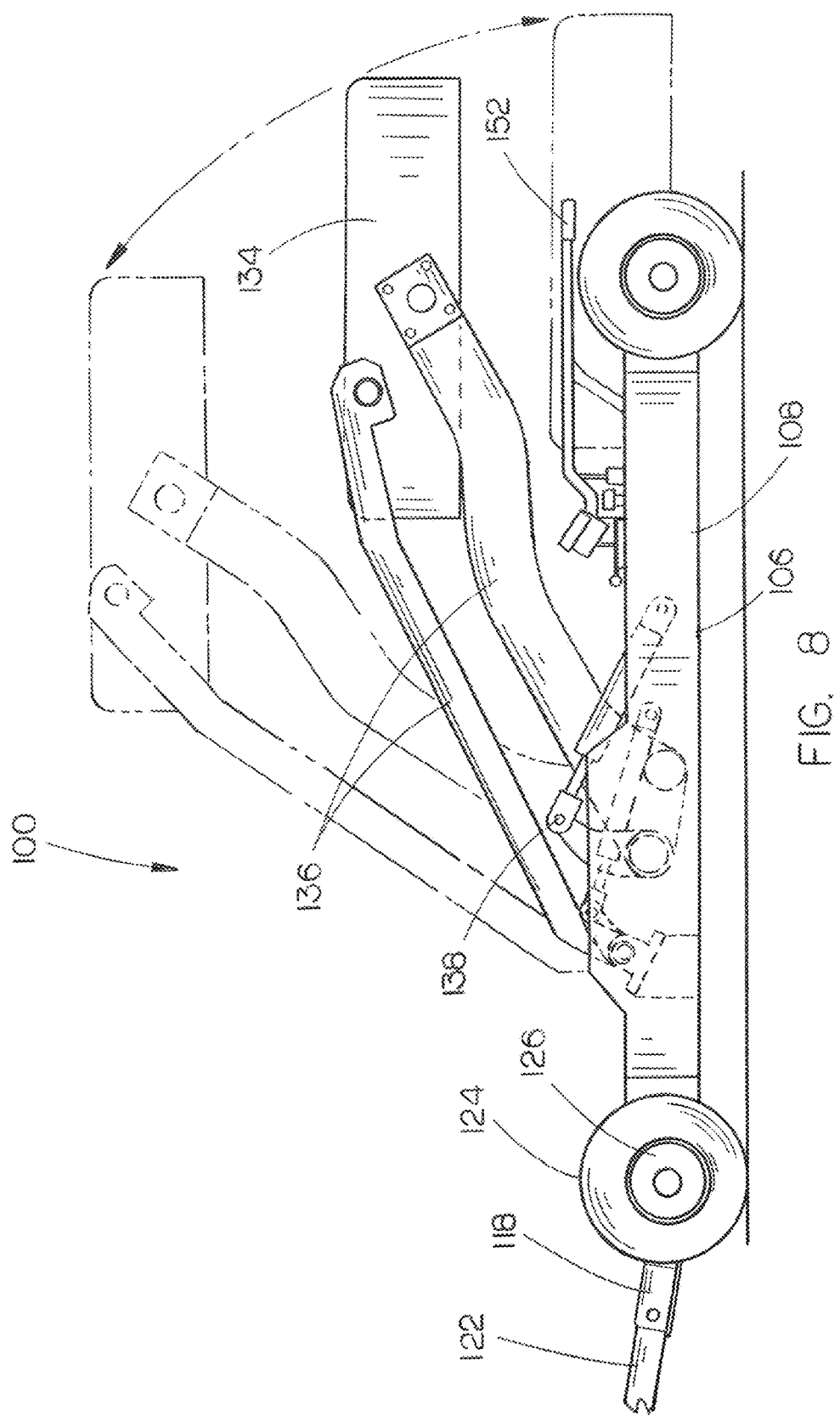
FIG. 8 is a side elevational view of a universal aircraft mule showing the lift assembly in various positions, according to inventive concepts of the present disclosure.
Figure 9:
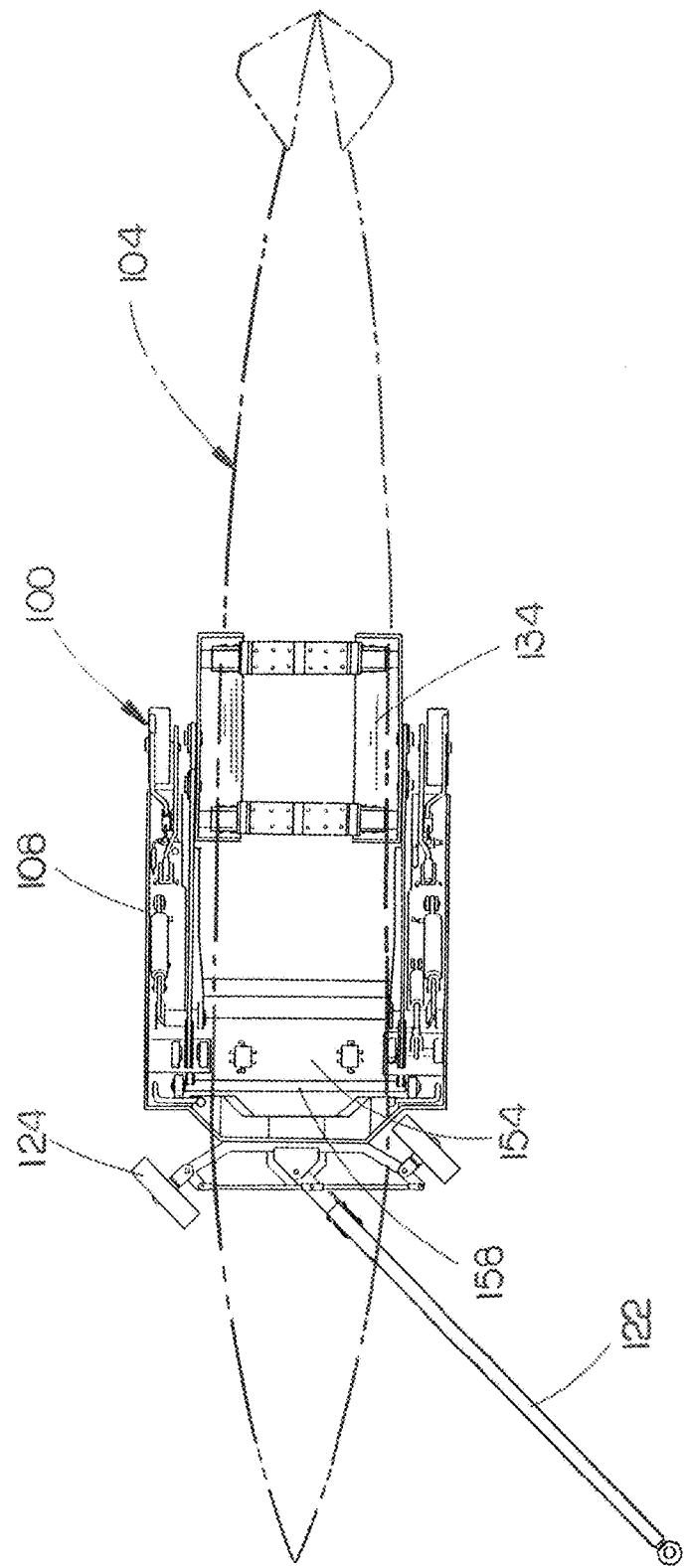
FIG. 9 is a top plan view of a universal aircraft mule showing a 600 gallon drop tank in broken lines where the tank is in a fully lowered non-skewed position, according to inventive concepts of the present disclosure.
Figure 11A:
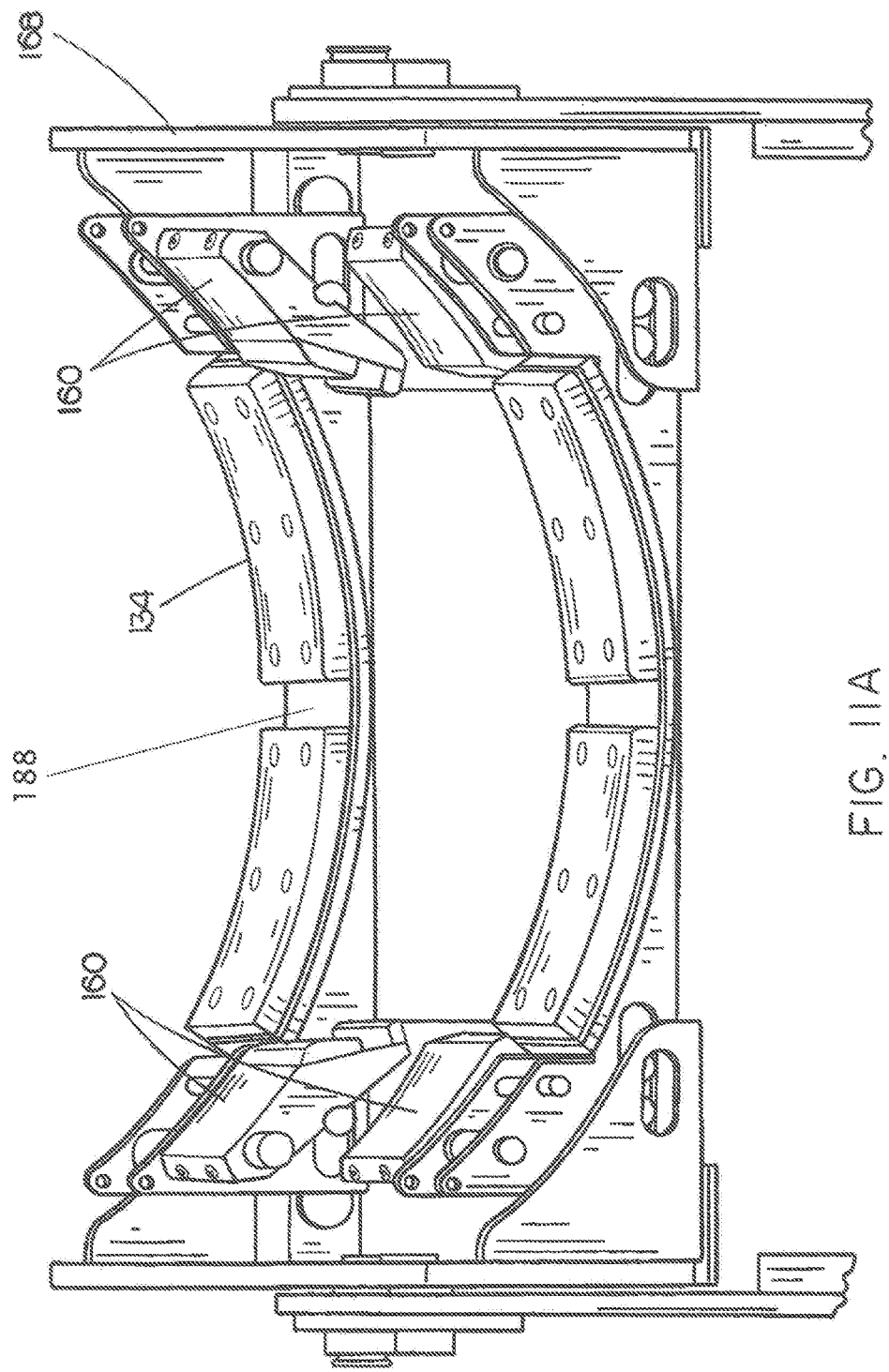
Figure 12B:
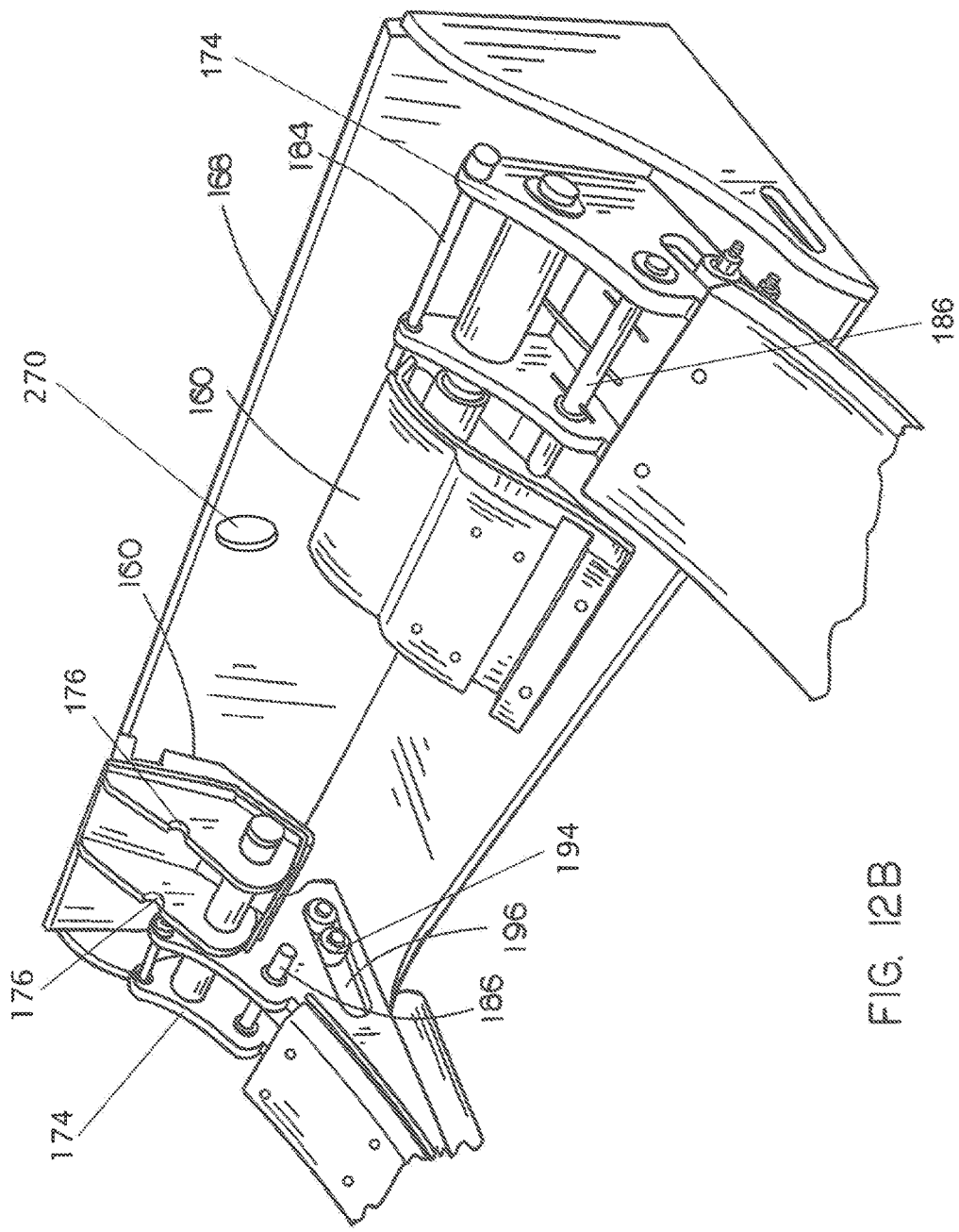
Figure 14:
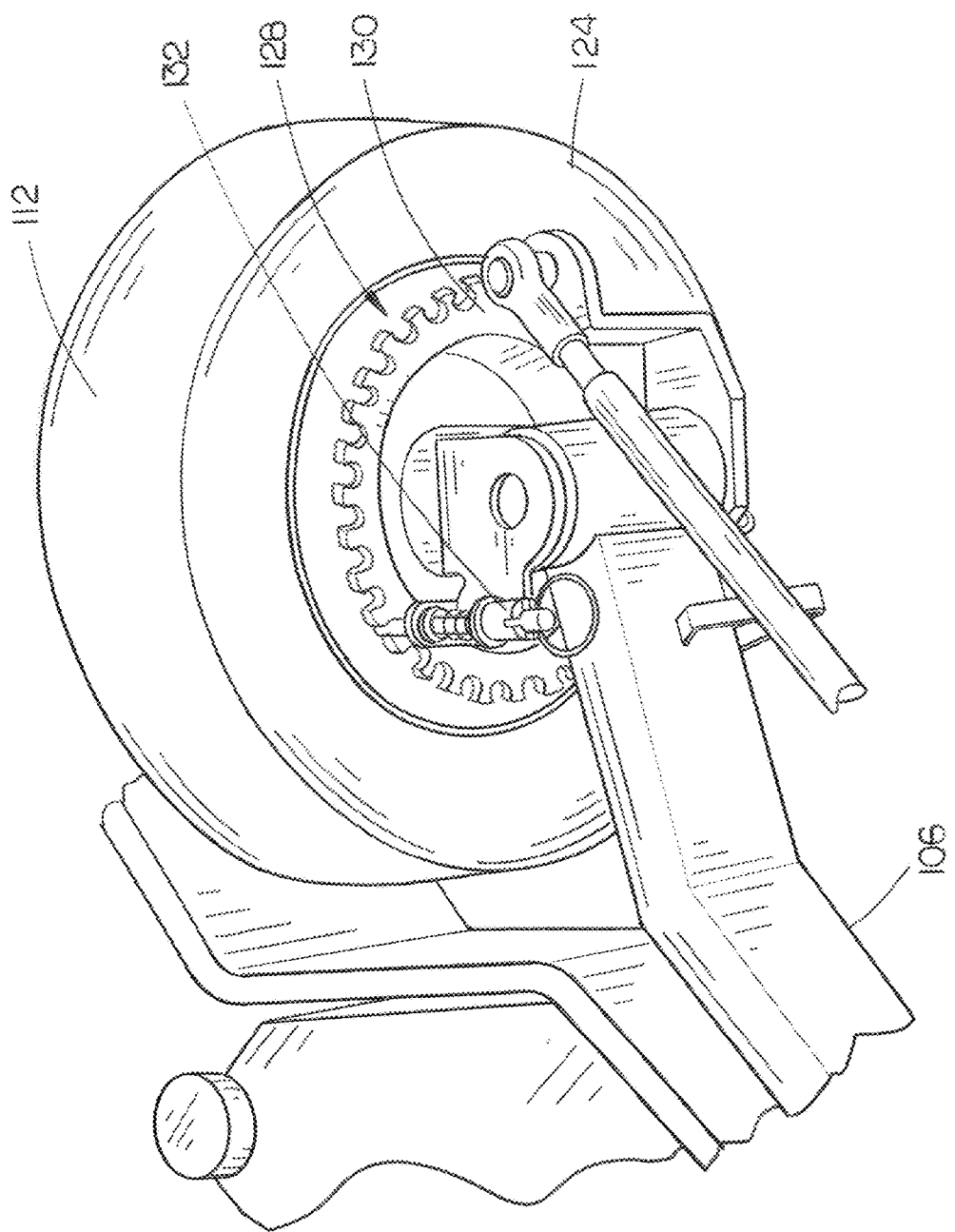
FIG. 14 is a detailed perspective view of steering a parking brake assembly of a universal aircraft mule, according to inventive concepts of the present disclosure.
Figure 15:
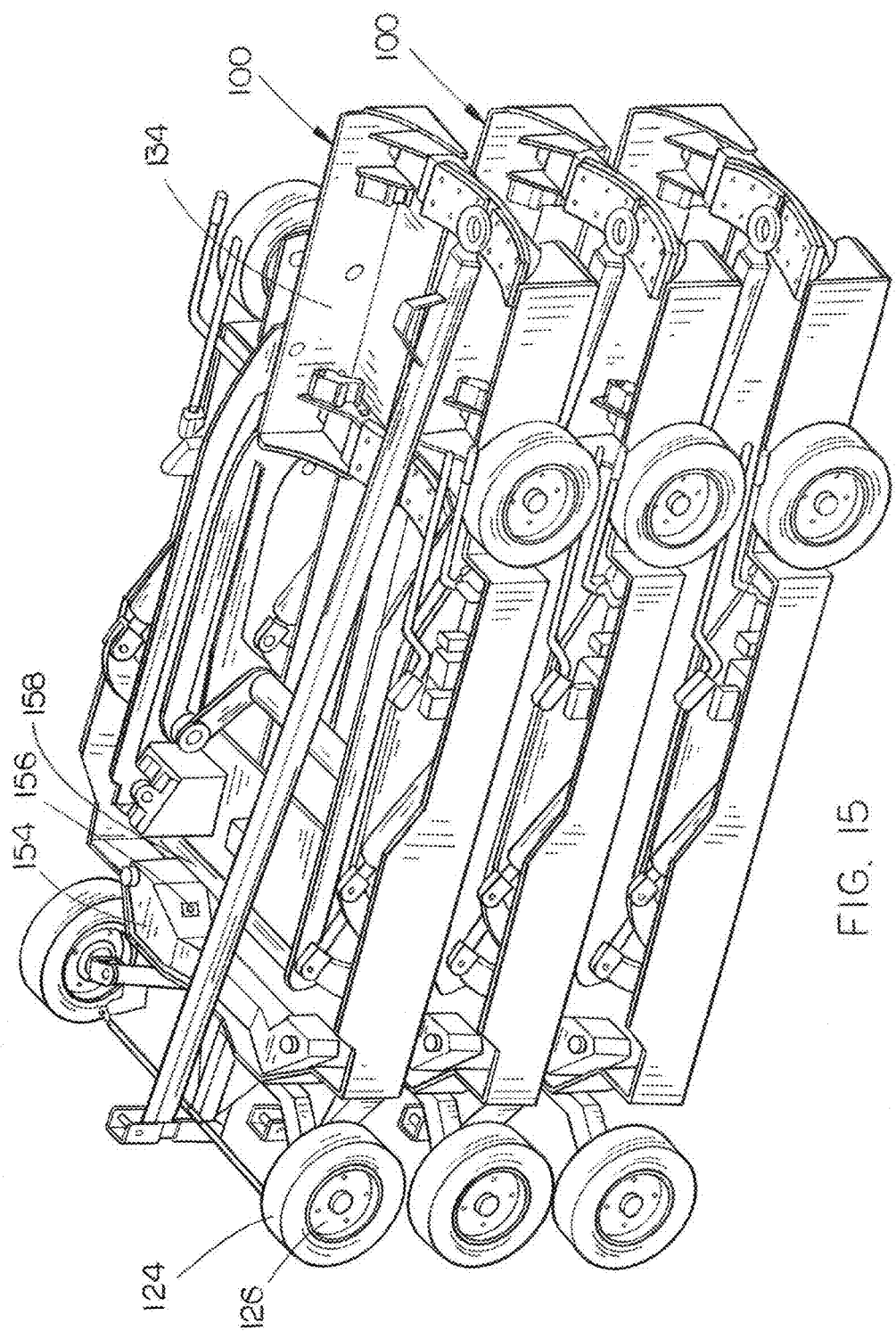
FIG. 15 is a perspective view of three of the universal aircraft mules in a stacked for storage/shipping configuration, according to inventive concepts of the present disclosure.
Figure 16:
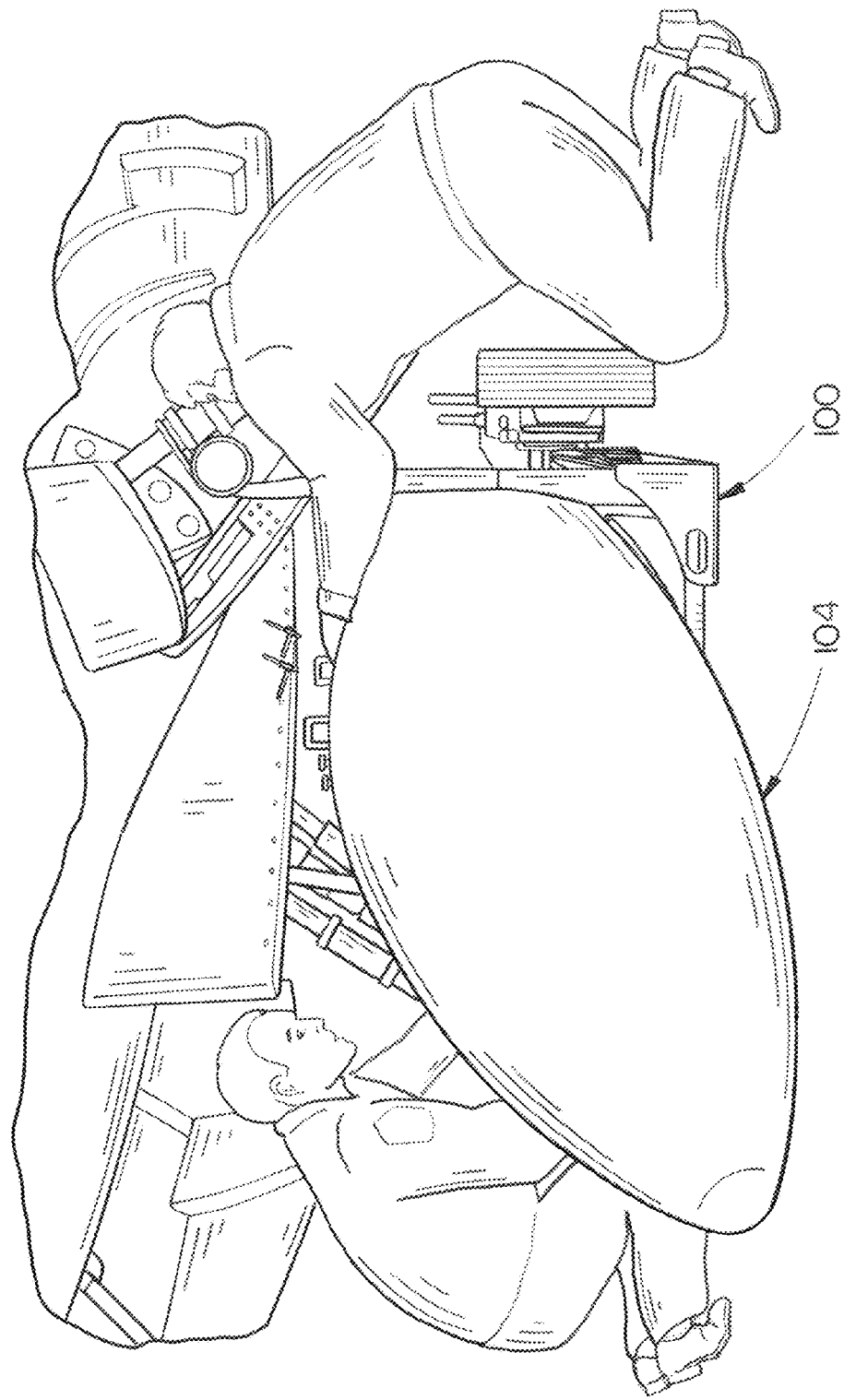
FIG. 16 is a frontal perspective view of a universal aircraft mule wherein an auxiliary wing tank is being installed on an F-16 Fighting Falcon, according to inventive concepts of the present disclosure.
Figure 17:
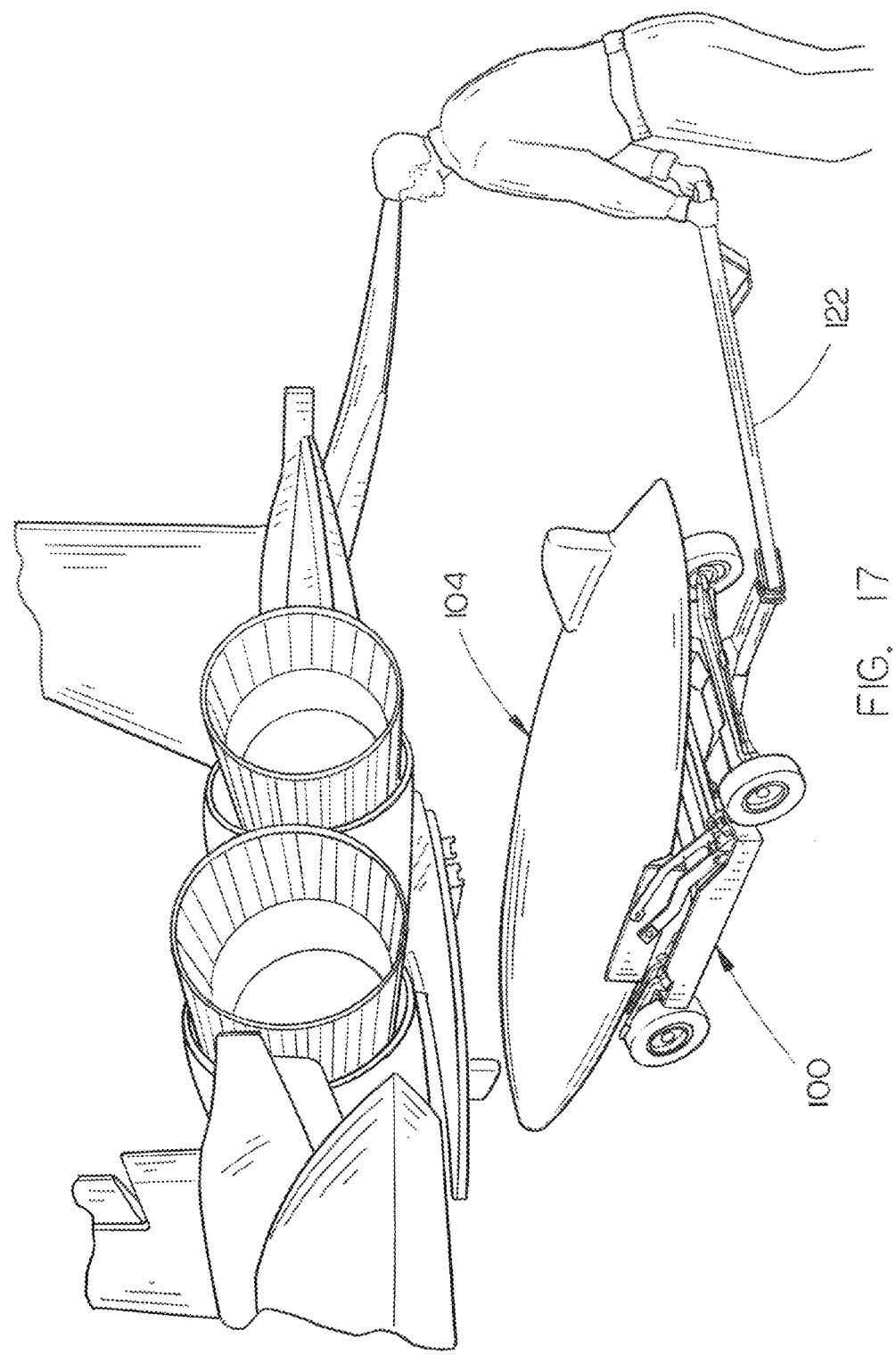
FIG. 17 is a perspective view of a universal aircraft mule installing/removing a belly drop tank from an F-15, according to inventive concepts of the present disclosure.
Figure 18:
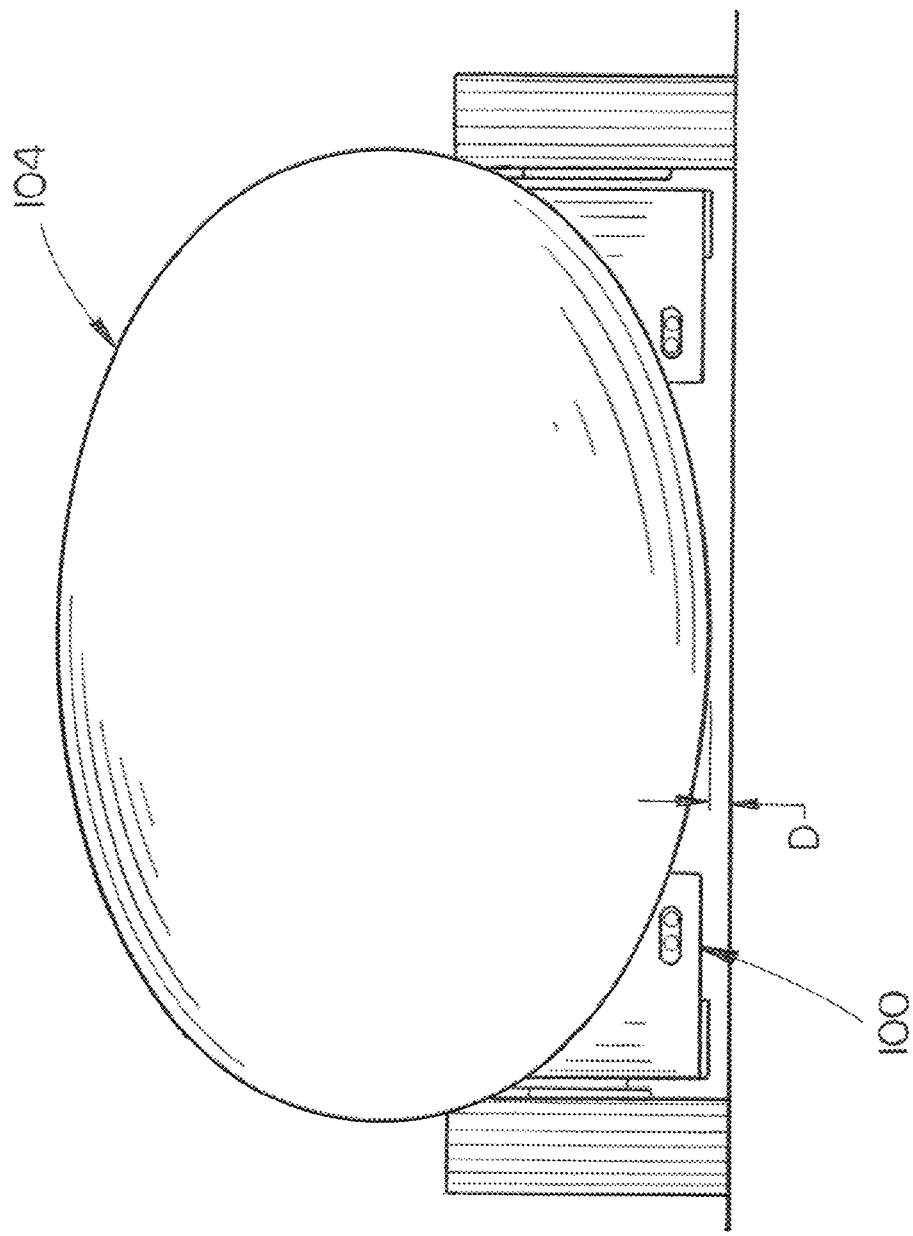
FIG. 18 is a front perspective view of a universal aircraft mule illustrating the low end of the mule's cradle operating envelope, according to inventive concepts of the present disclosure.
Figure 19:
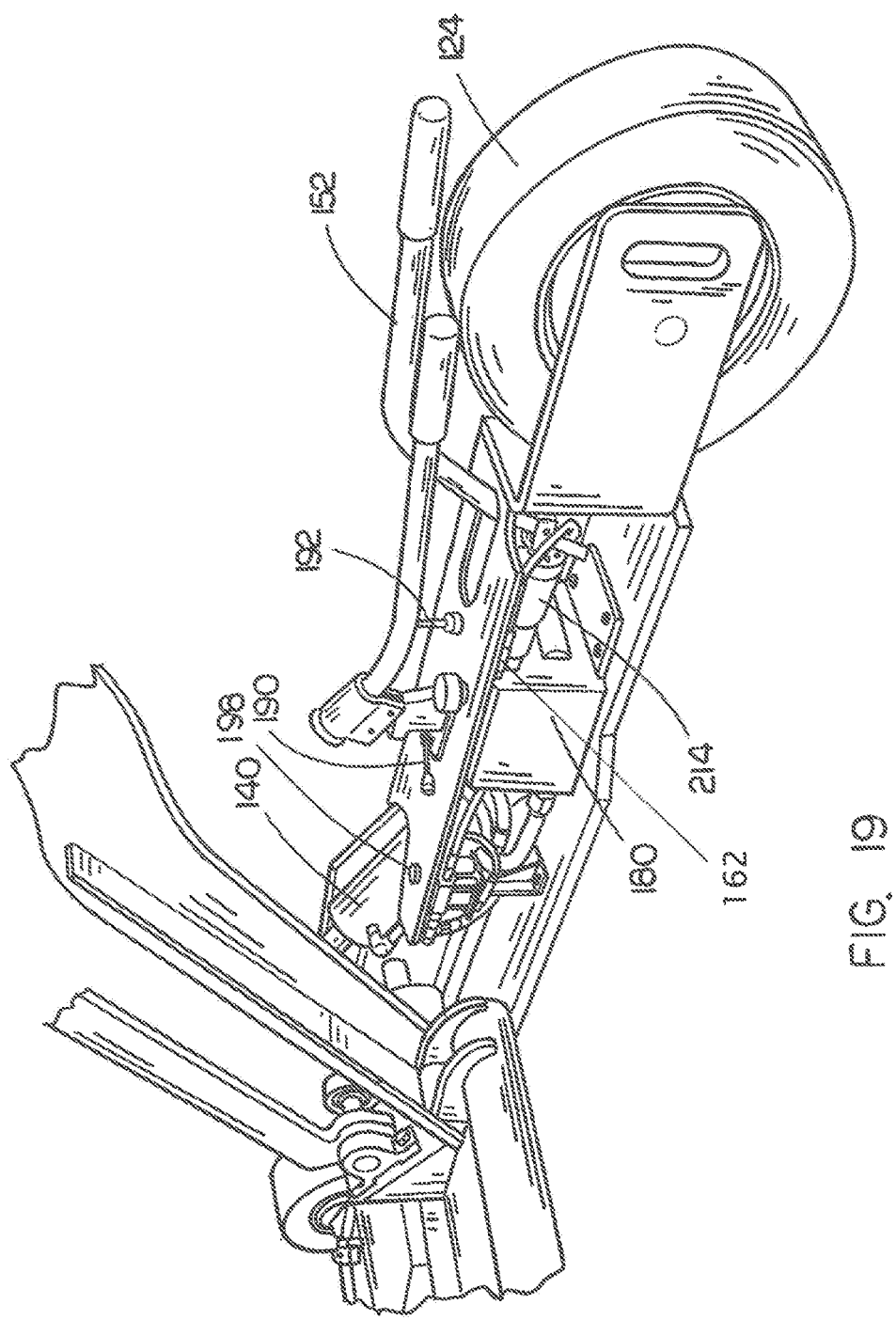
FIG. 19 is a side perspective view of the starboard side of the U-frame of a universal aircraft mule, according to inventive concepts of the present disclosure.
Figure 20:
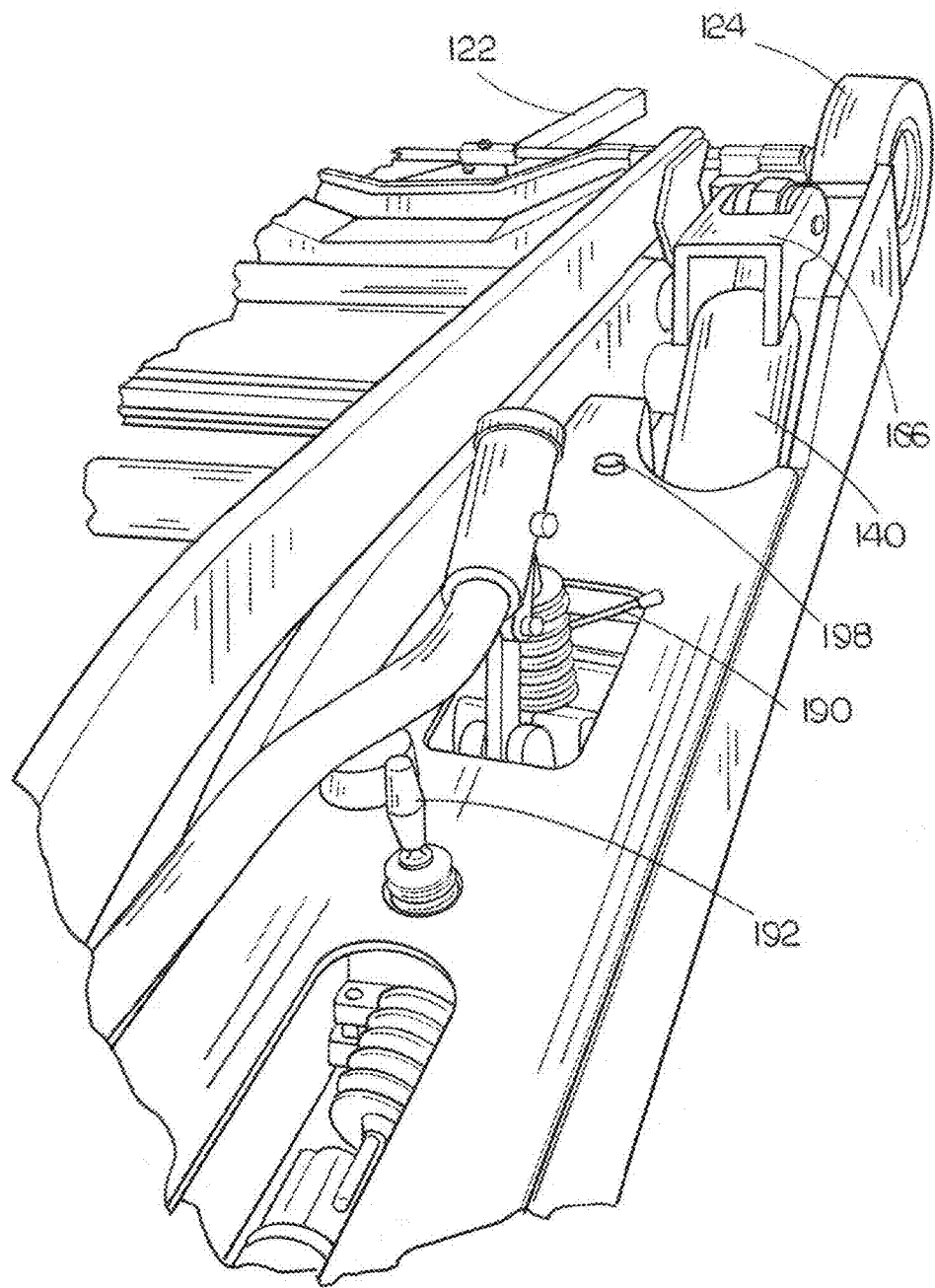
FIG. 20 is a top perspective view of the transport height locking device, pump handle pressure release valve, tilt direction control, tilt pump, and toe-activated descent controller of a universal aircraft mule, according to inventive concepts of the present disclosure.

It will be appreciated from a review of FIGS. 7, 16, and 18 that the universal aircraft mule can carry an auxiliary at a height very low to the ground. As will be noted from FIG. 7, in an exemplary embodiment, the bottom of the auxiliary may be carried at a height approximately equal to the wheel axle height.

Figure 28:
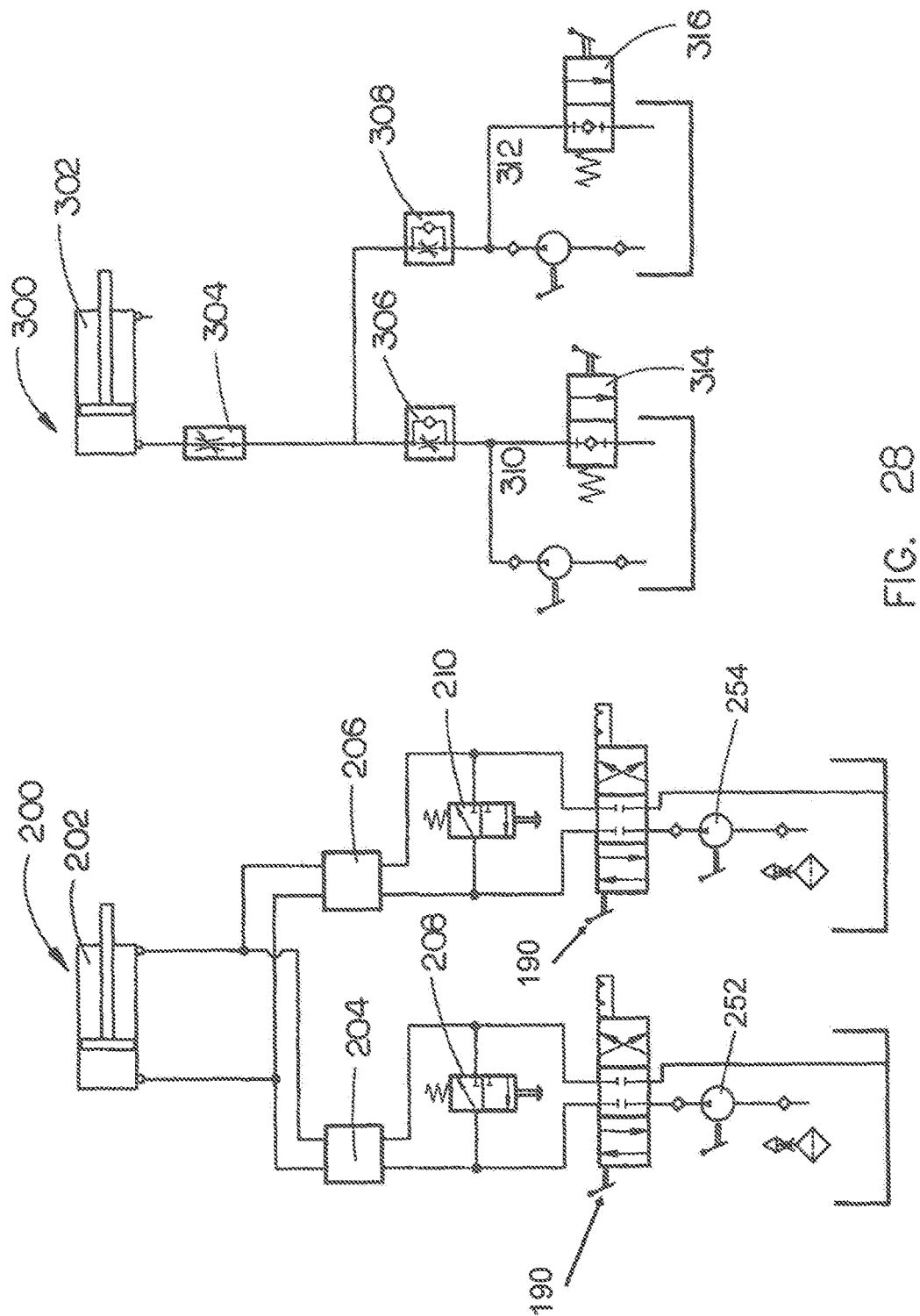
FIG. 28 is a schematic diagram of the lifting (first) and tilting (second) hydraulic systems of a universal aircraft mule, according to inventive concepts of the present disclosure.

FIG. 28 schematically illustrates both the lifting and tilting hydraulic systems of an exemplary embodiment of the universal aircraft mule 100. The tilting system 200 includes a bidirectional (double acting) hydraulic cylinder operably pressurized via a reservoir 154 filled with hydraulic fluid. An operator may extend or retract the hydraulic cylinder 202 utilizing either hand pump 252 or 254. Dual counterbalance valve assemblies (204, 206) are utilized to prevent over-running or load runaway.

An exemplary embodiment of mule 100 includes a pair of gauge isolators (208, 210) to ascertain accurate pressures on each side of the cylinder 202. The tilting system may be operated from either side of the mule 100. The lift system 300 includes a hydraulic cylinder 302 connected to a velocity fuse 304. The lifting system also includes a pair of pressure compensated flow controllers (306, 308). Like the tilting system, the lifting system may be operated from either side of the mule 100 via a pair of hand pumps (310, 312).

As best illustrated in FIGS. 23-26, the mule 100 may be operably employed with a mechanized storage assembly 102 and a mule guide 170. The mule guide 170 may be a simple mechanical guide system with stop for allowing an operator to readily position the mule 100 in position to receive or unload an auxiliary from/to the mule/storage (100, 102). Likewise, an optical or electromechanical system may also be employed.

In an exemplary embodiment of the mule of the present disclosure the cradle 168 may be lowered to within 1.0 inches of the ground. To facilitate the low operating envelope a U-shaped frame is utilized so the cradle 168 is not encumbered in lowest position by frame structure. Additionally, the center of gravity is kept outside of the frame in a low-loaded condition such that the cradle 168 center of gravity is centered within the frame when the cradle is in a high-loaded position.

An exemplary embodiment of the mule 100 of the present disclosure includes lift, tilt, and rotational adjustments (skew). Prior art mules require brute personnel force to shove and/or push an auxiliary into alignment. The mule 100 of the present disclosure allows an operator to mechanically adjust lift and tilt to the required install/uninstall height/tilt and then rotate or skew the cradle 168 into a fine adjustment. Thus, even side-to-side (rotational skew and pivot) requires less than 50 pounds of force (the lateral floating carriage bearings 194 and bearing guides 196) and may be accomplished without moving the rollable frame 106 of the mule 100.

An exemplary embodiment of the mule 100 includes toe operated, regulated-speed, and descent controllers 192 on both sides of the frame. Hydraulic lift pumps 310, 312 are included on both sides of the frame. In some embodiments, a higher speed hydraulic lift pump is utilized on one side and a lower speed pump on the other side for finer lift adjustments. In some embodiments, a single reservoir 154 is utilized so that both pumps may be operated simultaneously (for highest speed lift).

Figure 21:
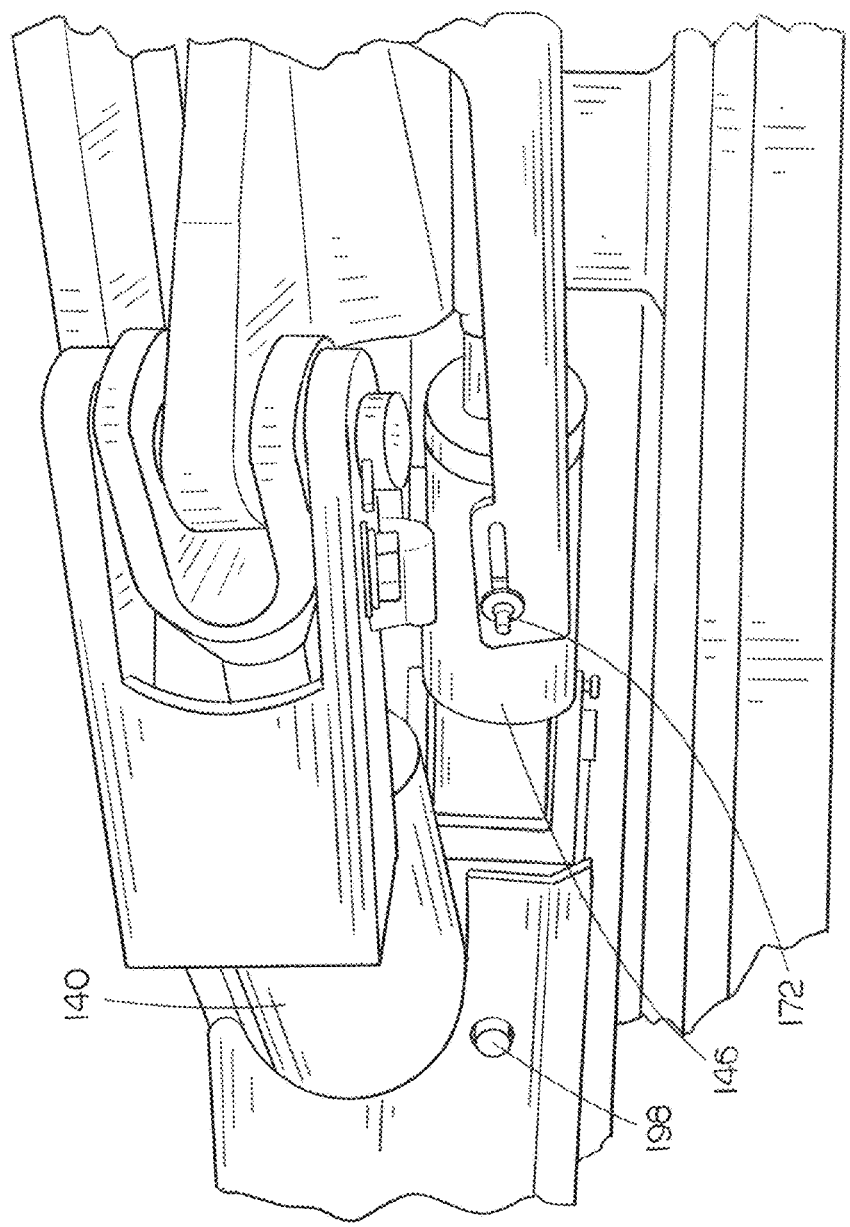
FIG. 21 is a top perspective view illustrating the tilt direction and tilt amount indicator of a universal aircraft mule, according to inventive concepts of the present disclosure.
Figure 22:
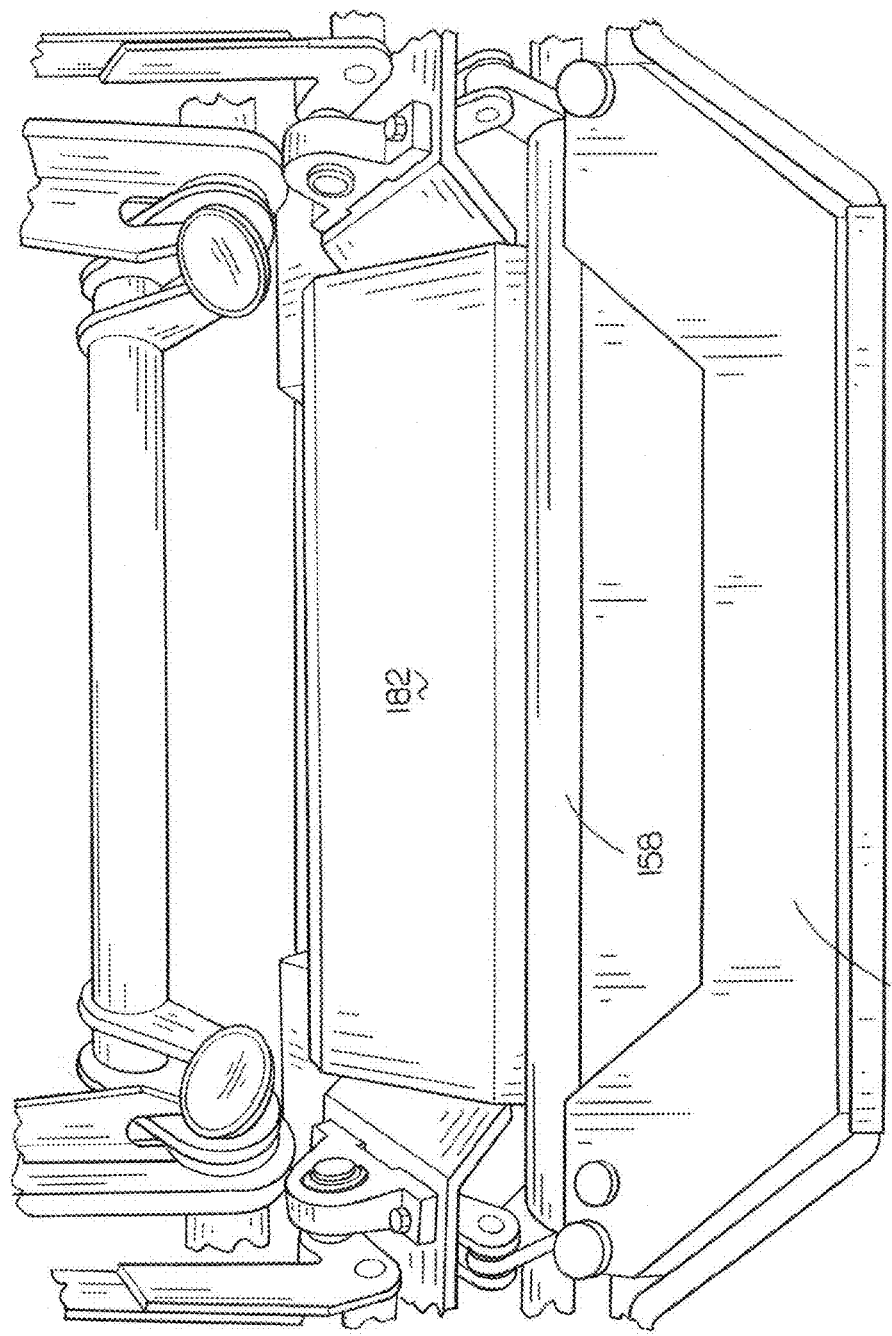
FIG. 22 is a top perspective view of the front of a universal aircraft mule illustrating the lift reservoir and the counter-balance, according to inventive concepts of the present disclosure.
Figure 23:
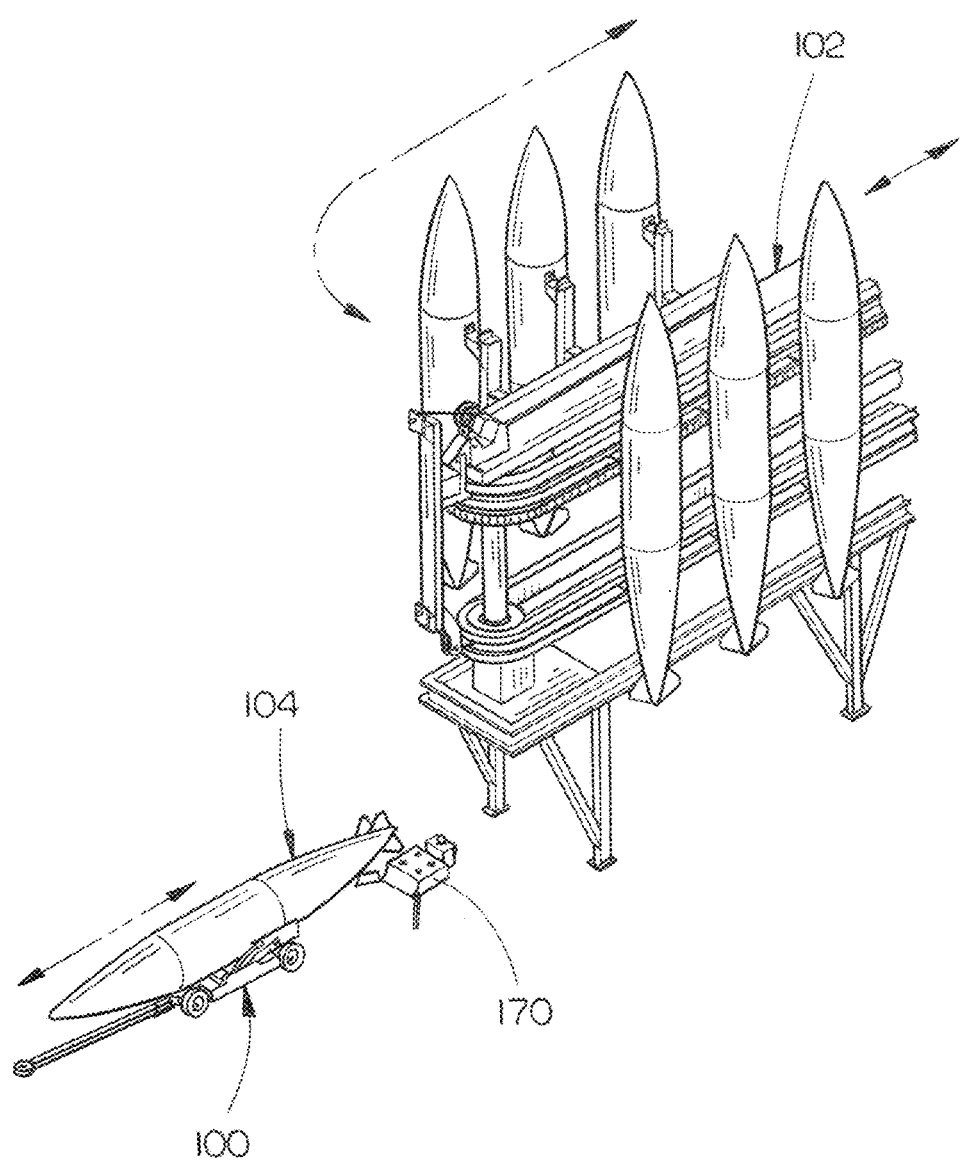
FIG. 23 is a diagrammatic perspective view of a system including a universal aircraft mule, auxiliary storage facility and mule guide, according to inventive concepts of the present disclosure.
Figure 24:
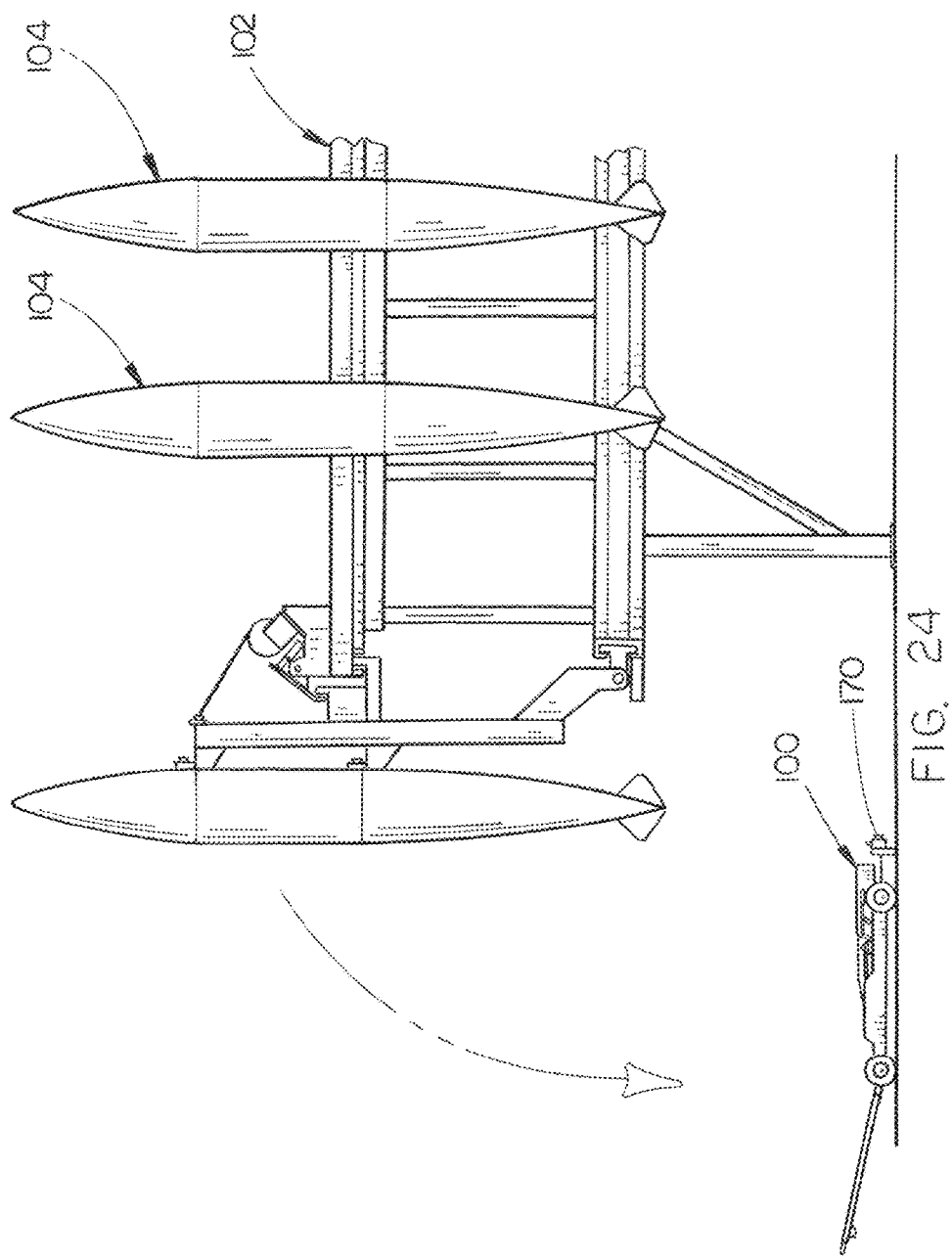
FIG. 24 is a side elevational view of a system in a ready to load configuration illustrating the sequential vertical storage facility with auxiliary selection, mule guide and tilt-to-load feature, according to inventive concepts of the present disclosure.
Figure 25:
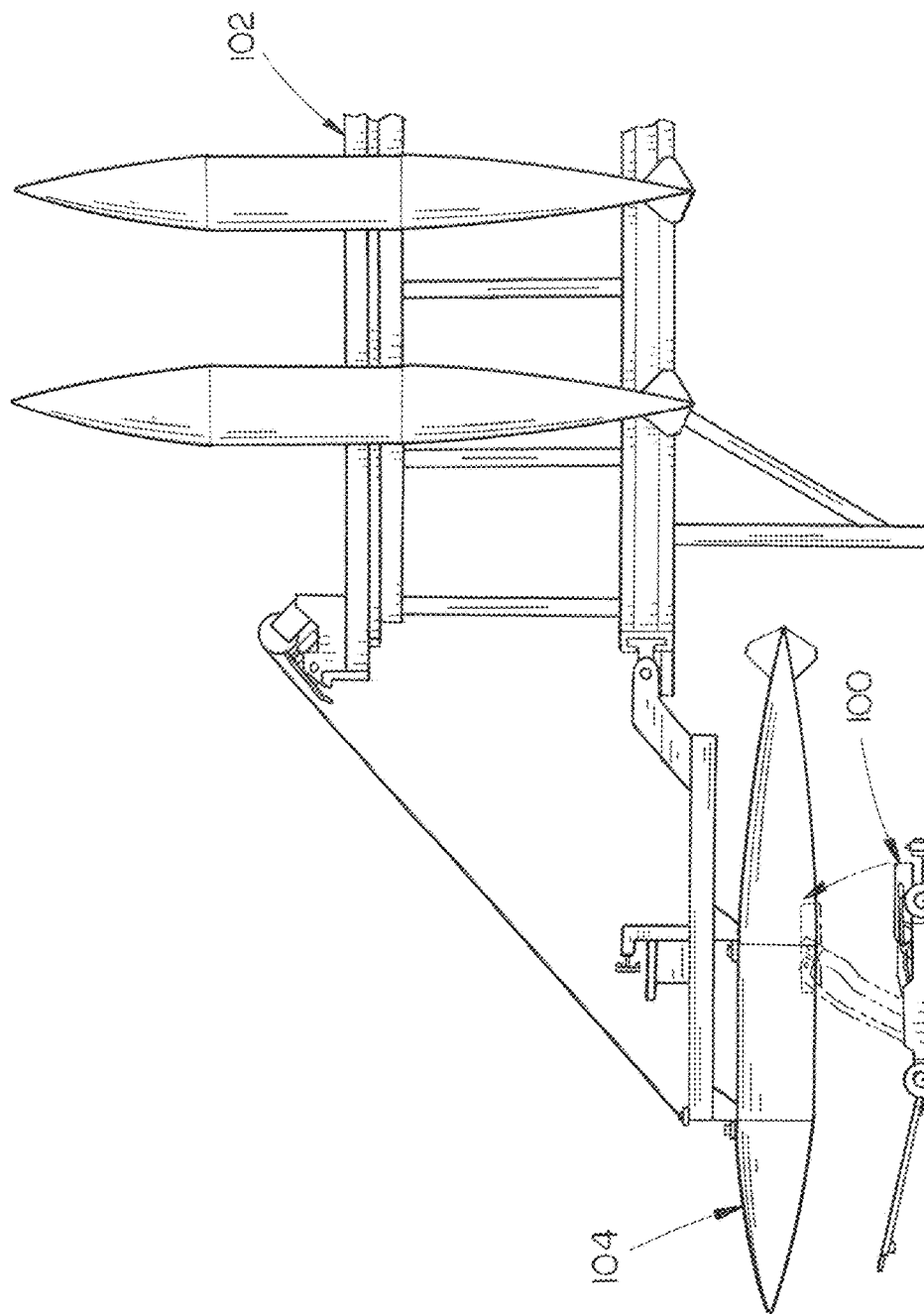
FIG. 25 is a side elevational view of a system in a loading position illustrating the sequential vertical storage facility with auxiliary selection, mule guide and tilt-to-load feature.
Figure 26:
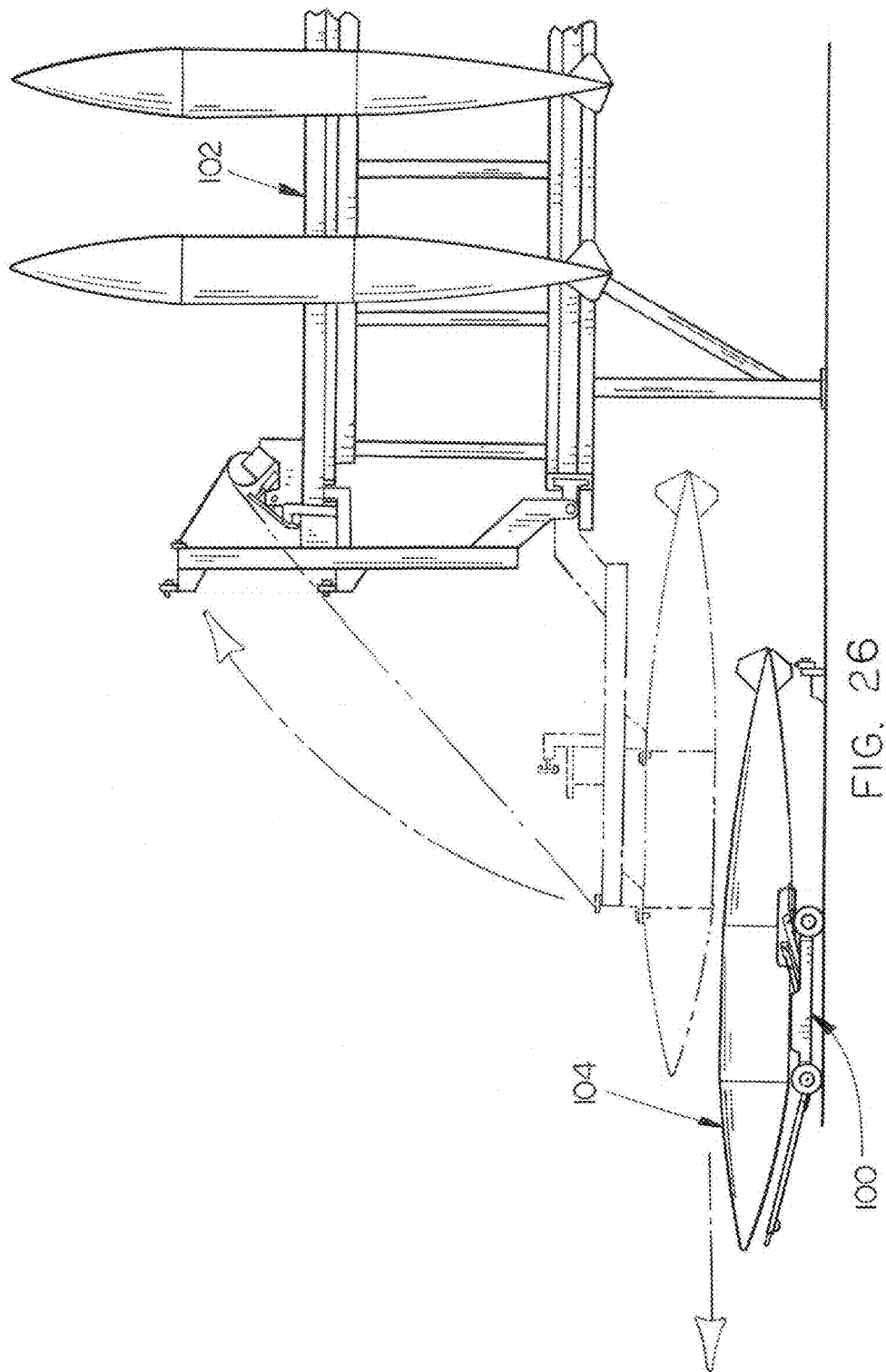
FIG. 26 is a side elevational view of a system including a universal aircraft mule in a loaded carrying configuration illustrating the sequential vertical storage facility with auxiliary selection, mule guide and tilt-to-load feature, according to inventive concepts of the present disclosure.
Figure 27:
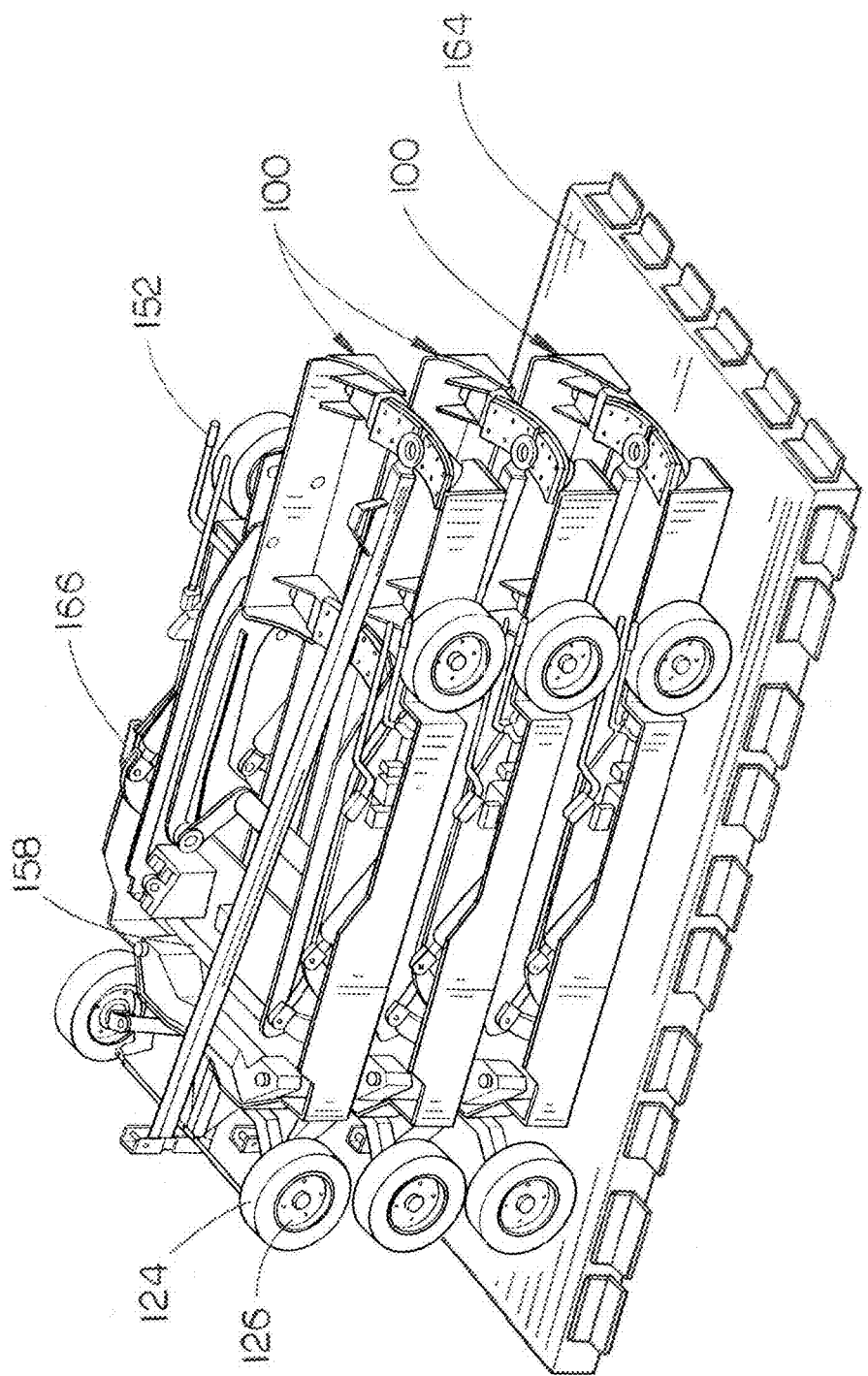
FIG. 27 is a side perspective view of three stacked mules (four may be safely transported) on a 463L pallet, according to inventive concepts of the present disclosure.

An exemplary embodiment of the mule 100 includes pump handles calibrated (and levered) to require approximately 50 pounds of force for both lift and tilt. Another exemplary embodiment of the mule 100 further includes a tilt pressure relief valve 198, so the tilt pump handles 252, 254 may be lowered or placed at an optimum (location/position) (install/uninstall), for example, lowered stowed location without moving (lifting/tilting) the load. A tilt indicator 172 may also be provided to allow personnel to readily pre-adjust a load to the tilt and/or lift height necessary to place the mule 100 into an optimal load/unload position (FIG. 21). All hydraulics are placed and routed in protected areas within the frame. The cradle 168 is easily interchangeable with an alternate cradle for facilitating carriage of any auxiliary having specialized pick-up points or an auxiliary having different dimensions. For example, the cradle 168 may be interchanged with a second cradle (e.g., cradle 402—below) that has one or more cradle dimensions increased or decreased to accommodate different loads.

An exemplary embodiment of the mule 100 includes cradle spacer 174 configured for housing lateral floating carriage bearings 194 and bearing guides 196 while providing support for anti-rotation stabilizers 160. Stabilizer slots 176 allow anti-rotation stabilizers 160 to rotate into a lowered position and engage with cradle spacer locks 186. A load recess 188 serves to allow a gap between two supports of the lateral floating carriage 134.

An exemplary embodiment of mule 100 includes a second hydraulic system to maintain a tilt direction control 190 for allowing the second hydraulic system to drive the tilt direction of the accessory. For example, if the aft end of the accessory was too low, tilt direction control 190 is placed in a first position and an operator manipulates second hand pump 254 to power the aft end of the accessory vertically up. Conversely, if the aft end of the accessory was too high, the operator may place the tilt directional control in a second position and manipulate the second hand pump 254 driving the aft end of the accessory vertically down.

An exemplary embodiment of mule 100 may be configured to be capable of safely lifting, tilting, pivoting, and transporting a load having a weight of 4520 pounds and having a length of 28 feet.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Figure 29:
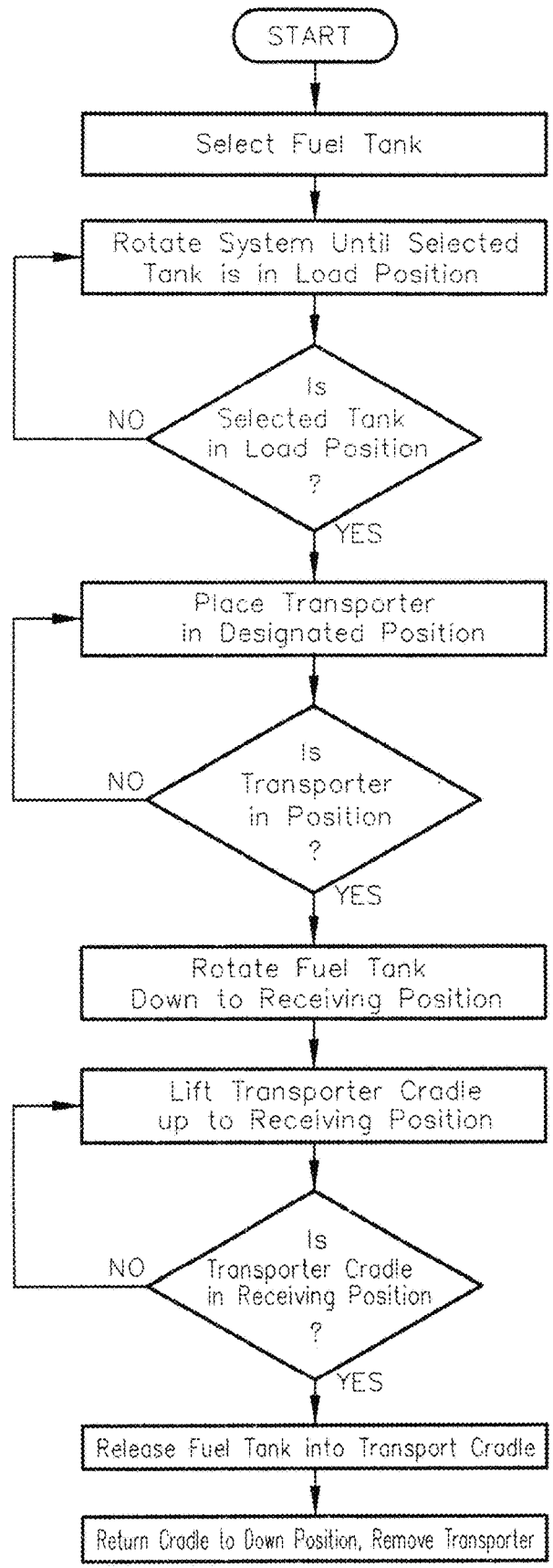
FIG. 29 is a flow diagram of operation of the load/unload logic/sequence of a system, according to inventive concepts of the present disclosure.

Referring now to FIG. 29, a first step includes selecting a fuel tank. The selection may depend on a type of aircraft, a type of tank, a distance to be traveled, or combinations thereof.

A second step includes rotating the mechanized storage assembly 102 until the load (e.g., selected tank) is in load position.

A third step includes determining whether the selected tank is in load position. In embodiments, the determining may be a mechanical determination, a sensor-aided determination, an operator determination, or combinations thereof. For example, an optical sensor may indicate to an operator that an auxiliary tank 104 from the mechanized storage assembly 102 is in alignment with a mechanical arm that is configured to receive the auxiliary tank 104. If the selected tank is in load position, then aircraft mule 100 (or mule 400—below) is placed in a designated position (e.g., a receiving position).

A fourth step includes determining if the transporter (e.g., mule 100 or mule 400) is in the designated position. The determination of proper position may be done according to previously measured and marked location indicators, sensor-aided positioning determinations (e.g., inertial measurement units (IMU)), GPS locating devices, a camera and indicator system located on mule guide 170 (e.g., indicating whether mule 100 is entering, in or, leaving the designated position) or combinations thereof.

A fifth step includes rotating the auxiliary fuel tank 104 down to a fuel tank receiving position. For example, a pulley system, a mechanical arm and gear system, or combinations thereof, may be used to rotate and lower the auxiliary fuel tank 104 to the fuel tank receiving position.

A sixth step includes lifting the transporter cradle (e.g., cradle 168 or cradle 402—below) up to a receiving position. In some embodiments, this is done with the lift system (e.g., first hydraulic system (lifting) 300). In some embodiments this is done with a combination of the lift system and the tilt system (e.g., first hydraulic system (lifting) 300, and second hydraulic (tilting) system 200 or first and second hydraulic cylinders 426).

A seventh step includes determining if the transporter cradle is in the receiving position. This may be done manually, by a sensor-indicator system, by a wired connection, a wireless (e.g., Bluetooth, infrared, sonic, etc.) connection, a network connection (e.g., controlled area network (CAN)) and CAN component (e.g., position sensor), including one or more wired/wireless devices connecting the mechanized storage assembly 102 to the aircraft mule (e.g., mule 100 or mule 400—below), or combinations thereof. The devices may include an electronic indicator that sends a signal (e.g., visual, auditory, or electrical signal) to a local operator or a remote operator, indicating the transporter cradle is in the receiving position.

If the transporter cradle is in the receiving position, an eighth step includes releasing the auxiliary fuel tank 104 into the transport cradle (e.g., cradle 168). For example, a mechanical locking mechanism, a friction based locking mechanism, a piezo-actuated brake, or combinations thereof, may be released, lowering the auxiliary fuel tank 104 into the receiving position.

A ninth step includes securing the auxiliary fuel tank 104 and returning the cradle (e.g., cradle 168 or cradle 402—below) to a down position. The transporter (e.g., mule 100 or mule 400—below) is then removed from the loading area surrounding mechanized storage assembly 102 to transport the auxiliary fuel tank 104 to the proper vehicle (e.g., aircraft).

It is noted that an exemplary embodiment of the universal aircraft mule 100 is depicted in FIGS. 1-28. It is further noted that the mechanized storage assembly 102 has been depicted as being used in conjunction with the universal aircraft mule 100 in FIGS. 23-26. It is further noted that these depictions are not limiting. For example, another exemplary embodiment of may include universal aircraft mule 400. By way of another example, the universal aircraft mule 400 may be configured to be used in conjunction with mechanized storage assembly 102.

It is further noted that universal aircraft mule 100 or 400 may be configured to perform one or more steps according to the method/process depicted in FIG. 29. It is further noted that one or more components of the universal aircraft mule 100 or mule 400 may be interchanged with one or more components of a second universal aircraft mule (e.g., respectively mule 400 or mule 100).

Figure 30:
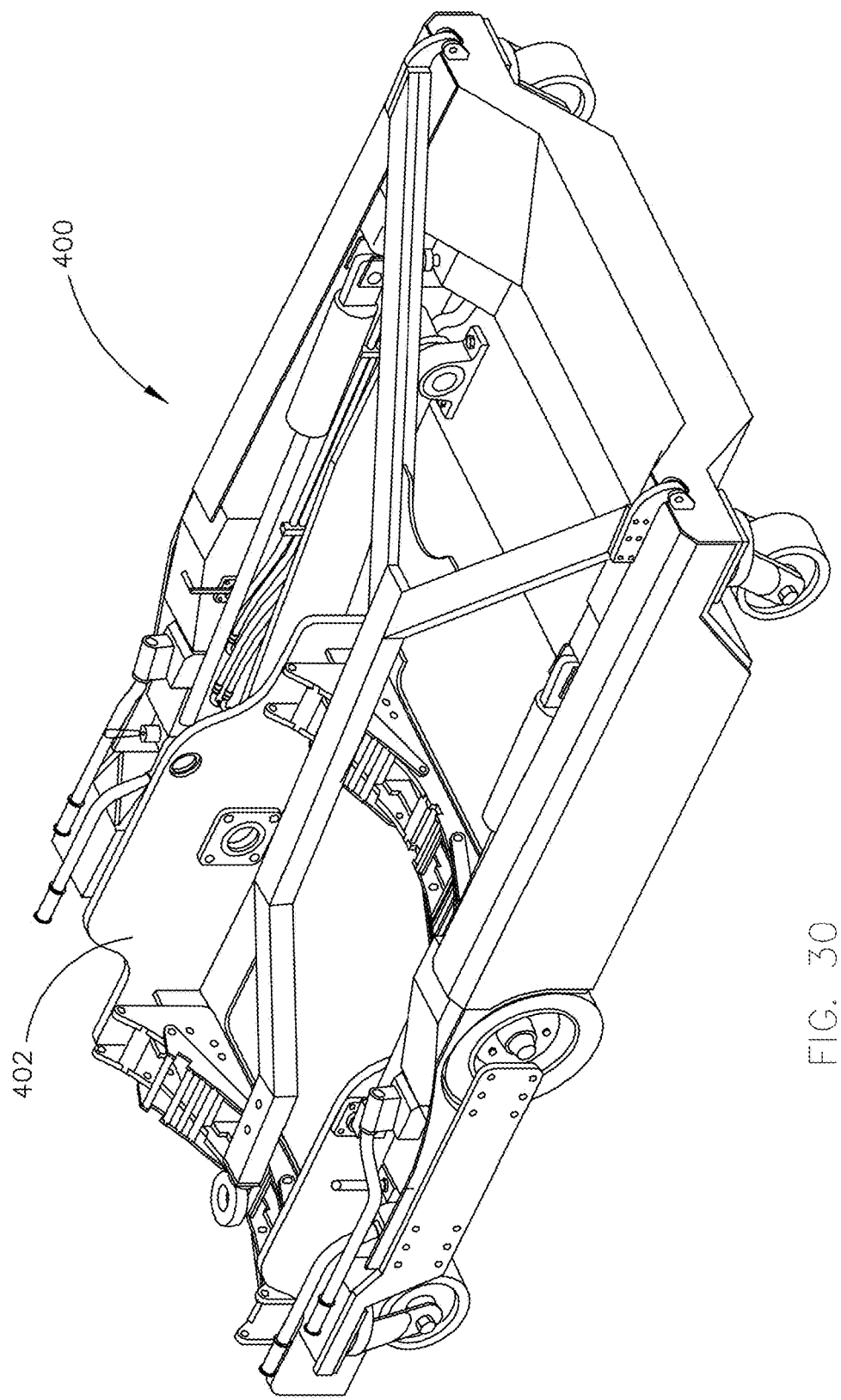
FIG. 30 is a perspective view of a six-wheeled exemplary embodiment of a universal aircraft mule, according to inventive concepts of the present disclosure.
Figure 33B:
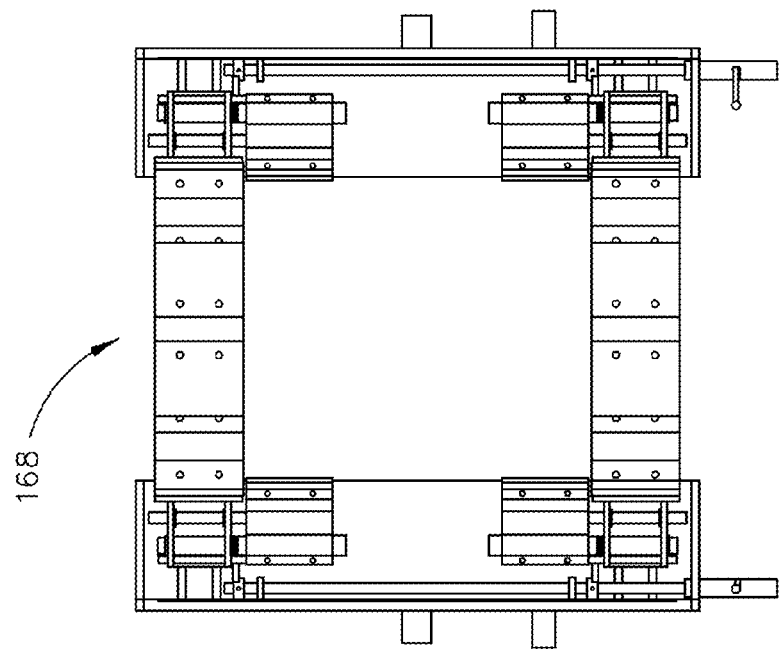
FIGS. 33A and 33B are top perspective views of cradles, lateral floating carriages and skew assemblies, according to inventive concepts of the present disclosure.
Figure 33A:
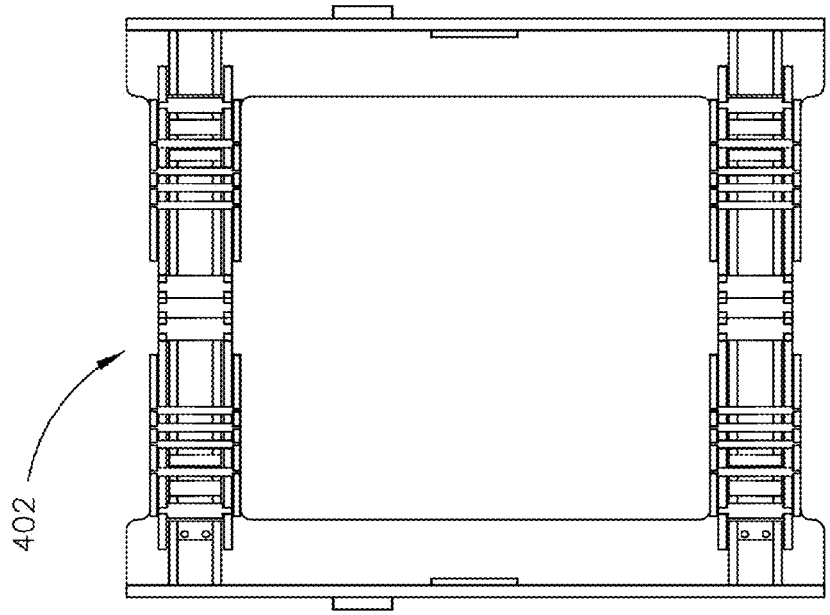

Referring now to FIG. 30, a universal aircraft mule 400 includes a cradle 402 for lifting and pointing an aircraft tank 104 supported by the cradle 402. The aircraft tank 104 may be pointed in a direction (e.g., horizontal) for receiving by an aircraft having a structure configured for removably receiving the aircraft tank 104. In some embodiments, portions (e.g., lateral floating carriage) of the cradle 168 or cradle 402 are interchangeable with portions of at least a second cradle (e.g., respectively cradle 402 or cradle 168).

In some embodiments, portions of universal aircraft mule 400 are reinforced or structurally different than portions of universal aircraft mule 100. In some embodiments, the reinforcement or structural difference is to further compensate a run-away angle, increase stability, simplify the design of the aircraft mule, or increase overall safety.

Referring now to FIGS. 31A to 33B, an exemplary embodiment of the cradle 402 includes a lateral floating carriage 404. The lateral floating carriage 404 has one or more dimensions that are different from lateral floating carriage 134. For example, the lateral floating carriage 404 may be longer and wider than the lateral floating carriage 134 (e.g., as wide or wider than a F-16 center tank). In an exemplary embodiment, the lateral floating carriage 404 is 21.59 cm (8.5 in) longer lateral floating carriage 134 and at least 2.54 cm (1.0 in) wider than lateral floating carriage 134 (e.g., see FIGS. 33A and 33B). It is noted that increasing dimensions of the cradle 402, or increasing dimensions of a portion of the cradle 402 (e.g., lateral floating carriage) as compared to cradle 168, may contribute to compensating a run-away angle.

In some embodiments, rotation points of cradle 402 includes one or more additional features, as compared to cradle 168, in order to compensate run-away angle or increase the stability of a load (e.g., auxiliary fuel tank 104) being received, unloaded, and/or transported. Referring now to FIG. 31B, the lateral floating carriage may include one or more specialized points sized for receiving protrusions/ridges of a load. For example, FIG. 31B depicts lateral floating carriage with two large, specialized depressions for receiving an auxiliary fuel tank with protrusions/ridges that fit into the two large, specialized depressions, reducing rotation of the load during receiving, transport, and/or unloading of the load.

Referring now to FIGS. 32A and 32B, an exemplary embodiment of cradle 402 includes a thin rubber coating 406 covering all or portions of the cradle 402. The thin rubber coating 406 covers at least the lateral floating carriage 404, which may improve load/tank stability, may provide more rigid support, and may lower variable compressibility (e.g., decreasing variablility variability of thick rubber pads compressing) as the load/tank shifts during transit. For example, with respect to improving stability, the thin rubber coating 406, may increase an amount of torque required to rotate a tank being transported in lateral floating carriage 404 of cradle 402. By way of another example, the thin rubber coating may increase frictional forces that occur or that must be overcome in order to rotate the load during receiving, transport, and/or unloading of the load. In some embodiments, the thin rubber coating 406 replaces one or more thick rubber pads (e.g., replacing rubber pads located in the lateral floating carriage 134, while still increasing overall surface area of rubberized contacts). In other embodiments, the thin rubber coating 406 is used together or in conjunction with one or more thick rubber pads.

In another exemplary embodiment, the lateral floating carriage 404 also differs from lateral floating carriage 134 in that anti-rotation stabilizers 408 are not off-centered. For example, referring now to FIGS. 34A and 34B, lateral floating carriage 134 with anti-rotation stabilizers 160 (e.g., off-centered) are shown along with lateral floating carriage 404 with centered anti-rotation stabilizers 408 (see also, FIGS. 11A-12B).

Referring now to FIGS. 35A and 35B, another exemplary embodiment of cradle 402 of aircraft mule 400 includes one or more lift/tilt points that are different from lift/tilt points of cradle 168 of aircraft mule 100. For example, cradle 168 is shown with lift/tilt points 410 and cradle 402 is shown with lift/tilt points 412 being geometrically spaced differently than lift/tilt points 410 of cradle 168. The different geometrical spacing, may include, but is not limited to, a vertical separation between lift/tilt points 412 greater than a vertical separation of lift/tilt points 410 and a diagonal separation of lift/tilt points 412 greater than a diagonal separation of lift/tilt points 410. For instance, the vertical separation of lift/tilt points 412 may be 8.26 cm (3.25 in) greater than the vertical separation of lift/tilt points 410, and the diagonal separation of lift/tilt points 412 may be 3.05 cm (1.2 in) greater than the diagonal separation of lift/tilt points 410.

Referring now to FIGS. 36A and 36B, front perspective views of cradle and skew assemblies of one or more cradle embodiments are depicted. In an exemplary embodiment, the cradle 402 includes additional support structure 456 as compared to cradle 168 (e.g., skew assembly is reinforced). For example, the additional support structure 456 may be located between the sides of cradle 402. In some embodiments, the additional support structure 456 adds additional support enabling, or enabling in part, a removal of one or more links tying both of the lift arms together. For example, the additional support structure 456 may enable the removal of lift linkage 136 (see, for example, FIGS. 5 and 8) tying the aft port lifting bar 142 and the aft starboard lifting bar 144 to the fore port tilting bar 148 and the fore starboard tilting bar 150. For instance, the additional support structure 456 may enable, in part, the removal of the fore port tilting bar 148 and the fore starboard tilting bar 150.

In some embodiments, the removal of lift linkage 136 increases the ground clearance of the universal aircraft mule 400. For example, referring now to FIGS. 37A and 37B, aircraft mule 100 with lift linkage 136 is shown compared to aircraft mule 400 with portions of lift linkage 136 removed, increasing the ground clearance of universal aircraft mule 400 as compared to universal aircraft mule 100, while allowing minimal clearance between the frame 428 and a transport surface.

Figures 38A, 38B:
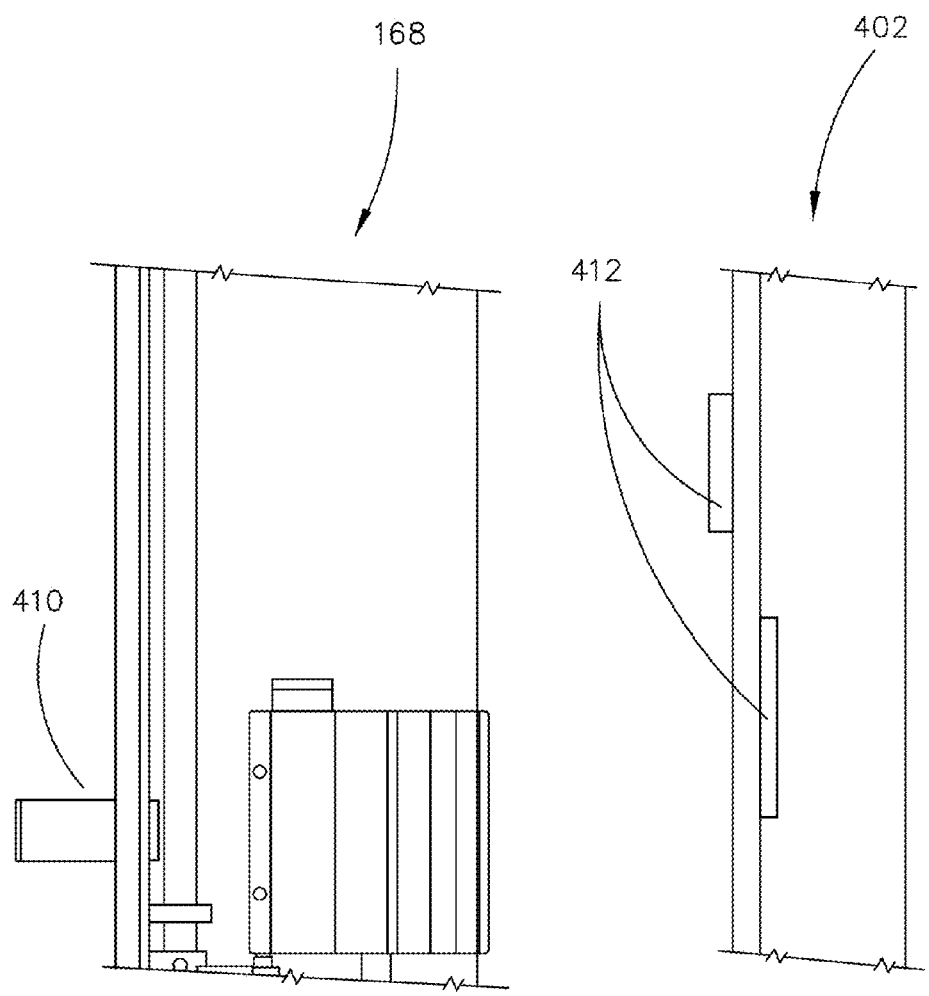
FIGS. 38A and 38B are side perspective views of bearing/bushing assemblies, according to the inventive concepts of the present disclosure.

Referring now to FIGS. 38A and 38B, bearings for lifting and tilting the cradle 402 may be located differently as compared to bearings for lifting and tilting the cradle 168. For example, in an exemplary embodiment, the bearings for cradle 168 and connection points 410 may be housed in bushings associated with the aft port lifting bar 142 and the aft starboard lifting bar 144 (see, for example, FIG. 5), or in bushings associated with the fore port tilting bar 148 and the fore starboard tilting bar 150. In another exemplary embodiment, the bearings for cradle 402 and connection points 412 may be substantially housed within the side plates of the cradle 402, removing space taken up by the protruding bushings associated with cradle 168. In an exemplary embodiment, the bearings for lifting and tilting enable one or more pivotable connections 414 (below) associated with the cradle 402 and the aft port lifting bar 416 and the aft starboard lifting bar 418 (e.g., see FIG. 46—below), and the removal of protruding bushings enables greater side clearance.

Figure 39:
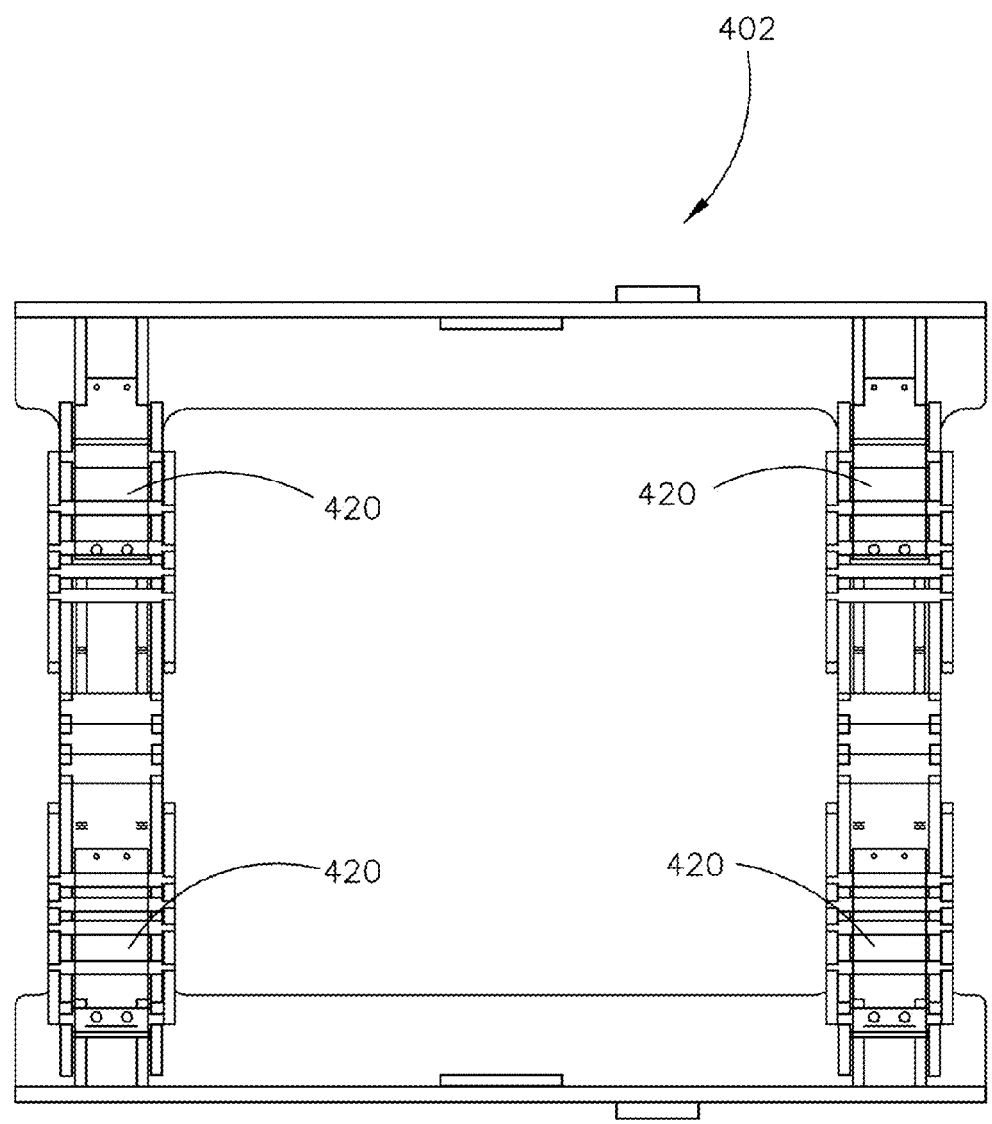
FIG. 39 is a top perspective view of cradle, lateral floating carriage and removable/interchanging plates, according to inventive concepts of the present disclosure.

Referring now to FIG. 39, a top perspective view of cradle 402 is depicted, illustrating one or more removable/interchanging plates 420. In an exemplary embodiment, the one or more removable/interchanging plates 420 includes four separate removable/interchanging plates 420, enabling interchanging or exchanging the lateral floating carriage 404 with/for a second lateral floating carriage (e.g., lateral floating carriage 134). It is noted that the use of four removable/interchanging plates for interchanging or exchanging the lateral floating carriage 404 is not limiting. It is further noted that a person of skill in the art may recognize any number of removable/interchanging plates 420 for interchanging or exchanging the lateral floating carriage 404.

Referring now to FIGS. 40A and 40B, top perspective views of one or more pivotable connection points are depicted. Pivotable connection 138 of universal aircraft mule 100 is shown with one set of bearings for each side of the aircraft mule 100. Pivotable connection 422 of universal aircraft mule 400 is also shown having one or more additional bearings/bushings 424. For example, universal aircraft mule 400 may include an additional bearing and bushing assembly 424 to reinforce each side of the universal aircraft mule 400, making four in total (e.g., as compared to the two total included with the universal aircraft mule 100). In some embodiments, the use of additional support bearings 424 associated with the pivotable connections 422 provide additional lift support, enabling, in part, the removal of lift linkage 136 (i.e., so that lift linkage 136 is not a component of universal aircraft mule 400). It is noted that while FIG. 40B depicts universal aircraft mule 400 as having two additional bearing/bushing assemblies 424, this depiction of two additional is not limiting. For example, the universal aircraft mule 400 may have only one additional bearing/bushing assembly as compared to universal aircraft mule 100. For instance, loads/tanks may be imbalanced, weighing more heavily on one side, thus, only one side may be reinforced with an additional assembly 424. By way of another example, the universal aircraft mule 400 may have multiple additional bearing/bushing assemblies 424 (e.g., three, four, five, or more) as compared to aircraft mule 100.

Referring now to FIGS. 41A and 41B, side perspective views of two embodiments of an aircraft mule tilt system are depicted. An exemplary embodiment of aircraft mule 100 uses the tilt system depicted in FIG. 41A. An exemplary embodiment of aircraft mule 400 uses a structurally reinforced tilt system depicted in FIG. 41B. In some embodiments, the structurally reinforced tilt system is reinforced to enable removal of at least the fore port tilting bar 148 and the fore starboard tilting bar 150. The embodiment in FIG. 41B includes first and second hydraulic cylinders 426.

In some embodiments, the bidirectional (double acting) first and second hydraulic cylinders 426 are much larger (e.g., increased "effective area") than the tilt cylinder 202. In some embodiments, the diameter of the cylinder and rod of the first and second hydraulic cylinders 426 are increased as compared to tilt cylinder 202. In some embodiments, the rods of the first and second hydraulic cylinders 426 are different than the rod of the tilt cylinder 202. For example, the rod of the first and second hydraulic cylinders 426 may consist of one or more different materials or be made by one or more different processes to increase the strength (e.g., increase column load capacity) of the rods as compared to tilt cylinder 202. For instance rods of the first and second hydraulic cylinders 426 may include induction hardened, chrome plated rods consisting of a 1045/1050 hot rolled steel, a 1054/1050 micro alloy steel, or a 1045/1050 steel with high strength properties. In some embodiments, the first and second hydraulic cylinders 426 consist of substantially the same materials as tilt cylinder 202 and are manufactured using substantially the same processes (e.g., induction hardening), and only differ in the size and capacity of the cylinder, rods, seals, etc. In embodiments, the increased size and strength of the first and second hydraulic cylinders 426 enable, or enable in part, the removal of lift linkage 136 from universal aircraft mule 400.

In some embodiments, the first and second hydraulic cylinders 426 connect on either side of the aircraft mule 400 and directly to the cradle 402. This is in contrast to the exemplary embodiment of aircraft mule 100 with the tilt cylinder 202 operably connected to only on one side of the aircraft mule 100 and further connected to either the fore port tilting bar 148 or the fore starboard tilting bar 150. In some embodiments, the increased size, strength and capacity of the first and second hydraulic cylinders 426 enable, or enable in part, compensation of run-away angle, a direct connection between the cradle 402 and frame (e.g., frame 428—below), and simplification of the tilt system of the aircraft mule 400 as compared to the tilt system of the aircraft mule 100. For example, the direct connection to cradle 402 may enable a removal of four bearings, eight bushings, fore port tilting bar 148, and fore starboard tilting bar 150, or combinations thereof, from aircraft mule 400 as compared to aircraft mule 100, while only adding one pinned connection.

In some embodiments, the direct connection of the first and second hydraulic cylinders 426 to cradle 402, along with the increased dimensions of lift/tilt points 412 (as compared to lift/tilt points 410), enable, or enable in part, compensation of a run-away angle as a load/fuel tank is lowered (e.g., from extreme angles or heights). At least one additional advantage enabled by the direct connection and increased lift/tilt point dimensions is a reduction in an amount of force placed on an individual tilt cylinder (e.g., tilt cylinder 202 or first and second hydraulic cylinders 426), while maintaining a somewhat constant/consistent center of gravity.

Referring now to FIGS. 42A and 42B, an exemplary embodiment of the universal aircraft mule 400 includes a rollable frame 428. In some embodiments, the rollable frame 428 functions similarly to rollable frame 106, except that one or more pairs of wheels are replaced by one or more pairs of casters. For example, the pair of wheels 110 and 112, pair of axles 114 and 116, and tie rod 120 (e.g., portions of steering system of mule 100) may be replaced by a first front pair of casters 430 and 432 and a second rear pair of casters 434 and 436. The use of two pairs of casters may enable the aircraft mule 400 to be steered like a single axle trailer, increasing maneuverability as compared to aircraft mule 100. In an exemplary embodiment, the rollable frame 428 also includes one or more pairs of fixed wheels 438 and 440 in the middle, or approximately the middle, of the rollable frame 428 (e.g., between first front pair of casters 430 and 432 and second rear pair of casters 434 and 436). In another exemplary embodiment, the pair of fixed wheels 438 and 440 are not in the middle of the rollable frame 428, but are positioned slightly closer to the second rear pair of casters 434 and 436.

Referring now to FIG. 43, an exemplary embodiment, an aircraft mule (e.g., mule 100 or mule 400) includes hydraulic line routing with brackets to hold the lines in place. For example, brackets 442 and 444 may be used to hold hydraulic lines in place. Also depicted in FIG. 43 is a braking system 446. In an exemplary embodiment, the braking system 446 functions similarly to the parking brake assembly 128, except that the braking system 446 is associated with the one or more pairs of fixed wheels 438 and 440 (e.g., associated with a single fixed wheel 438 or 440 or with both wheels of the pair of fixed wheels 438 and 440).

Figure 44B:
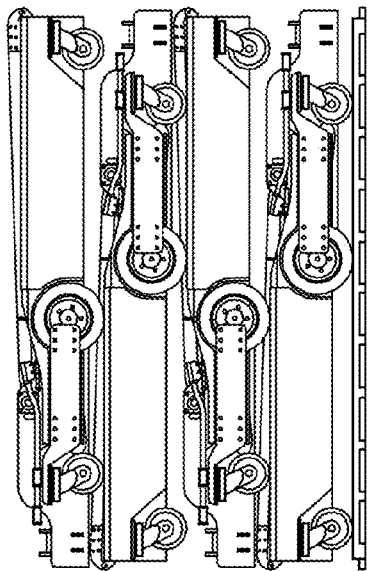
FIGS. 44A to 44C are perspective views of embodiments of universal aircraft mules with goose-necked towing bars, according to inventive concepts of the present disclosure.
Figure 44C:
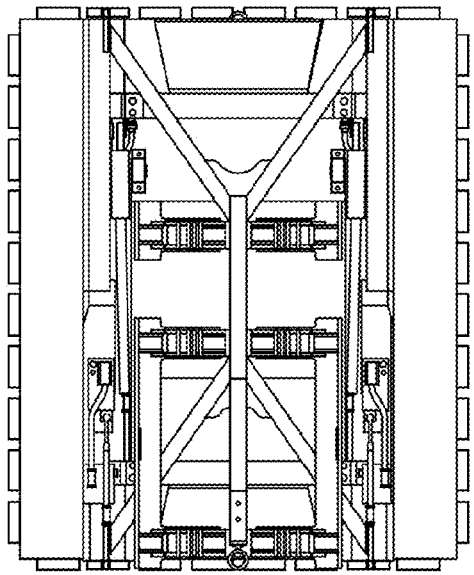
Figure 44A:
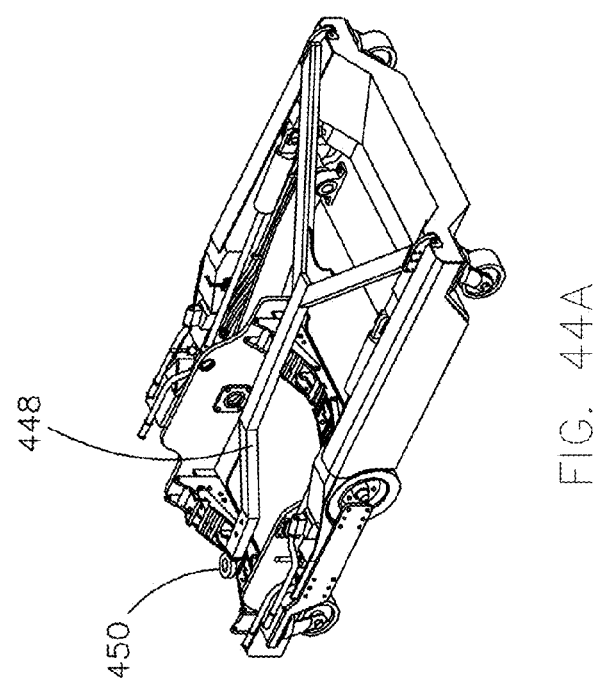

Referring now to FIGS. 44A-44C, an exemplary embodiment, an aircraft mule (e.g., mule 100 or mule 400) includes a goose-necked steerable tow bar. For example, aircraft mule 400 may include goose-necked steerable tow bar 448. In some embodiments, the goose-neck of the goose-necked steerable tow bar 448 positions the tow bar 448 such that a coupler (e.g., coupling ring 450) does not touch the ground during storage and transit of one or more stowed aircraft mules 400 (e.g., during transit of mules in a stowed position—see FIGS. 44B and 44C). In other embodiments, the goose-neck of the goose-necked steerable tow bar 448 positions the tow bar 448 such that the coupler (e.g., coupling ring 450) does not touch the ground during transport of a load/fuel tank, and so that coupling to a hitch (e.g., ball hitch) is easier. For example, a mule may assume a towing position (see FIG. 46—below), and the goose-neck may prevent a coupling ring from resting on a ground surface in the towing position. In some embodiments, the goose-necked steerable tow bar 448 is interchangeable with another tow bar (e.g., steerable tow bar 122).

Figure 45:
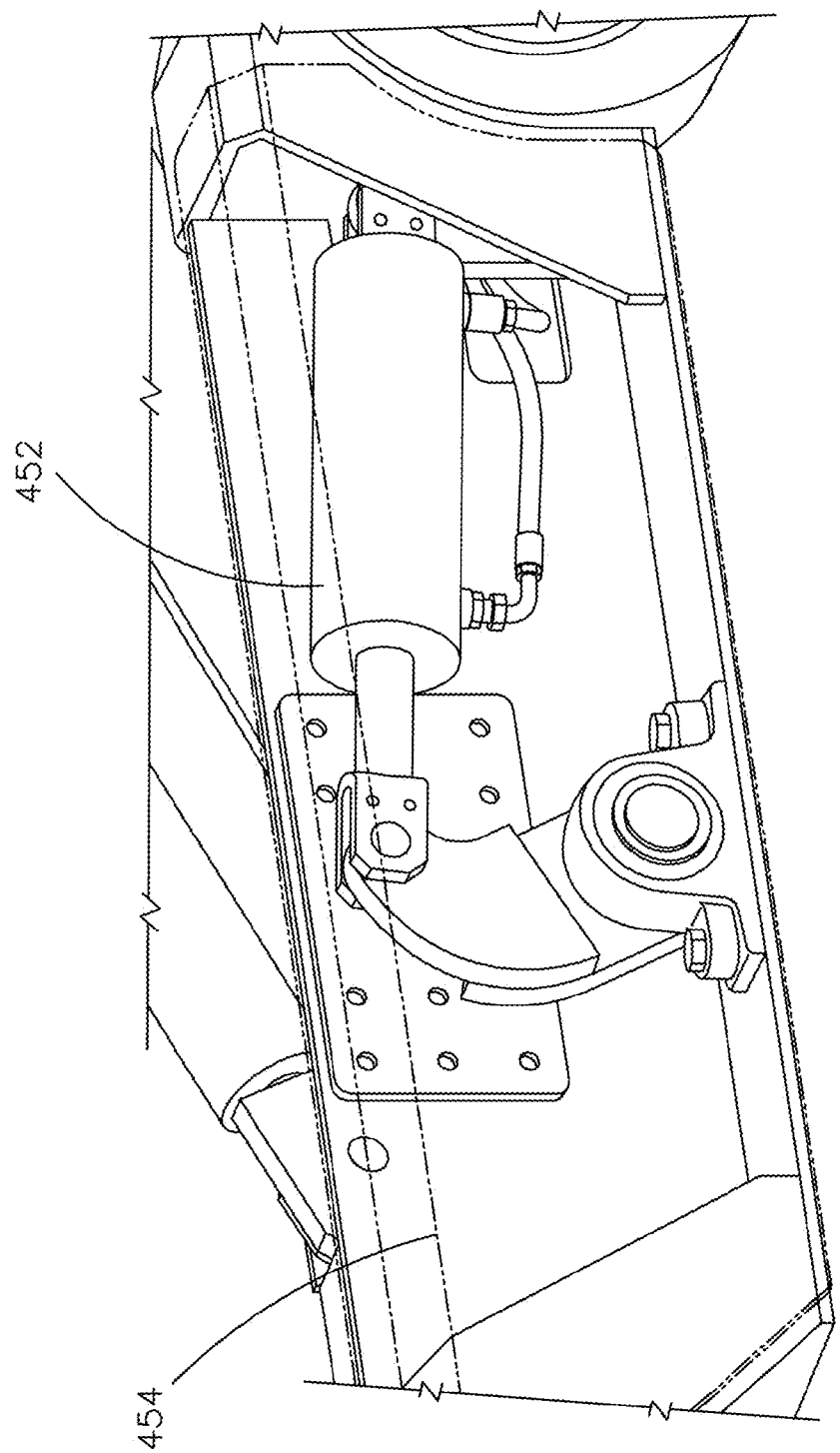
FIG. 45 is an outside-side perspective view of a rollable frame of an embodiment of a universal aircraft mule, according to inventive concepts of the present disclosure.

Referring now to FIG. 45, an exemplary embodiment of an aircraft mule (e.g., mule 100 or mule 400) includes one or more side guards behind which a lift cylinder (e.g., lifting cylinder 302 or lifting cylinder 452) is positioned. For example, lifting cylinder 452 may be positioned behind side guard 454, maintaining a cleaner look and reducing accessible pinch points.

Figure 46:
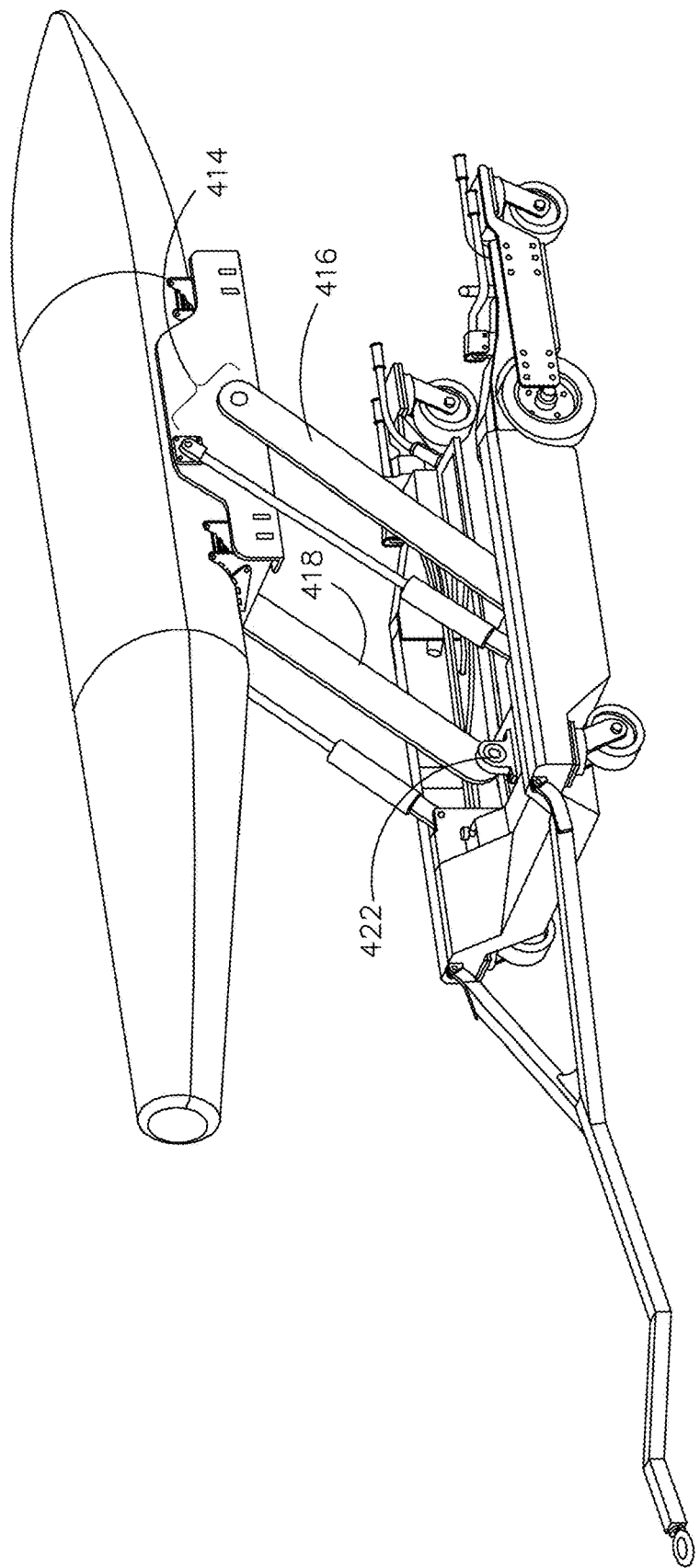
FIG. 46 is a perspective view of a universal aircraft mule in a transport position, according to inventive concepts of the present disclosure.

Referring now to FIG. 46, an exemplary embodiment of aircraft mule 400 is depicted with tow bar 448 in a towing position and cradle 402 in an auxiliary unloading position.

It is noted that mechanized storage assembly 102, universal aircraft mule 100, universal aircraft mule 400, lateral floating carriage 134, lateral floating carriage 404, goose-necked steerable tow bar 448, cradle 168, cradle 402, or combinations thereof, may be separate components or combined components of a universal aircraft mule kit. In some embodiments, components of the universal aircraft mule kit are combined to obtain a universal aircraft mule system (e.g., including mechanized storage assembly 102 and/or universal aircraft mule 100 or universal aircraft mule 400).

Figure 47:
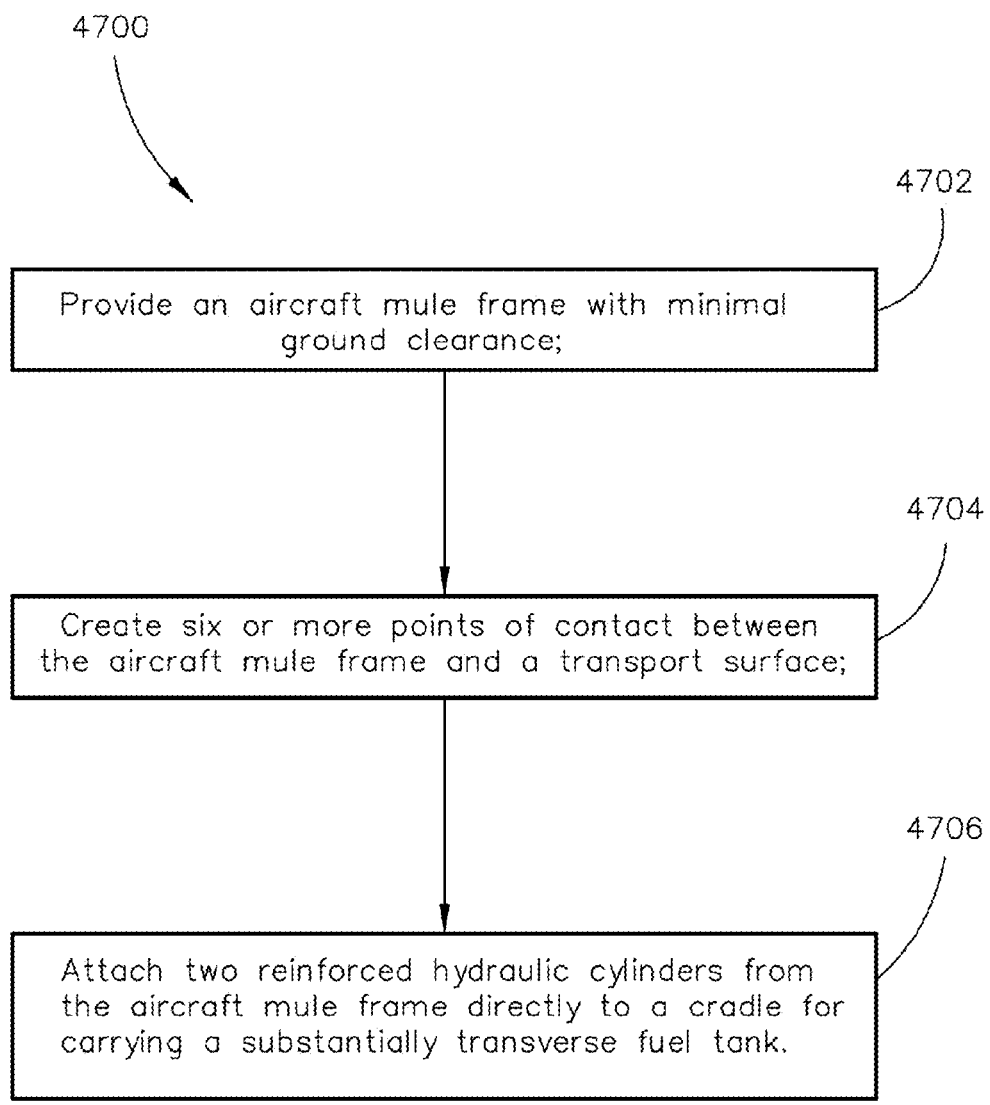
FIG. 47 is a flow diagram of a method/process for compensating a run-away angle, according to inventive concepts of the present disclosure.

Referring now to FIG. 47, an exemplary method/process 4700 for compensating run-away angle and increasing stability of a universal aircraft mule is disclosed.

In an exemplary embodiment, a step 4702 includes providing a universal aircraft mule frame (e.g., frame 428) with minimal ground clearance. For example, frame 428 may have a clearance of 2.54 cm (1.0 in) or less. The minimal ground clearance helps increase overall stability of the universal aircraft mule (e.g., 100 and/or 400) during receiving, transport, and/or unloading. In some embodiments, the minimal ground clearance enables, or enables in part, compensating the run-away angle and increased stability. In some embodiments, this may be due to a reduced tipping capacity of the aircraft mule.

In an exemplary embodiment, a step 4704 includes creating six or more points of contact between the aircraft mule frame (e.g., frame 106 or 428) and a transport surface. In some embodiments, the six or more points of contact are created using two side stabilizers 107 and four wheels (e.g., wheels 110, 112 and tires 124). In other embodiments, the six or more points of contact are created using four casters and two fixed wheels (e.g., first front pair of casters 430 and 432, second rear pair of casters 434 and 436, and pair of fixed wheels 438 and 440). However, it is noted that various combinations of side stabilizers, casters, wheels, and/or tires will be recognized by those skilled in the art to obtain the six or more points of contact.

In some embodiments, the step 4704 may further include applying a braking force (e.g., to slow or stop transport of tank 104) to a pair of wheels that are closest to the center of gravity (COG) during receiving or during unloading. For example, the COG may be within the frame 428 during receiving and/or unloading, and not during transport. Therefore, as the fuel tank transitions from a receiving position to a transport position, or transitions from an unloading position to a transport position, the COG will transition. The transition of the COG will be proximal to a pair of wheels. In embodiments, the pair of wheels proximal to the transition of the COG is configured with the braking system. In some embodiments, the application of braking force at the pair of wheels proximal to the transition of COG results, or results in part, compensation of run-away angle as there is a smaller shift in momentum and less strain placed on holding straps, hydraulic cylinders, or other components, when the braking force is applied. In some embodiments, the braking force is applied to first pair of fixed wheels 438 and 440.

In an exemplary embodiment, a step 4706 includes attaching two reinforced hydraulic cylinders 426 from the aircraft mule frame 428 directly to the cradle 402. In some embodiments, the cradle 402 is configured for carrying a substantially transverse-oriented auxiliary fuel tank (e.g., tank 104). In some embodiments, the use of directly attached hydraulic cylinders 426 (e.g., as opposed to hydraulic tilt system 200), may be a result of an operator determining that auxiliary fuel tank 104 is approximately half full. Therefore, instead of using aircraft mule 100 the operator may use aircraft mule 400. In other embodiments, the operator may determine that fuel tank 104 is approximately half full and interchange one or more components of aircraft mule 100. For example, the operator may interchange the cradle 168, or a portion of the cradle 168 (e.g., lateral floating carriage 134) with cradle 402, or a portion of cradle 402 (e.g., lateral floating carriage 404). Cradle 402 may have one or more increased dimensions as compared to cradle 168, resulting, or resulting in part, a compensated run-away angle.

While FIG. 47 depicts only three steps (e.g., steps 4702, 4704, and 4706), this depiction is not limiting. For example, method/process 4700 may include one or more additional steps. For instance, method/process 4700 may further include applying a thin rubber coating to the cradle 168 or to cradle 402, or to portions of the cradle (e.g., lateral floating carriage). In this regard, increased torsional forces may be required in order to rotate, slip, and/or move the fuel tank 104 during receiving, transport, and/or unloading. Because of the decreased movement of fuel tank 104, the weight of the load is more evenly distributed, resulting, or resulting in part, a compensated run-away angle. Another step that may be included in method/process 4700 includes implementing centered, anti-rotation stabilizers 408 that conform to one or more shapes, protrusions, and or ridges of a fuel tank 104, in order to reduce rotation and movement of the fuel tank during receiving, transport, and/or unloading of the fuel tank 104. Additional steps that may be included in method/process 4700, according to the inventive concepts of this disclosure, will be apparent to those skilled in the art.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A universal aircraft mule, comprising:
   a rollable and steerable frame including at least one pair of wheels;
   a set of interchangeable carriages, wherein a first interchangeable carriage of the set of interchangeable carriages differs in one or more dimensions than a second interchangeable carriage of the set of interchangeable carriages;
   a cradle configured to receive the set of interchangeable carriages; and
   a lift assembly, comprising:
      a first hydraulic system configured to provide hydraulic system pressure to a first hydraulic cylinder, wherein the first hydraulic cylinder is configured to pivotably drive a lifting bar from a side of the frame, wherein the lifting bar is coupled to the side of the frame at a first coupling point and a side of the cradle at a second coupling point; and
      a second hydraulic system configured to provide hydraulic system pressure to a second hydraulic cylinder coupled to the side of the frame, wherein the second hydraulic cylinder is coupled to the side of the frame at a third coupling point and the side of the cradle at a fourth coupling point, wherein the second hydraulic cylinder is configured to directly and pivotably drive and tilt the side of the cradle,
      wherein the second coupling point and the fourth coupling point are vertically separated on the side of the cradle,
   wherein the lifting bar and the second hydraulic cylinder at least partially overlap.

2. The mule of claim 1, further comprising six or more points of contact between the frame and a transport surface, wherein the six or more points of contact between the frame and the transport surface comprise at least one of two pairs of casters and the at least one pair of wheels, or two pairs of wheels and two or more side stabilizers.

3. The mule of claim 2, wherein the at least one pair of wheels is between the two pairs of casters and has at least one associated braking system.

4. The mule of claim 1, wherein the frame comprises a goose-necked tow bar including a coupling ring, wherein the goose-necked tow bar is foldable between a stowed position and a towing position, wherein the coupling ring is elevated from a transport surface when the goose-necked tow bar is in the stowed position, wherein at least one of the coupling ring or a gooseneck section of the goose-necked tow bar is positioned between the first side of the cradle and the second side of the cradle when the goose-necked tow bar is in the stowed position.

5. The mule of claim 1, wherein an interchangeable carriage of the set of interchangeable carriages includes one or more locations for receiving at least one of one or more protrusions or one or more ridges of an accessory.

6. The mule of claim 1, wherein the cradle is coated with a thin rubber coating, wherein the cradle includes one or more support structures, wherein the one or more support structures reinforce the cradle.

7. The mule of claim 6, wherein an interchangeable carriage of the set of interchangeable carriages further comprises one or more anti-rotation stabilizers, wherein the one or more anti-rotation stabilizers are centered with respect to the interchangeable carriage, wherein the first hydraulic cylinder of the first hydraulic system further comprises a plurality of associated reinforcing bearing assemblies.

8. The mule of claim 1, wherein the cradle is configured to make contact with at least a portion of a bottom surface of the set of interchangeable carriages.

9. The mule of claim 1, wherein at least one of the first hydraulic cylinder or the second hydraulic cylinder has bearings substantially housed within the side of the cradle.

10. The mule of claim 1, further comprising a side guard, wherein at least one of the first hydraulic cylinder or the second hydraulic cylinder is positioned proximate to the side guard.

11. The mule of claim 1, wherein the frame and the cradle are configured to allow the cradle to lower to a position a select distance from a transport surface while an interchangeable carriage of the set of interchangeable carriages is coupled to the cradle, wherein the distance is equal to a central axis through the at least one pair of wheels.

12. The mule of claim 11, wherein the frame and the cradle are configured to allow the cradle to lower to within 1.0 inches from the transport surface while the interchangeable carriage of the set of interchangeable carriages is coupled to the cradle.

13. The mule of claim 11, wherein the frame is U-shaped.

14. The mule of claim 13, wherein the cradle is unencumbered by the U-shaped frame when the cradle is lowered to the position at the select distance from the transport surface.

15. The mule of claim 11, wherein a center of gravity of the cradle is outside of the frame when the cradle is lowered to the position at the select distance from the transport surface.

16. The mule of claim 11, wherein a center of gravity of the cradle is centered within the frame when the cradle is in a second position above the position at the select distance from the transport surface.

17. A universal aircraft mule, comprising:
a rollable and steerable frame including at least one pair of wheels;
a set of interchangeable carriages;
a cradle configured to receive the set of interchangeable carriages, wherein the frame and the cradle are configured to allow the cradle to lower to a position a select distance from a transport surface while an interchangeable carriage of the set of interchangeable carriages is coupled to the cradle, wherein the distance is equal to a central axis through the at least one pair of wheels; and
a lift assembly, comprising:
a first hydraulic system configured to provide hydraulic system pressure to a first hydraulic cylinder, wherein the first hydraulic cylinder is configured to pivotably drive a lifting bar from a side of the frame, wherein the lifting bar is coupled to the side of the frame at a first coupling point and a side of the cradle at a second coupling point; and
a second hydraulic system configured to provide hydraulic system pressure to a second hydraulic cylinder coupled to the side of the frame, wherein the second hydraulic cylinder is coupled to the side of the frame at a third coupling point and the side of the cradle at a fourth coupling point, wherein the second hydraulic cylinder is configured to directly and pivotably drive and tilt the side of the cradle,
wherein the second coupling point and the fourth coupling point are vertically separated on the side of the cradle,
wherein the lifting bar and the second hydraulic cylinder at least partially overlap.

18. The mule of claim 17, wherein a first interchangeable carriage of the set of interchangeable carriages differs in one or more dimensions than a second interchangeable carriage of the set of interchangeable carriages.

19. A universal aircraft mule, comprising:
a rollable and steerable frame;
a set of interchangeable carriages;
a cradle configured to receive the set of interchangeable carriages, wherein the frame and the cradle are configured to allow the cradle to lower to within 1.0 inches from a transport surface while an interchangeable carriage of the set of interchangeable carriages is coupled to the cradle; and
a lift assembly, comprising:
a first hydraulic system configured to provide hydraulic system pressure to a first hydraulic cylinder, wherein the first hydraulic cylinder is configured to pivotably drive a lifting bar from a side of the frame, wherein the lifting bar is coupled to the side of the frame at a first coupling point and a side of the cradle at a second coupling point; and
a second hydraulic system configured to provide hydraulic system pressure to a second hydraulic cylinder coupled to the side of the frame, wherein the second hydraulic cylinder is coupled to the side of the frame at a third coupling point and the side of the cradle at a fourth coupling point, wherein the second hydraulic cylinder is configured to directly and pivotably drive and tilt the side of the cradle,
wherein the second coupling point and the fourth coupling point are vertically separated on the side of the cradle,
wherein the lifting bar and the second hydraulic cylinder at least partially overlap.

20. The mule of claim 19, wherein a first interchangeable carriage of the set of interchangeable carriages differs in one or more dimensions than a second interchangeable carriage of the set of interchangeable carriages.

\* \* \* \* \*